United States Patent
Vasey-Glandon et al.

(10) Patent No.: US 6,341,261 B1
(45) Date of Patent: *Jan. 22, 2002

(54) KNOWLEDGE DRIVEN COMPOSITE DESIGN OPTIMIZATION PROCESS AND SYSTEM THEREFOR

(75) Inventors: Virginia M. Vasey-Glandon, Florissant; Richard D. Hale, St. Louis; Jeffrey J. Schmitz, St. Charles, all of MO (US)

(73) Assignee: McDonnell Douglas Corp., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,586

(22) Filed: Nov. 15, 1999

Related U.S. Application Data

(63) Continuation of application No. 08/854,687, filed on May 12, 1997, now Pat. No. 5,984,511.

(51) Int. Cl.[7] .............................................. G06F 17/50
(52) U.S. Cl. ............................... 703/6; 703/7; 345/420; 700/182
(58) Field of Search ...................... 703/1, 6, 7; 345/423, 345/420; 700/97, 98, 182; 156/212

(56) References Cited

U.S. PATENT DOCUMENTS

| | | | | |
|---|---|---|---|---|
| 4,534,813 A | * | 8/1985 | Williamson et al. ........ 156/212 |
| 4,646,251 A | * | 2/1987 | Hayes et al. ................. 345/423 |
| 4,849,913 A | * | 7/1989 | Ward et al. .................... 700/98 |
| 4,937,768 A | * | 6/1990 | Carver et al. .................. 703/1 |
| 4,945,488 A | * | 7/1990 | Carver et al. ............... 700/182 |
| 5,006,990 A | * | 4/1991 | Ward et al. .................... 700/97 |
| 5,023,800 A | * | 6/1991 | Carver et al. ............... 700/182 |
| 5,033,014 A | * | 7/1991 | Carver et al. .................. 703/1 |
| 5,038,291 A | * | 8/1991 | Wang et al. .................... 700/98 |
| 5,119,309 A | * | 6/1992 | Cavendish et al. ......... 700/182 |
| 5,197,013 A | * | 3/1993 | Dundorf ...................... 700/182 |
| 5,984,511 A | * | 11/1999 | Vasey-Glandon et al. ...... 703/6 |

\* cited by examiner

Primary Examiner—Kevin J. Teska
Assistant Examiner—Russell W. Frejd
(74) Attorney, Agent, or Firm—Westerlund-Powell, P.C.; Raymond H. S. Powell, Jr.; Robert A. Westerlund

(57) ABSTRACT

A knowledge driven composite design optimization process for designing a laminate part includes steps for generating a globally optimized 3-D ply definition for a laminate part, and modifying the 3-D ply definition to include features of the laminate part, where the generating and modifying steps are parametrically linked to one another and are performed in the recited order. Preferably, the generating step includes substeps for determining connectivity between a plurality of regions defining the laminate part, subsequently generating ramp features detailing interconnection of the regions defining the laminate part, and displaying views and corresponding tabular data describing the laminate part and illustrating both inter-region connectivity and the ramp features as specified by a user. A knowledge driven composite design optimization system and associated computer memory for operating a general purpose computer as a knowledge driven composite design optimization system are also described.

12 Claims, 68 Drawing Sheets

FIG. 3

| Thickness (# Plies) | Potential Families | Stiffness (msi) Axial | Stiffness (msi) Transverse | Shear | Poisson's Ratio |
|---|---|---|---|---|---|
| 17 | — | 13.23 | 5.30 | 2.79 | 0.42 |
| 18 | — | 13.23 | 5.30 | 2.79 | 0.42 |
| 19 | — | 13.23 | 5.30 | 2.79 | 0.42 |
| 20 | 50.0/40.0/10.0 | 13.23 | 5.30 | 2.79 | 0.42 |
| 21 | — | 13.23 | 5.30 | 2.79 | 0.42 |
| 22 | — | 13.23 | 5.30 | 2.79 | 0.42 |
| 23 | — | 13.23 | 5.30 | 2.79 | 0.42 |
| 17 | 41.2/47.1/11.8 | 11.59 | 5.88 | 3.14 | 0.42 |
| 17 | 47.1/47.1/5.9 | 12.56 | 4.68 | 3.14 | 0.52 |
| 18 | 44.4/44.4/11.1 | 12.19 | 5.67 | 3.01 | 0.42 |
| 19 | 42.1/42.1/15.8 | 11.78 | 6.60 | 2.89 | 0.35 |
| 19 | 47.4/42.1/10.5 | 12.74 | 5.48 | 2.89 | 0.42 |
| 19 | 52.6/42.1/5.3 | 13.61 | 4.39 | 2.89 | 0.52 |
| 20 | 50.0/40.0/10.0 | 13.23 | 5.30 | 2.79 | 0.42 |
| 21 | 42.9/38.1/19.0 | 11.90 | 7.10 | 2.69 | 0.30 |
| 21 | 47.6/38.1/14.3 | 12.80 | 6.12 | 2.69 | 0.35 |
| 22 | 45.5/36.4/18.2 | 12.38 | 6.86 | 2.61 | 0.30 |
| 22 | 54.5/36.4/9.1 | 14.07 | 4.97 | 2.61 | 0.42 |
| 23 | 47.8/34.8/17.4 | 12.82 | 6.64 | 2.53 | 0.30 |
| 23 | 52.2/34.8/13.0 | 13.65 | 5.74 | 2.53 | 0.35 |
| 23 | 56.5/34.8/8.7 | 14.44 | 4.83 | 2.53 | 0.41 |

FIG. 6
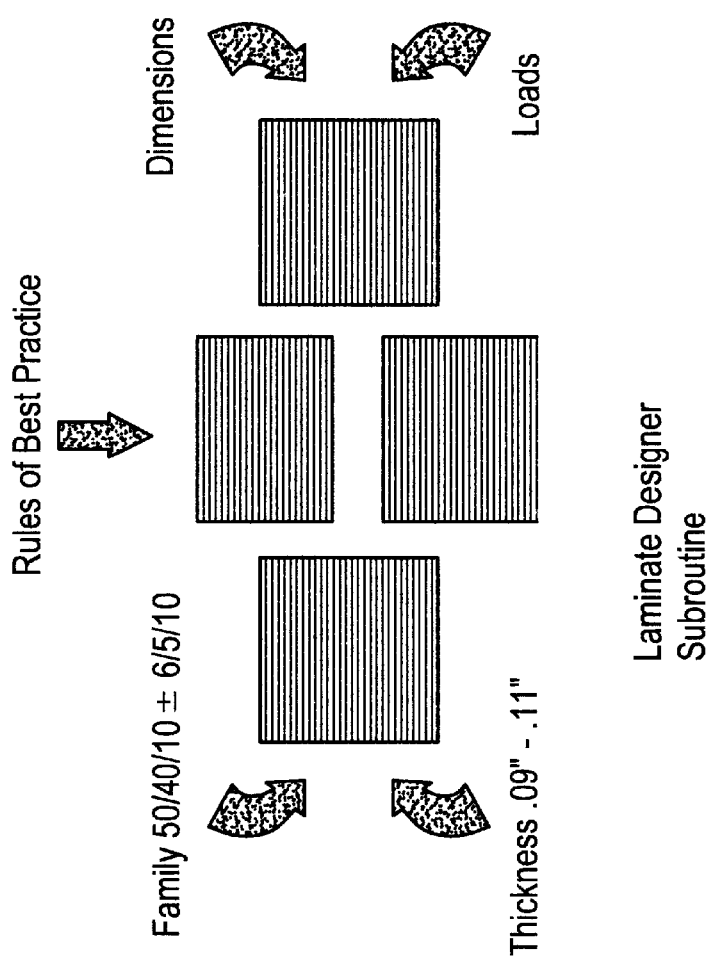
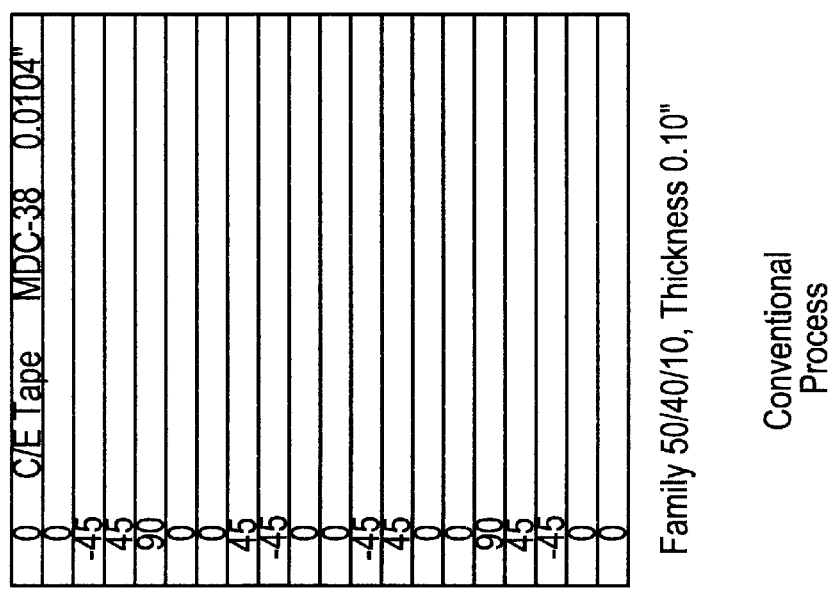

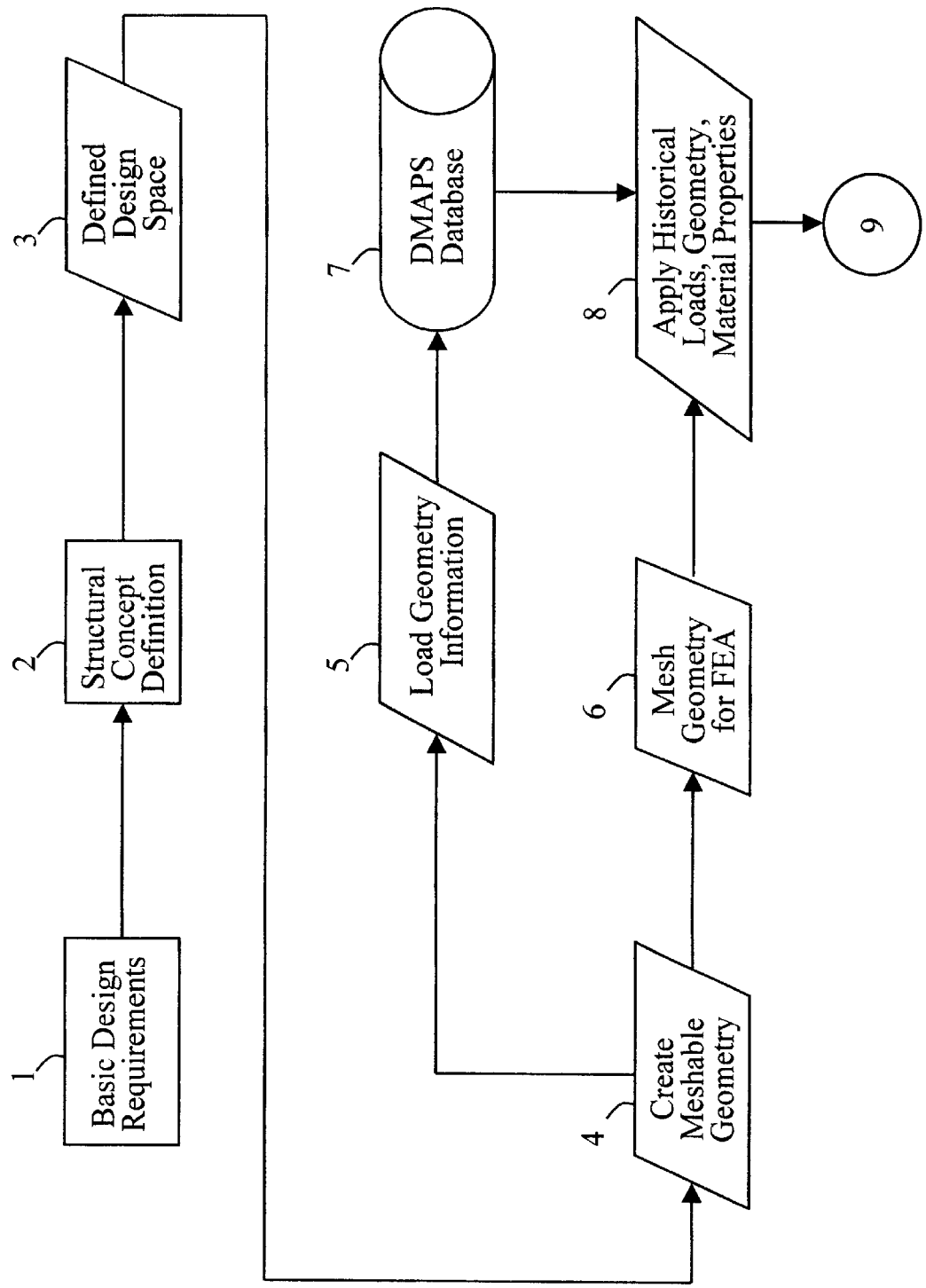

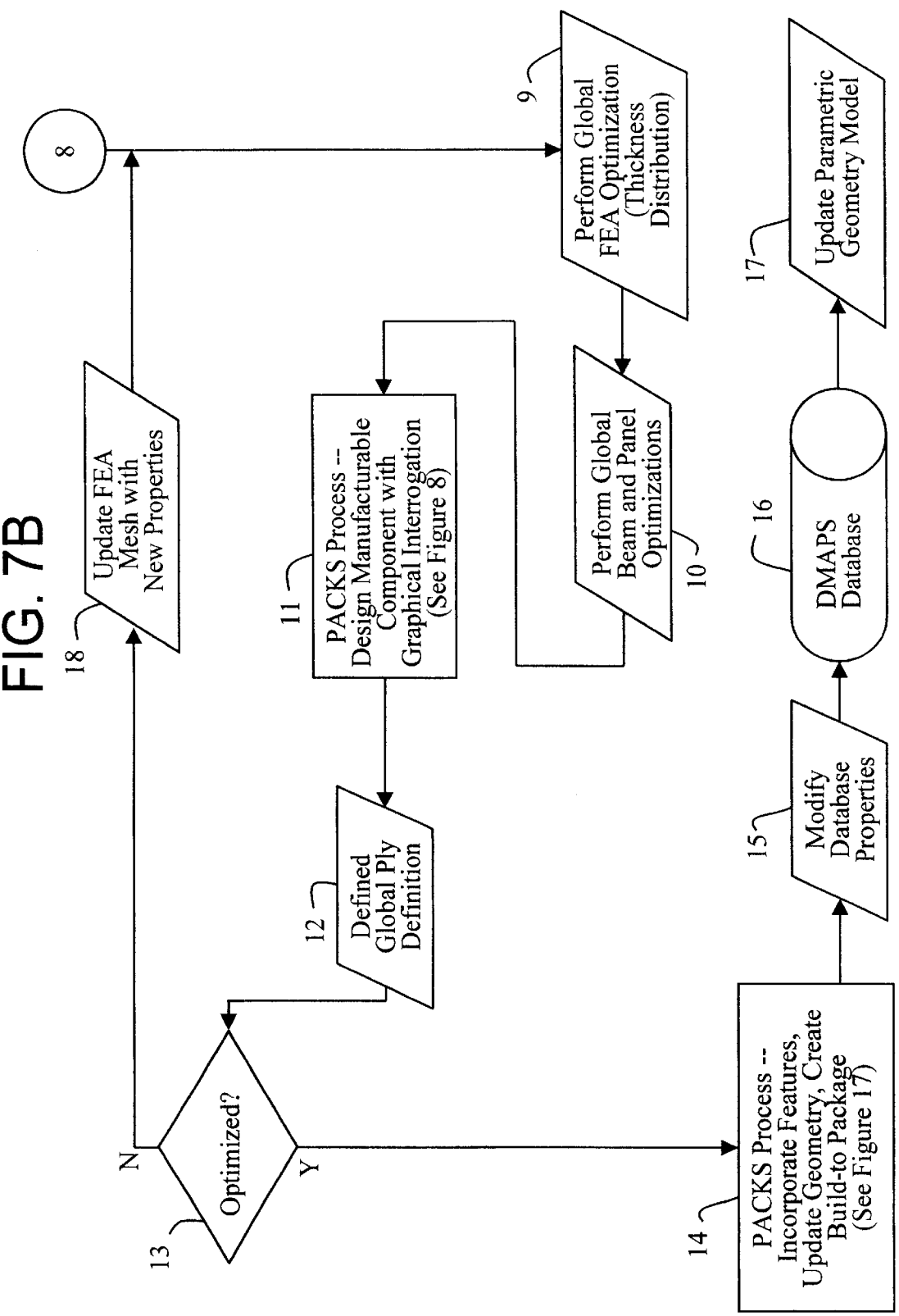

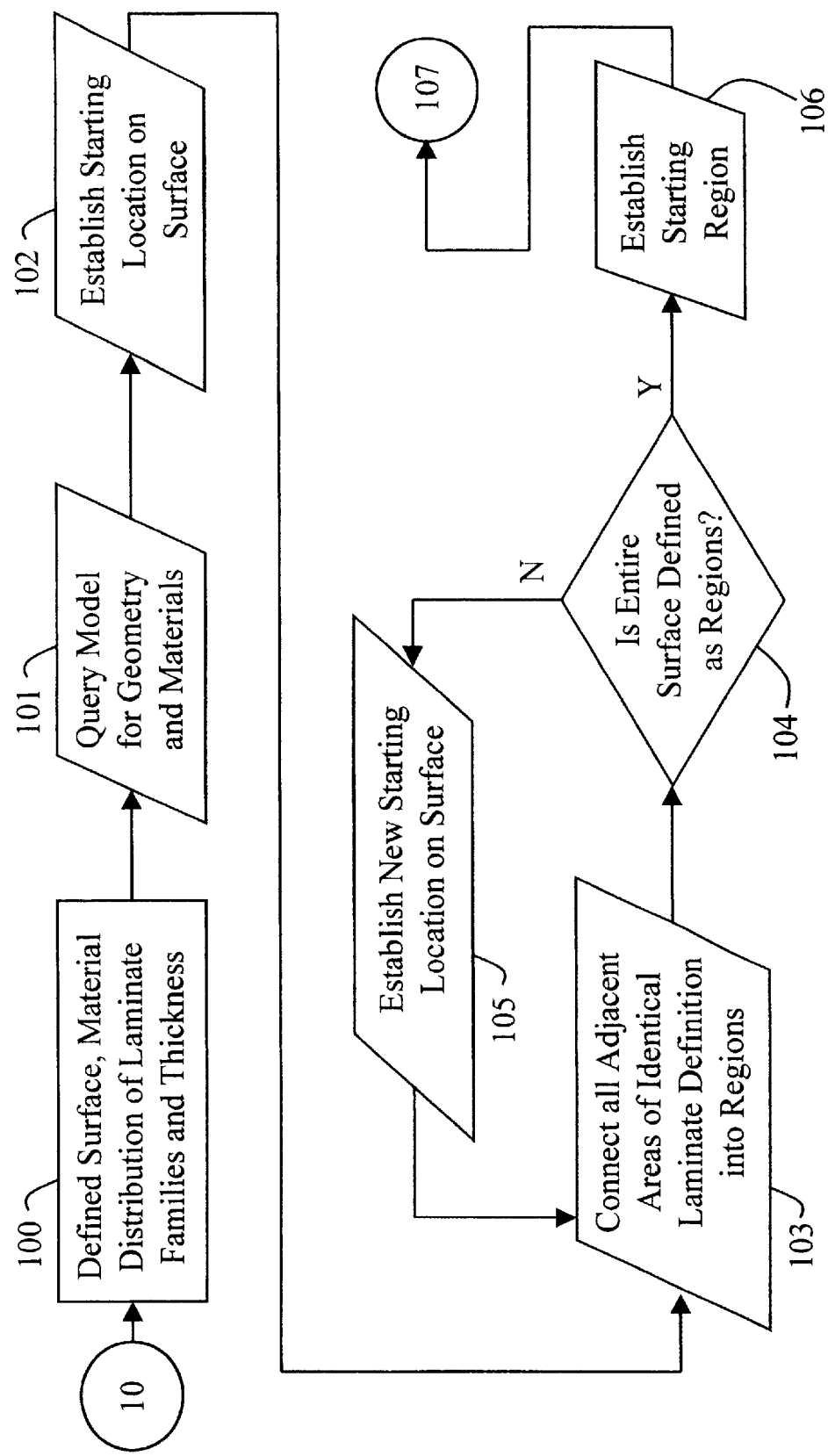

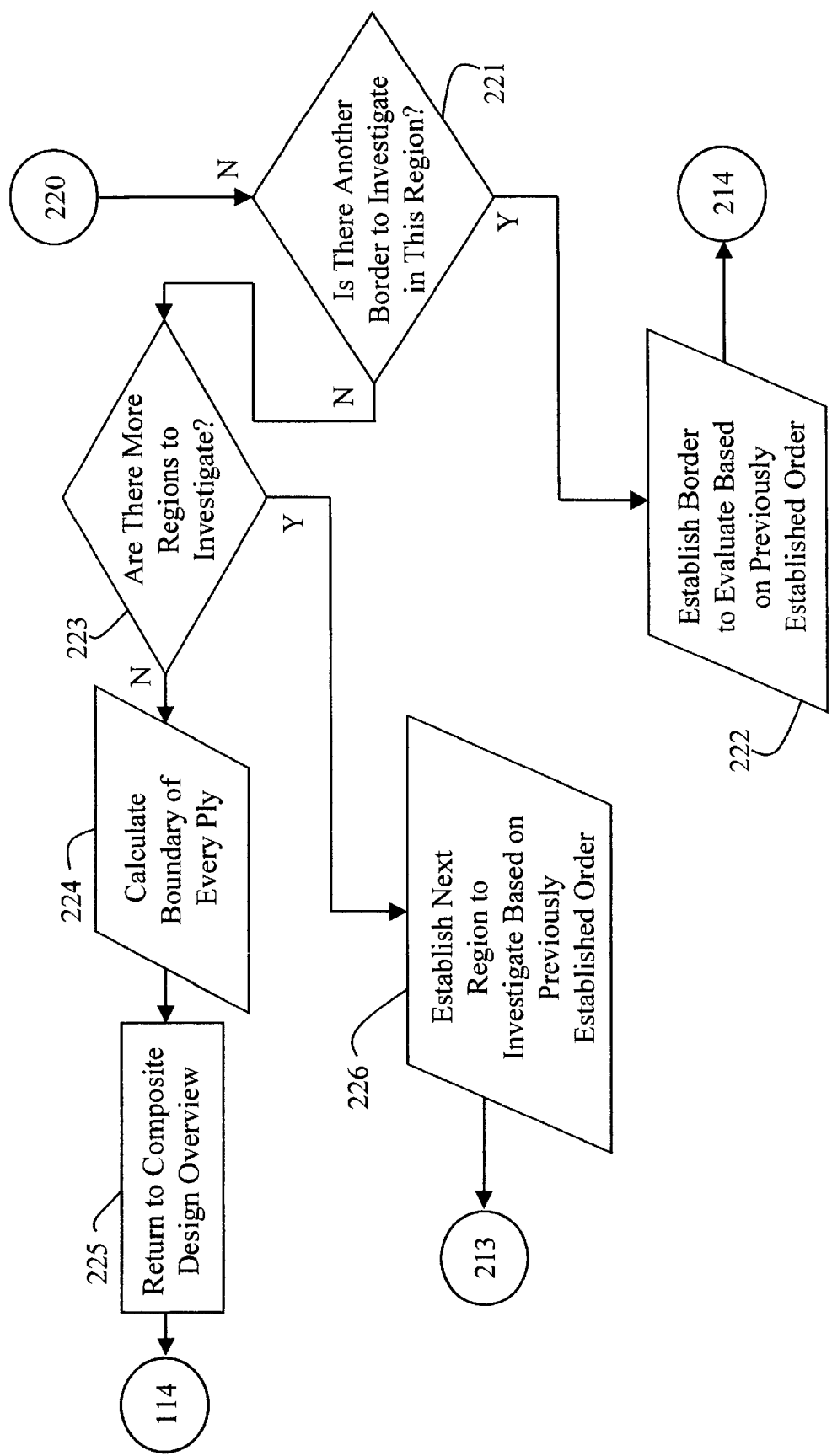

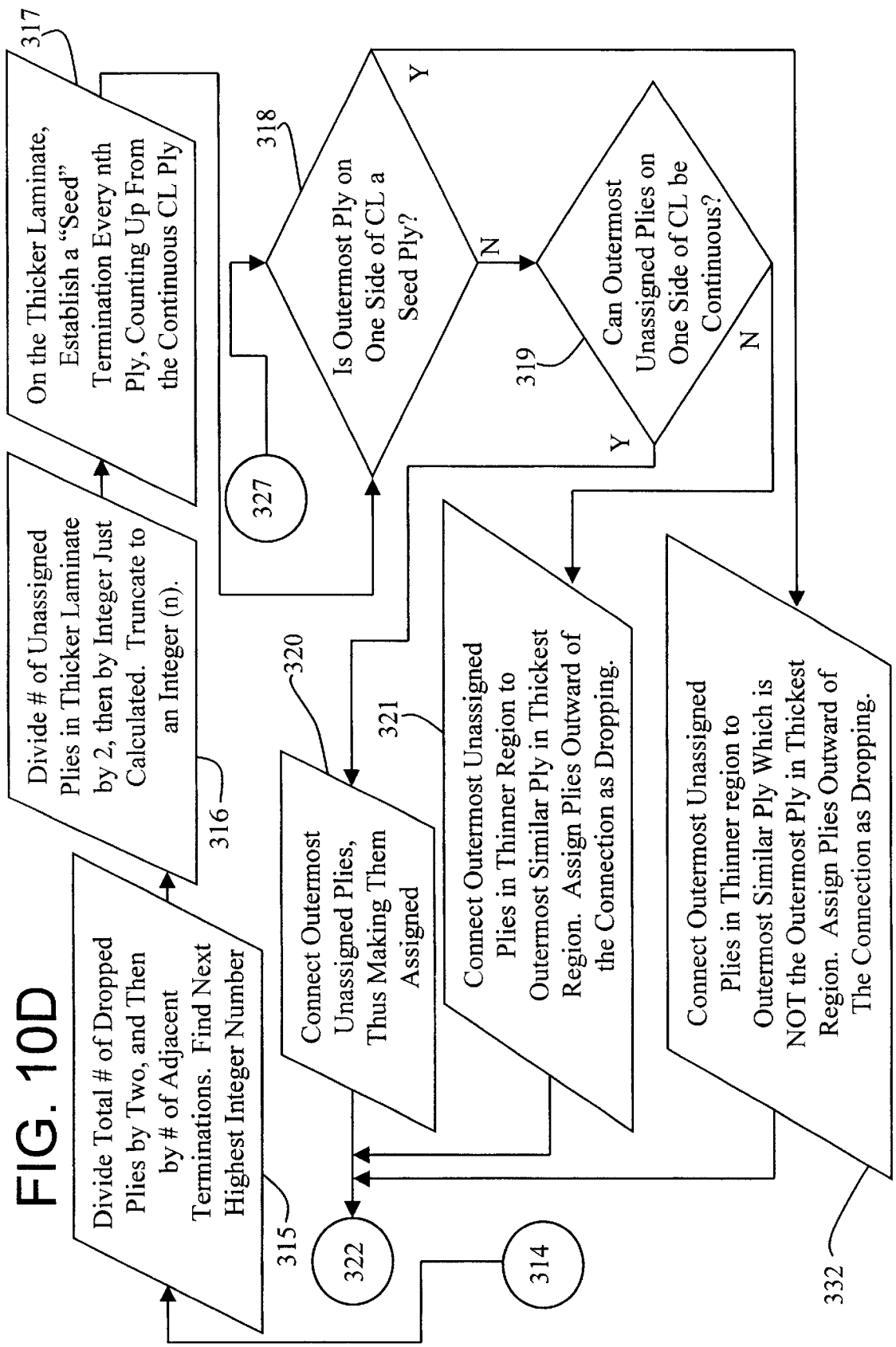

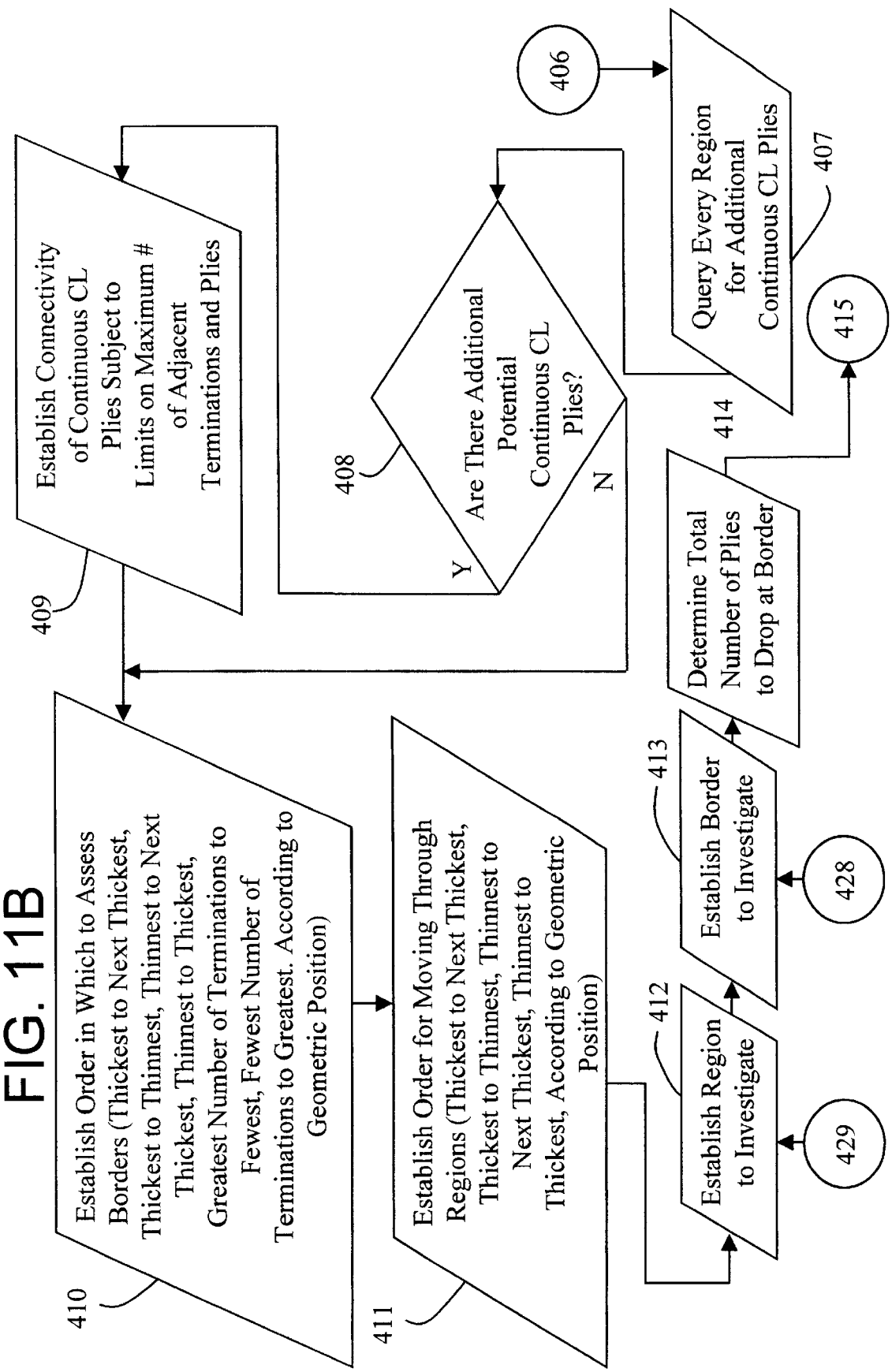

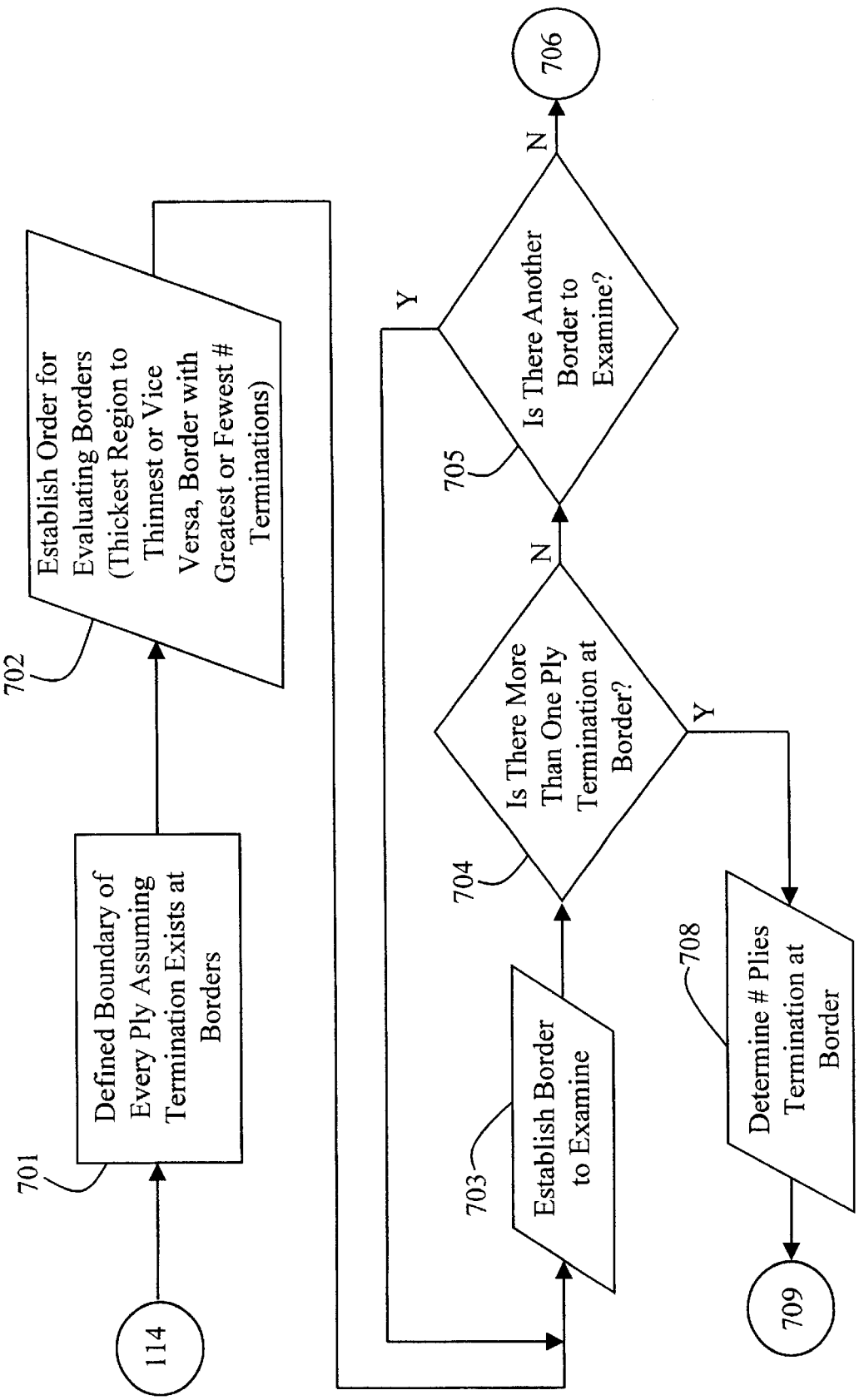

FIG.14G

KNOWLEDGE DRIVEN COMPOSITE DESIGN OPTIMIZATION PROCESS AND SYSTEM THEREFOR

This is a Continuation of Ser. No. 08/854,687, which was filed on May 12, 1997 now U.S. Pat. No. 5,984,511.

BACKGROUND OF THE INVENTION

The present invention relates generally to a composite materials design process. More specifically, the present invention relates to a knowledge driven composite design optimization process and corresponding system. A computer program adapted to facilitate implementation of the knowledge driven composite design optimization process is also disclosed.

The use of composites in airframe construction is becoming an increasingly complex process. Composite structures are generally designed at the local laminate level using wireframes or solids in Computer Aided Design (CAD) systems such as the UNIGRAPHICS (™) CAD system. Analysis is performed using a separate analytical model(s), e.g., a finite element based model, which initially assumes laminate families which define a percentage composition (number) of each ply orientation and which is generally coordinated with design geometry through imported master datums and a design surface. A typical design process is illustrated in the functional flowchart of FIG. 1. From the flowchart, it will be appreciated that the current design process has not been optimized. For example, finite element analysis (FEA) is conducted before the step of editing the ply lay-up for manufacturability, which virtually guarantees that the FEA step will have to be repeated and, in many cases, repeated several times. Moreover, it will be appreciated that changes in, for example, the wireframe model will require updates to, or recreation of, the finite element model and vice versa.

Furthermore, many design considerations are routinely addressed during the composite design process. For example, often in the analytical model, the order in which each oriented ply is found within the total number of plies is not considered. Typically, the analyst does not restrict the thickness map to "buildable" thicknesses of the material selected or specify families which produce "fabrication friendly" designs. These modifications are typically integrated by the designer in their geometry model. However, since the abovementioned modifications occur after the bulk of the analysis has been completed, there are often surprises, e.g., higher than expected component weight, at a point well into the design process. In addition, even when the analyst does define local stacking sequences, the analyst accomplishes this by performing optimizations which result in local laminate definitions which do not integrate well with one another.

It will also be noted that documentation for manufacturing is currently provided in two key ways:

(1) as a design surface with cured ply boundaries projected to a plane; and (2) through manually created section cuts and laminate tables that contain text entities for each ply identifying orientation, material and number of each ply.

Since the textual data must be created manually, text data having missing information is frequently released to other manufacturing departments. When design changes occur, these errors and omissions are compounded because the text data is often only partially updated after each design change.

The inner moldline, which is often a tooled surface and always a structural mating surface, is defined by conceptually joining the resultant section cuts of the engineering, i.e., CAD, definition. Manufacturing personnel then flatten the ply geometry to create uncured ply boundaries that are cut for fabrication. Translation errors due to selection of the incorrect normal orientation during this step are a common occurrence when working with complex geometry, primarily because standards do not address this level of detail. Moreover, while the thickness of the composite material used to create the laminate is 18–25% thicker than cured material, this fact is normally not reflected in any of the traditional models. It should be mentioned that the one exception to this general statement is found in the unique files which are created by manufacturing for laser projection that use a "debulked" ply thickness to develop a three dimensional (3-D) plies representation of the part in the lay-up step of fabrication. The variability of the translation process is high, since design intent is not always clear because all ply boundaries are represented on one 3-D plane rather than in true 3-D space. An example of the type of defect created with no geometrical definition at the ply level in 3-D space is described immediately below.

The lack of geometrical accountability for ply overlaps leads to locally undersized areas in tools. This in turn results in increased local pressure on the component during the cure at ply overlap or splice areas. This may contribute to internal laminate defects in the form of porosity or resin poor areas in a structure if enough of these details occur through the thickness in an area. In addition, lack of geometrical accountability can lead to local distortion of the fiber architecture and can result in increased interlaminar shear stress, each of which adversely affects structural performance. These cause and effect relationships are viewed as too complex for the current conventional composite process to track and control during design and fabrication. It will be appreciated from the references, discussed briefly below, that a great deal of attention is paid to these effects at the micromechanics level in literature and in the typical fabrication shop for specific structures, yet no standard process allows easy incorporation of these considerations into composite design practices. The current approach to understanding these local effects is to build and then cutup composite parts, i.e., to perform destructive testing of the articles. It will be appreciated that this is an expensive and time-consuming approach to understanding a geometrical problem.

In addition, manufacturing constraints such as material width restrictions are not incorporated or reflected in the design data. Such design constraints are often considered only as a refinement (iteration) within the manufacturing definition cycle, i.e., when editing ply definition to ensure manufacturability. It will be noted that this results in additional ply splices which may not be accounted for in the design. While this often leads to structural degradation, these manufacturing constraints may not be reviewed during the design steps in current practice. Thus, the analytical community is forced to adopt conservative analysis approaches to avoid the risk created by uncertainties arising from manufacturing constraints. The most common impacts of this approach are greater structural weight, more stringent fabrication requirements, and, of course, higher costs. The lack of understanding of the structural design impacts on fabrication also leads to inconsistent disposition of discrepant fabrication events, since a "preferred" or "best" practice has never been identified. The impacts are considered part of the variability that leads to the reduced material allowables used for composite analysis.

It should also be mentioned that design changes often require updates to manufacturing data. Manufacturing recreates the textual data at least twice to produce data forms that meet the needs of the manufacturing database. The composite database becomes the source for all in-process inspections and fabrication. Final parts are inspected to design data as prepared by manufacturing personnel in their templates and database. Database coordination for design changes is a challenging, not to mention a continuous, process.

Moreover, the only software tool that attempts to integrate the definition and analysis of composites is the Northrop Grumman's, formerly Vought Aircraft Company's, Computerized Composite Development Project (CCDP) program. The CCDP program is limited in that it does not create a 3-D product definition, is hard coded in FORTRAN to run on a VAX computer or computer cluster, and includes no adaptive knowledge or objects that can assist the designer in tracking sensitivities of design changes. Moreover, the CCDP program is not focused on visualization, parametric definition, or 3-D design capabilities. While the CCDP program does a relatively good job of integrating manufacturing data needs into the program and outputting documentation, the CCDP program simply cannot provide any documentation in the form of blueprints or other visual aids. In addition, the CCDP program is unable to duplicate the optimum laminate selection of an analyst without manual intervention.

What is needed is a process for designing composites which establishes a global, manufacturable laminate definition at the ply level. Additionally, what is needed is a knowledge driven composite design optimization system to automate the composite design optimization process and output of three dimensional (3-D) laminated composite designs which parametrically link laminates, plies and analysis routines, these routines are developed with a product life-cycle view which inserts heuristic information onto the object oriented structure. Preferably, object naming conventions would be used in the knowledge driven composite design optimization system to help maintain efficient association between parameters of mating structures with knowledge to help define the associations and rules to process requirements within the product life cycle.

SUMMARY OF THE INVENTION

Based on the above and foregoing, it can be appreciated that there presently exists a need in the art for a knowledge driven composite design optimization process and corresponding system which overcomes the above-described deficiencies. The present invention was motivated by a desire to overcome the drawbacks and shortcomings of the presently available composite design and fabrication technology, and thereby fulfill this need in the art.

One object of the knowledge driven composite design optimization process according to the present invention is to provide a composite design optimization process wherein all subroutines included in the process are parametrically linked to one another. According to one aspect of the present invention, the resultant composite laminate definition is parametrically refined down to the ply level.

Another object of the knowledge driven composite design optimization process according to the present invention is to provide a composite design optimization process wherein "best practice" rules for composite laminate design are incorporated into the individual subroutines of the composite design optimization process. According to one aspect of the present invention, the "best practice" rules are applied in a predetermined sequence to permit generation of at least one optimal design solution.

Still another object of the knowledge driven composite design optimization process according to the present invention is to provide a composite design optimization process wherein manufacturing constraints for a part are considered as soon after the part geometry is defined as possible.

Yet another object of the knowledge driven composite design optimization process according to the present invention is to provide a composite design optimization process wherein the ply connectivity between constant thickness laminate regions included in a part is globally optimized for the part. Moreover, the composite design optimization process beneficially generates optimal ramp or thickness transition features responsive to the globally optimized region connectivity. According to one aspect of the present invention, connectivity is optimized for variables including part weight, ply size and overall part strength.

Another object of the knowledge driven composite design optimization process according to the present invention is to provide a composite design optimization process capable of presenting the intermediate stages of, and resultant, laminate design in several different formats to facilitate understanding of the laminate design at the ply level by all members of the laminate design team.

A still further object of the knowledge driven composite design optimization process according to the present invention is to provide a composite design optimization process wherein intermediate stages of the laminate design can be stored for later display and reuse. It will be appreciated that this feature according to the present invention permits the laminate design team to perform tradeoff studies during the laminate design. Moreover, this feature facilitates later update of the knowledge base, e.g., the "best practice" rules.

The knowledge driven composite design optimization process and corresponding system, particularly Parametric Composite Knowledge System (PACKS), advantageously addresses the high cost and cycle time of composite laminate definition. It will be appreciated that one cause of this problem stems from the fact that there are currently many different tools, i.e., programs, for design and analysis of laminates, none of which is completely parametric or associative. All of these conventional design tools have different models for the same part definition, thus duplicating data in some cases, and often creating new data (that the other tools have no knowledge of) in others. A secondary problem with these conventional software tools is the lack of visualization outputs for the composite laminate ply details, which permits manufacturing personnel to misinterpret engineering design intent and necessitates refinement or recreation of engineering data.

Advantageously, PACKS addresses these problems by creating one parametric model for composite design and analysis which outputs a three dimensional (3-D) definition of the composite laminate at the ply level. The PACKS module preferably integrates several new or existing tools into one shell, linking the outputs from, for example, the UNIGRAPHICS (™) CAD program module, an analysis database, e.g., a PATRAN (™) database, and the laminate designer subroutine while incorporating a number of rules of laminate design to increase the speed of the composite definition process. Beneficially, data developed by PACKS can be fed directly into manufacturing and analysis databases, or preferably is linked into a common database which feeds all processes.

These and other objects, features and advantages according to the present invention are provided by a knowledge driven composite design optimization process for designing a laminate part. Preferably, the process includes steps for generating a globally optimized ply definition for a laminate part, and modifying the ply definition to include features of the laminate part, where the generating and modifying steps are parametrically linked to one another and are performed in the recited order as a "best practice" yet are not restricted to this order. According to one aspect of the present invention, the generating step includes substeps for determining connectivity between a plurality of regions defining the laminate part, subsequently generating ramp features detailing interconnection of the regions defining the laminate part, and displaying views and corresponding tabular data describing the laminate part and illustrating both inter-region connectivity and the ramp features as specified by a user.

These and other objects, features and advantages according to the present invention are provided by a laminate part constructed using a knowledge driven composite design optimization process including steps for generating a globally optimized ply definition for a laminate part using predetermined optimal rules of laminate design practice, and subsequently modifying the ply definition to include features of the laminate part, wherein the generating and modifying steps are parametrically linked to one another.

These and other objects, features and advantages according to the present invention are provided by a knowledge driven composite design optimization process for designing a laminate part contained within a parametric composite knowledge system (PACKS) for generating a globally optimized ply definition for a laminate part in accordance with laminate design transition rules, and including a feature module for modifying the ply definition to include features which locally modify the global ply solution, wherein PACKS and the features module are parametrically linked to one another, and wherein the knowledge driven composite design optimization process is executed in PACKS and may be refined with the features module. According to one aspect of the present invention, PACKS preferably includes a connectivity subroutine for determining connectivity between a plurality of regions defining the laminate part responsive to the transition rules, a ramp definition subroutine for generating ramp features detailing interconnection of the regions defining the laminate part, and a visualization subroutine for displaying views and corresponding tabular data describing the laminate part and illustrating both inter-region connectivity and the ramp features as specified by a user.

These and other objects, features and advantages according to the present invention are provided by a knowledge driven composite design optimization system used in designing a laminate part, including a first device for generating a globally optimized ply definition for the laminate part in accordance with laminate design transition rules, wherein the first device includes a second device for determining connectivity between a plurality of regions defining a the laminate part responsive to the transition rules, a third device for generating ramp features detailing interconnection of the regions defining the laminate part, and a fourth device for displaying views and corresponding tabular data describing the laminate part and illustrating both inter-region connectivity and the ramp features as specified by a user. Moreover, the knowledge driven composite design optimization system includes a fifth device for modifying the ply definition to include features which locally modify the global ply solution. Preferably, the first through fifth devices are parametrically linked one to another, and the first through fifth devices operate in numerical order.

These and other objects, features and advantages according to the present invention are provided by a computer memory storing computer readable instructions for permitting a computer system to generate a design for a laminate part, the computer readable instructions including a parametric composite knowledge system (PACKS) for generating a globally optimized ply definition for a laminate part in accordance with laminate design transition rules, PACKS includes a connectivity subroutine for determining connectivity between a plurality of regions defining the laminate part responsive to the transition rules, a ramp definition subroutine for generating ramp features detailing interconnection of the regions defining the laminate part, and a visualization subroutine for displaying views and corresponding tabular data describing the laminate part and illustrating both inter-region connectivity and the ramp features as specified by a user, and further comprising a feature module including a subroutine for modifying the ply definition to include features which locally modify the global ply solution, wherein PACKS and the features module are parametrically linked to one another, and wherein PACKS and the features module are operated in that order as a "best practice".

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which:

FIG. 3 is a table comparing the material property characterizations associated with the flowcharts of FIGS. 1 and 2;

FIG. 6 illustrates the advantages of the analysis method of FIG. 2 over the conventional analysis method of FIG. 1;

FIGS. 7A and 7B collectively form a low-level block diagram of the knowledge driven composite design optimization process according to the present invention;

FIGS. 8A–8D collectively form a low-level block diagram of the Parametric Composite Knowledge System (PACKS) employed in the block diagram of FIGS. 7A–7B;

FIGS. 9A–9D collectively depict a first alternative subroutine for establishing ply connectivity in PACKS described in FIGS. 8A–8D;

FIGS. 10A–10E together demonstrate a second alternative subroutine for establishing ply connectivity in PACKS described in FIGS. 8A–8D;

FIGS. 11A–11E collectively illustrate a third alternative subroutine for establishing ply connectivity in PACKS described in FIGS. 8A–8D;

Figure 14G:
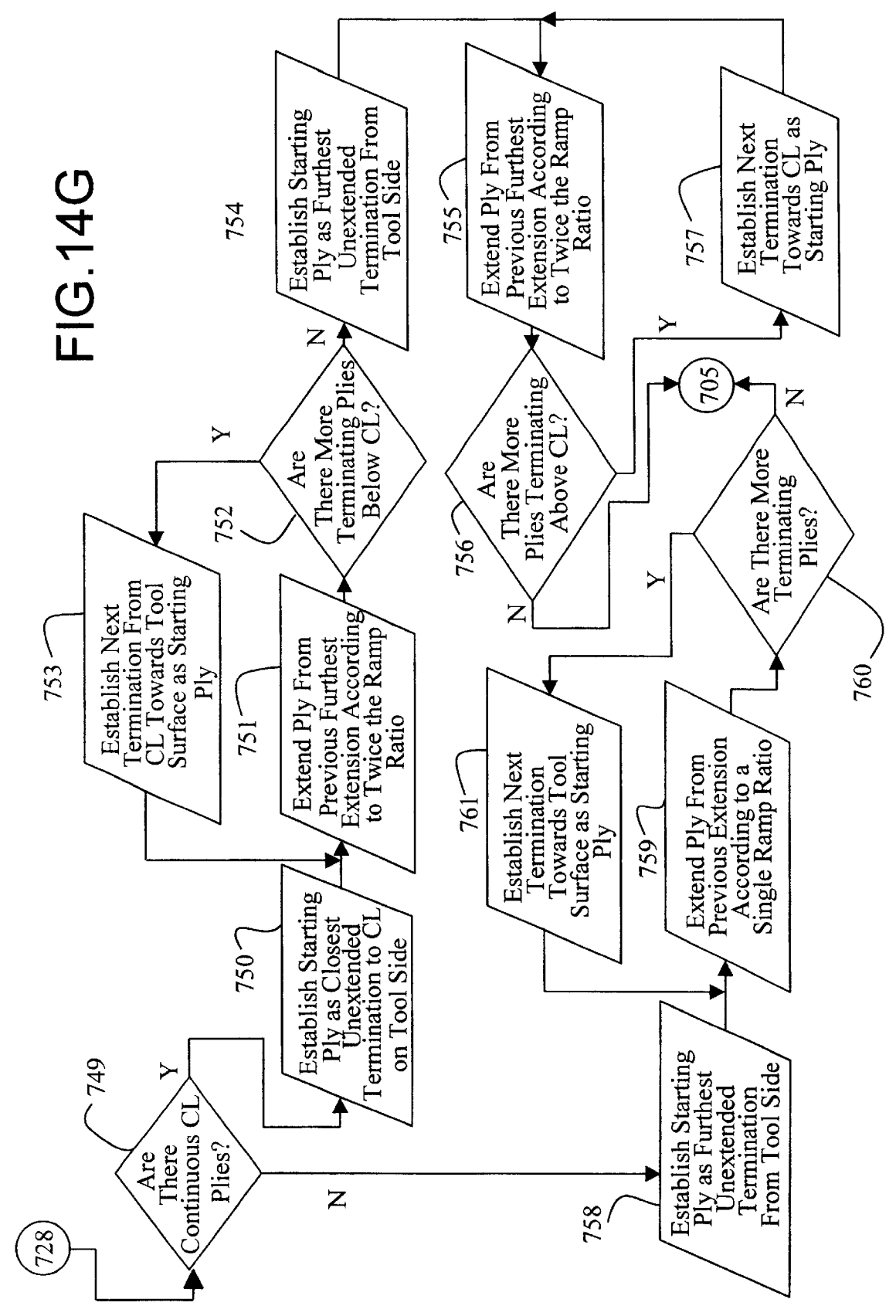

FIGS. 14A–14G collectively illustrate a subroutine for extending ply boundaries at the ply level according to PACKS depicted in FIGS. 8A–8D;

DETAILED DESCRIPTION OF THE PREFERRED EMBODIMENTS

The knowledge driven composite design optimization process according to the present invention was developed as a response to the inefficiencies noted in the conventional composite design process, which was described in detail above. These inefficiencies were discovered during the process flow evaluation. The process according to the present invention overcomes these deficiencies by building a single data structure for the composites definition that expands the current Design, Manufacturing and Producibility Simulation (DMAPS) goals for parametric design of composites and then refines the parametrics within the composite laminate definition to the ply level. This is the first key facet of the present invention, since plies are the lowest entities the manufacturing shop handles. Many of the errors that occur during the manufacturing process are due to the lack of understanding of ply location in three-dimensinonal dimensional (3-D) space and how these plies change (propagate or terminate) throughout the overall laminate structure. It will be appreciated that linking analysis and manufacturability to geometry at an early phase in the composite design process is an innovation allowed by designing to the ply level, which cannot be duplicated using conventional composite design techniques.

To integrate knowledge, a process must be consistently followed to known outcomes which meet "acceptable" user practices today. Advantageously, the present invention includes methodologies, hereinafter referred to as decision tracking methodologies, which yield results typically selected by users. The selection of standard options, order of selection, and the reference in which they are selected, also referred to as domain, are tracked using these decision tracking methodologies to (1) enable growth of the process and (2) identify areas for improving or streamlining the design process through the implementation of a "best" practice. The decision tracking methodology according to the present invention advantageously can enable a determination of which choice and in what order of selection yields the best results in the least number of iterative steps. As such, the knowledge driven composite design optimization process not only offers an improved way to design composites by capturing today's knowledge database, but also offers a mechanism for expanding that knowledge base through use of the composite design optimization process.

Figure 2:
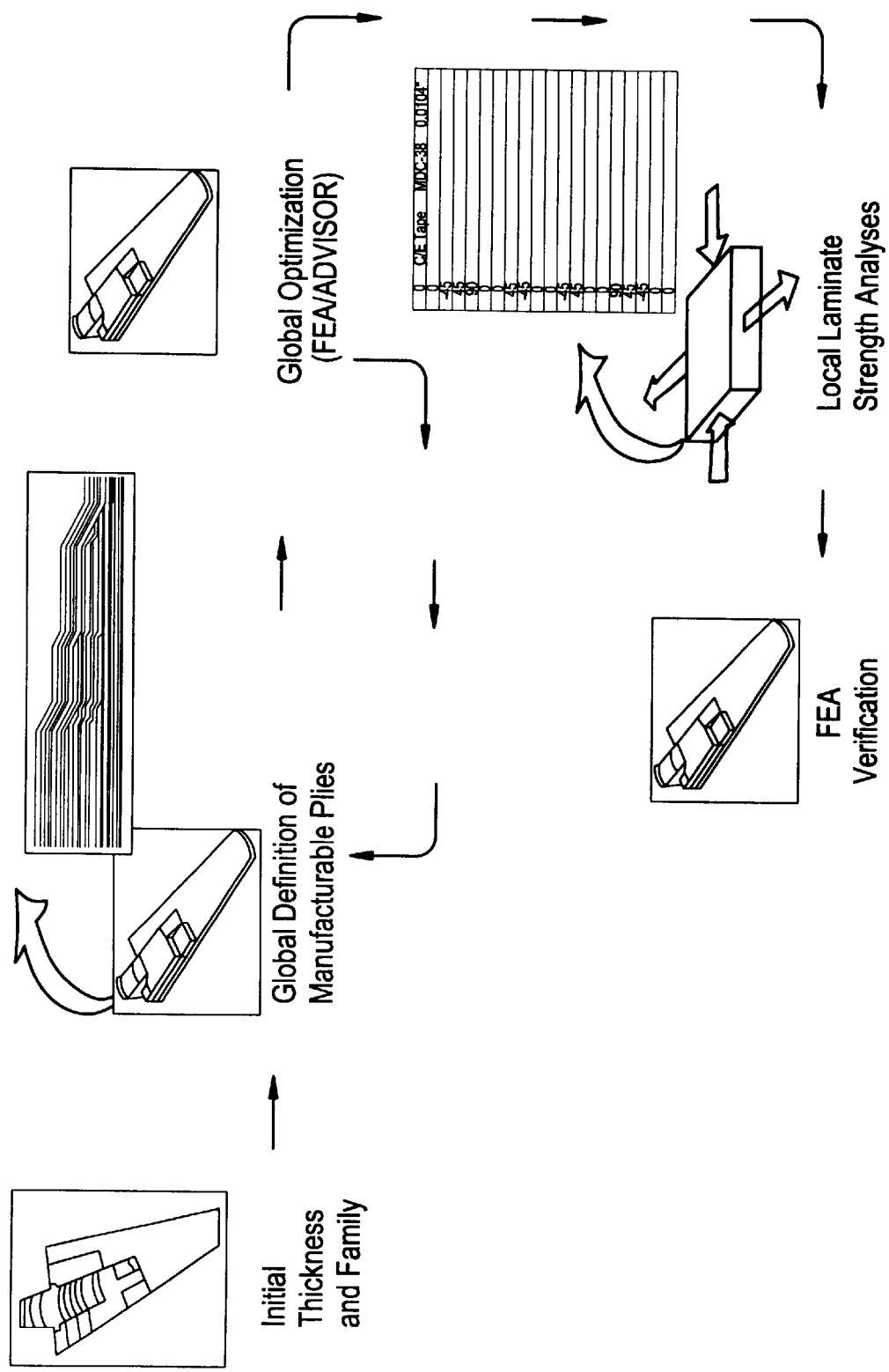
FIG. 2 is a high level conceptual flowchart illustrating a knowledge driven composite design optimization process according to the present invention.

The knowledge driven composite design optimization process according to the present invention preferably is initiated when the design team conceptualizes the new part geometry. Like the conventional composite design process, the first physical definition is initially described using a thickness map by which laminate families are identified. The present invention departs from the conventional composite design process at this point by focusing on the details of the plies immediately after these first assessments are made as illustrated in the flowchart of FIG. 2.

Figure 1:
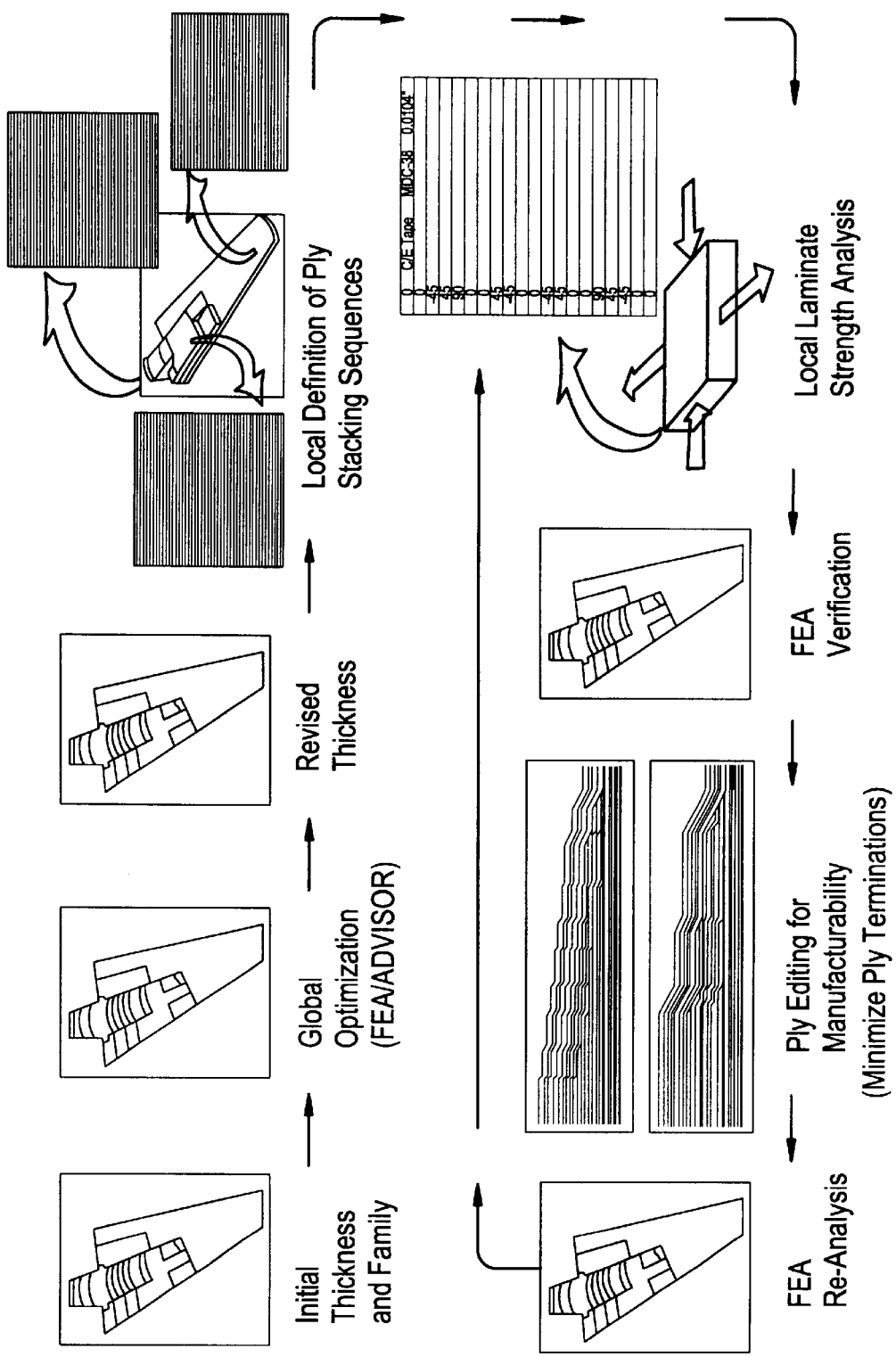
FIG. 1 is a high level conceptual flowchart illustrating a conventional analysis method employed during the composite design process.
Figure 4:
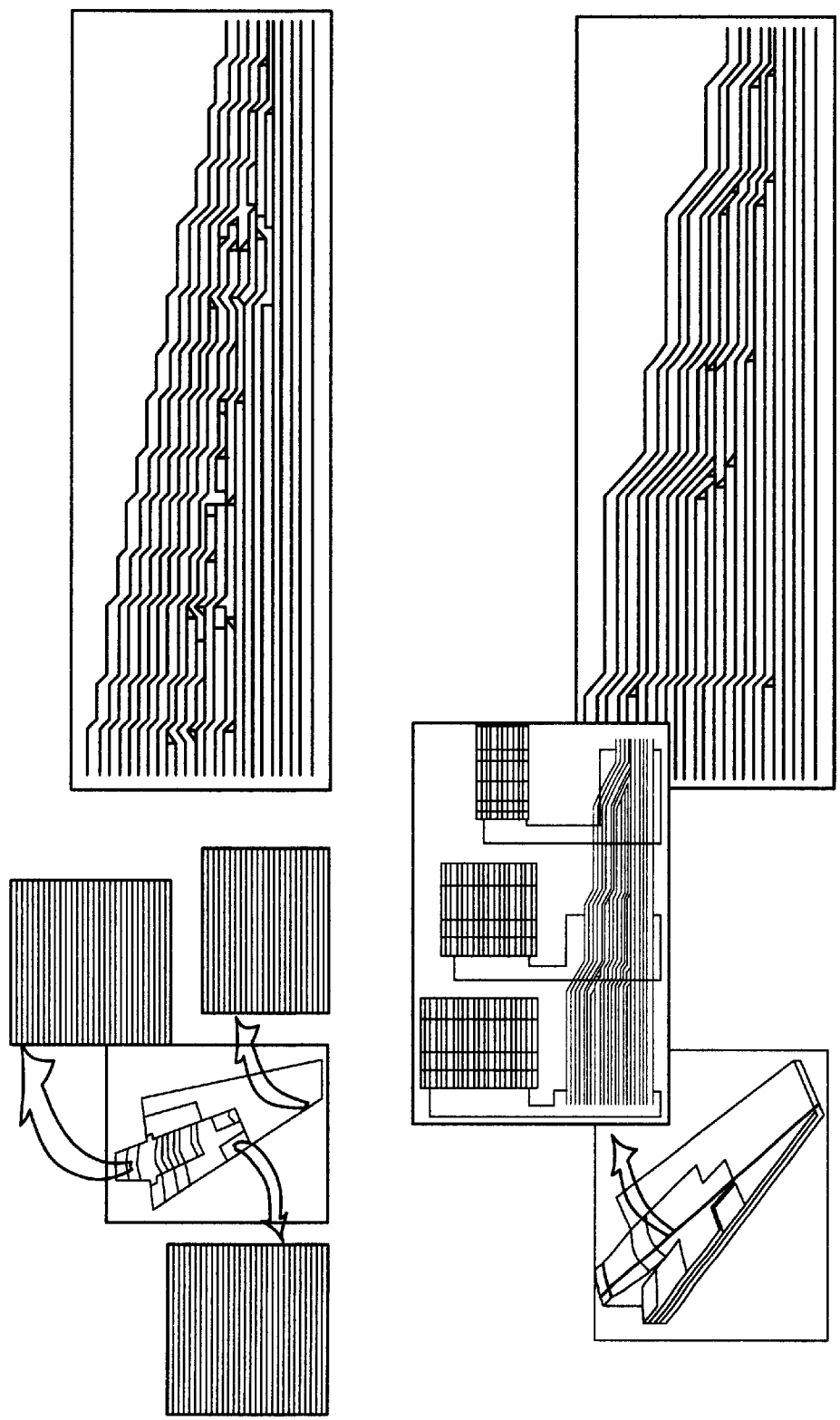
FIG. 4 illustrates local and global laminate optimization according to the methods of FIGS. 1 and 2, respectively.

Advantageously, focusing on the details of the plies forces the design team to immediately consider constraints of "reality" i.e., manufacturability, for a specific thickness, as illustrated in FIG. 3. As shown in FIG. 3, which illustrates one of the novel features of the knowledge driven composite design optimization process, the conventional design process focuses on the thickness of a single laminate part without consideration or understanding of the fact that there are a limited number of potential laminate families with material properties appropriate for the thickness of the material. As mentioned in connection with FIG. 1, the design team does not consider manufacturability until the later steps of the design process. Moreover, the focus on individual regions of constant laminate definition, without any attempt to consider laminate similarities in adjacent regions of constant laminate definition, leads to a large number of ply terminations within the composite part and, thus, poor connectivity between adjacent regions of constant laminate definition, as illustrated in FIG. 4. In contrast, focusing on the details regarding ply thickness early in the design process allows the impact of ply "connectivity" across regions to be examined in detail; this advantageously forces both the designer and the analyst to consider the same basic model.

The focus on the connectivity between regions of constant laminate definition identifies two more key aspects of the composite design optimization process: (1) consideration of which ply or plies within the stack terminate or continue; and (2) consideration of how changing the order of stacking within a region or regions can impact both the overall optimization process in other mating regions as well as the strength level of the composite laminate. It will be appreciated that the impacts on manufacturability and the overall strength of the laminate panels with respect to decisions regarding connectivity are extensive.

This portion of the process, i.e., the connectivity subroutine, establishes the order of manufacturing lay-up, size of the plies, and basic component weight. Iterations on connectivity are completed to optimize for three basic variables, minimum weight, largest ply size and acceptable strength. The most significant outgrowth of this ply level focus is that the inner moldline of the part is derived as a natural consequence of the process rather than defamed as a separate entity through geometrical manipulation of the single plane projections as in the conventional process. This connectivity subroutine describes what can be referred to as the conceptual phase of the composite definition process. The outputs of this new conceptual phase are significantly more detailed than are conventionally completed in industry for a composite definition.

Advantageously, the inner moldline of the laminate part can be derived through this knowledge driven composite design optimization process by virtue of the use of a disciplined process and parametrics, combined in an environment that encourages, or at least allows, reuse of the design data and produces a consistent design output. It will be noted that parametrics are extensively used today by industry to allow reuse of engineering information. It should also be mentioned that parametrics have never been applied to composites at the ply level, which is evident from the references briefly discussed immediately below.

First, it should be mentioned that the paper entitled "The A.S.U. Features Testbed: An Overview" by J. Shah, M. Roger, P. Sreevalsan, D. Jsiao, A. Mathew, A. Bhatnagar, B. Liou, and D. Miller, Department of Mechanical and Aerospace Engineering, Arizona State University, pp.233–241, describes a decade's worth of feature based design work. Definition of common terms like feature, feature hierarchy, attribute, compound feature, generic vs. instanced feature, parameter inheritance, geometric model, feature model, definition methodology, feature validation, feature interactions, and modeling shell are presented. It will be appreciated that this paper describes the theories that make feature based geometric reasoning function.

In one approach to laminate design discussed in a paper entitled "An Expert System for the Design and Analysis of Composite Structures" by Barry Davidson, Utpal Roay and Chris Ludden, Department of Mechanical, Aerospace and Manufacturing Engineering, Syracuse University, Syracuse, N.Y., Presented at "Rotorcraft Composite Manufacturing: Transition into the 21st Century," Sep. 21–23, 1993, the approach was limited in its ability to consider anything but flat plate geometry. The authors focus strictly on analysis selection of an optimal lay-up for a given design condition and a completely knowledge driven search for possible solutions. It will be appreciated that this aspect is embodied in the composite design optimization process according to the present invention in the "laminate designer" subroutine, which is a minor feature of the present invention. The described analysis selection of an optimal lay-up increases the speed of the review for numerous analytical solutions. However, it is not unique or developmental; it is only the rapid application of textbook analysis routines. In contrast, the knowledge driven composite design optimization process according to the present invention includes both preliminary and final (optimized) loops for analysis refinement. This unique aspect of the present invention facilitates the tight integration of geometry, using parameters for ease of update and sensitivity tracking, and the decomposition of the laminate to the ply level for refined visibility and sensitivity. The ply level integration allows the design team to integrate manufacturability into the analysis decision making process. This level of refinement is critical to achieving affordable and manufacturable designs. Moreover, without visibility into the details and/or features beyond the preliminary level, the system as described by Davidson et al. is limited and, thus, useful by single discipline users at best.

The paper "A Knowledge Based Expert System for Laminated Composite Strut Design," by C. Wu, Department of Applied Mathematics, City Polytechnic of Hong Kong, J. Webber, Department of Aerospace Engineering and S. Morton Department of Mathematics, University of Bristol, published in Aeronautical Journal, January 1991, addresses a more practical design process, i.e., gets closer to reality, by considering more geometric shapes.

However, the approach does not integrate or link design and analysis "real geometry," only generic representations. Moreover, the paper focuses mainly on analysis and optimization of the composite laminate. No decomposition or detailed assessments at the ply level are included. No manufacturability knowledge is included. No final designs are created with geometry. Thus, the paper merely describes an analytical tool. Thus, while the paper describes the theory for handling uncertainty in the design process, a truly practical design can only be provided by integrating multi-disciplined knowledge into the analytical optimization process along with geometric reasoning and visualization. See also, "Bolted Joints in a Laminated Composite Strut Design Expert System" by C. Wu, Department of Aerospace Engineering, University of Bristol, UK, published in COMPOSITE STRUCTURES 22 (1992) pp.63–85.

In "Trends in Engineering Software and Hardware—Knowledge-Based Expert Systems in Structural Design," D. Sriram, M. Maher, S. Fenves, Carnegie Mellon University, published in Computer & Structures Vol.20, No.1–3, pp.1–9, 1985, the current state of knowledge systems is reviewed. The paper attempts to describe an idealized system yet offers no application specific information and identifies no tool capable of achieving the goals outlined. Furthermore, "Analysis of Design Abstraction, Representation and Inferencing Requirements for Computer-aided Design" by Jami Shah, Mechanical and Aerospace Engineering, Arizona State University, and Peter Wilson, General Electric Company, Schendectady, N.Y., discusses laminate design from a focus of CAD systems, i.e., a system for documentation, drafting and specification of nominal geometry for finite elements and NC. The authors also describe the application of an expert system to design as lacking a sound geometry basis; the authors also limit their application to specific domains. The shortcomings identified by the authors are solved by the present invention, due to the present invention's characteristic focus on geometry integration for visualization along with the use of engineering knowledge throughout the definition process.

The paper entitled "An Expert System for Laminated Plate Design Using Composite Materials" by J. Webbei and S. Morton, Department of Aerospace Engineering and Mathematics, University of Bristol, Bristol, U.K., published in COMPUTERS AND STRUCTURES, Vol.37, No.6, pp.1051–1067, 1990, discusses the need for an expert system and its benefits for composites. The focus of this discussion is also on analysis, in that the authors identify the need to describe macroscopic mechanical properties which characterize the microscopic lack of uniformity of composites. The authors do not discuss geometry or have a system plan that is based upon the integration of geometry and analysis; the authors merely offer basic fundamentals taught by all universities to select optimum design in a single discipline design environment. This approach is not used in practice. In contrast, the knowledge driven composite design optimization process according to the present invention uses multi-disciplined knowledge in the system to assist the user in sensitivity assessments which identify key rules and impacts of changing them. Moreover, this design process uses the geometric parameters to link design, analysis and manufacturing requirements. This, in itself, is a novel feature of the present invention.

"Optimum Design of a Composite Structure with Manufacturing Constraints," by D. Costin & B. Wang, Dept. of Mechanical Engineering, University of Texas at Arlington, published in Thin-Walled Structure V17 (1993), pp.185–202, describes computer programs which produce multi-disciplinary optimization as expensive or impossible to produce. It should be mentioned that this work is of limited usefulness because of its limited focus to the laminate level analysis. The manufacturing constraints identified in this paper are limited to controlling the rate of thickness change between wing zones to control twists. This is not the most significant manufacturing constraint, although it is a valid one. The authors ignore ply level manufacturing constraints which are the true drivers of balanced "weight optimum and buildable" composite structures. The present invention incorporates an understanding that ply continuity is a key manufacturing constraint. Moreover, the authors suggest that their selected (optimum) designs are buildable, even though geometry was not integrated into the process. It will be appreciated that the buildable part had to be manually defined after the analysis process was completed, according to this reference.

In addition, the article entitled "Top-Down Construction of 3-D Mechanical Object Shapes from Engineering Drawings," by H. Yoshiura, Hitachi Research Laboratory, K. Fujimura and T. Kunii, University of Tokyo, published in COMPUTER IEEE Journal, 1984, pp.32–40, focuses on the need for a more efficient method for carrying out operations between objects such as intersections because the man/machine interface is the largest productivity obstacle in CAD/CAM systems. Thus, the article focuses on interpretive 2-D knowledge of "inatural language" to automatically create 3-D drawings. The authors do no work using knowledge systems; the authors create a solid given a 2-D drawing. According to one aspect of the present invention, a 2-D drawing is created once the system is given a 3-D definition. It should be mentioned that the hard part is facilitating the automatic development of the design; the documentation of the optimum design is relatively easy. Furthermore, the authors do not use parametrics in their work, nor do the authors care about associations between features and objects.

In "Interfacing Solid Modeling to CAD and CAM: Data Structures and Algorithms for Decomposing a Solid," by T. Woo, University of Michigan, Published in December 1984 issue of COMPUTER, pp.44–49, decomposition is referred to as the disjoint condition for solid elements of geometry of non-overlapping simplices. This is important for modeling in CAD/CAM systems. In contrast, the term decomposition according to the present invention refers to the parametric relationship between the composite laminate and the composite plies that are employed in fabricating the laminate. This paper also discusses the use of separation of geometry and topology to permit separate geometric processing and topological processing. This is an inherent feature in all modern CAD/CAM systems.

The paper entitled " Representation of Geometric Features, Tolerances, and Attributes in Solid Modelers Based on Constructive Geometry, by A. Requicha, Senior Member IEEE and S. Chan, published in IEEE Journal of Robotics and Automation, V RA-2, No.3, September 1986, pp.156–166, describes the limitations of Constructive Solid Geometry (CSG) modelers to integrate tolerancing, surface finish and other data that specify allowable inaccuracies of nominal geometry. It also describes how these variational data reflect the intended function of the described geometry representative of metallic designs, primarily. Various schemes or theories for integrating solid feature information into a modeler are also described in the paper. The limitations discussed in this paper are still present in all conventional modeler packages. Various knowledge based systems are attempting to bridge these gaps but none have been successful to date. These deficiencies prevent automatic planning, inspection and assembly operations from operating in the CAD environment. Simulation tools are attempting to bridge the gaps, yet are still immature.

Finally, the paper entitled "Memory Driven Feature-Based Design," by Y. Pao, F. Merat, G. Radack, Case Western Reserve University, Electrical Engineering and Computer Science, January 1993 (WL-TR.93-402 1), documents the Rapid Design System (RDS) under development at the Materials Directorate of Wright Laboratory. In particular, the modular architecture of the system is described. It should be noted that the goals of the system described in this paper are closely related to the goals according to the present invention; however, the paper focuses on the manufacturing aspects for automation, learning "neuralnet" associative memories, storage and retrieval approaches. In that respect, the system description shows the commonality of approach for knowledge systems.

It should be mentioned that all of the above-identified articles are incorporated herein by reference for all purposes to the maximum extent permitted. It should also be noted that the commonality of knowledge system architecture does not minimize or trivialize the significance of the selected approach for the inventive Knowledge Driven Composite Design Optimization Process and corresponding System. The unique aspects included in the composite design optimization process of the present invention address how various pieces are integrated with detailed knowledge developed to convert the 2-D information typically found in fabrication facility document data and produce 3-D designs while, at the same time, providing an insight into ply level details. By capitalizing on the traceability available with the use of parametrics, associativity and object relationships are tailored specifically to produce a robust product with automatic and manual override modes of operation. The incorporation of refined knowledge at the appropriate design steps is a key element needed for effective operation of the knowledge driven composite design optimization process and corresponding system. It will be appreciated that a similar system architecture would not inherently produce the same type of output or design efficiency in a composite design system.

As mentioned in the discussion immediately above, the composite laminate according to the knowledge-driven composite design optimization process advantageously can be controlled by global parametrics. Normally, the inherent termination and build-up of plies in a composite laminate creates a feature called ramp which is controlled by a mathematical relationship between the ply thickness and the laminate thickness, called a ramp ratio. In the knowledge driven composite design optimization process, the locations of the ramps are beneficially defined after connectivity is established by extending the plies in a specific order. It should be mentioned that fabrication facilities often have several, e.g., three, standard extension methods any one of which can be selected based upon manufacturing preferences. The level of discipline in the process and parametrics allow the composite design optimization process and corresponding system to identify manufacturing method specific variations of a geometric feature and tie the resultant ply level design to the process. This is also a major departure from current composite design methods. It will also be appreciated that this represents reduction to practice of a significant part of the design theory discussed in the literature, such as that briefly discussed above, for feature-based design of metallic composites.

Figure 5:
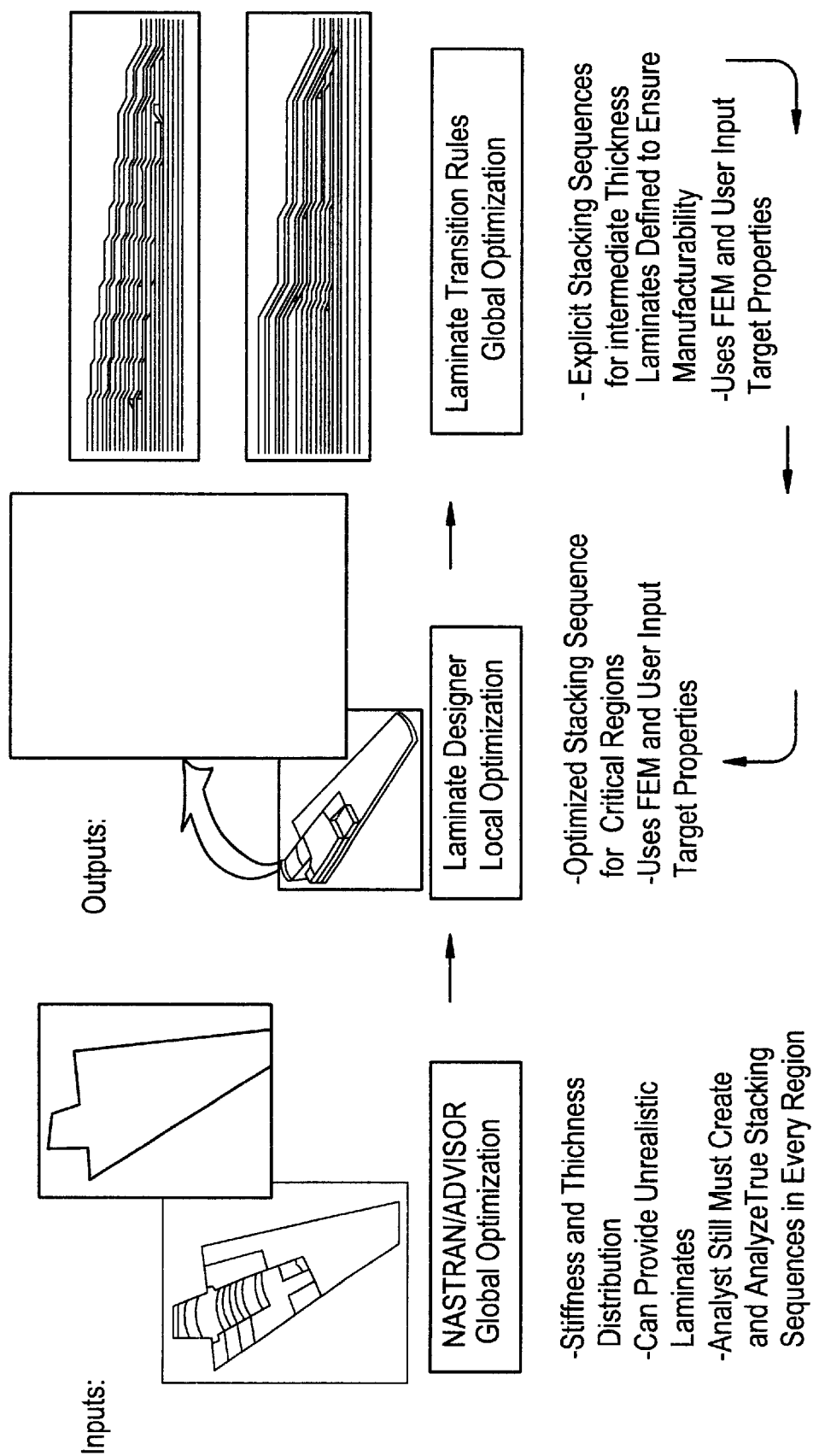
FIG. 5 illustrates the advantages of the composite cross section generated in accordance with the flowchart of FIG. 2.

It should be mentioned that a missing element of all the theoretical discussions for metallics and composites is how to develop a process providing the needed knowledge for optimal design in the best sequence to reduce the size and complexity of the optimization process. By focusing on plies earlier in the process, numerous iterations between design and strength advantageously can be eliminated. The new knowledge which was developed during the refinement of the knowledge driven composite design optimization process is related to how the design practices impact three-dimensional ply geometry. One such step, which has been identified as critical to the conceptual design process, is to use the "thickest" region within an optimization run while using the "thinnest" region to bracket the boundaries of the stacking sequence. More specifically, if the thinnest region is fully contained within the thickest region, then the intermediate thickness regions can be modified to ensure a highly manufacturable connectivity solution. See FIGS. 5 and 6, wherein FIG. 5 illustrates the advantages to the design team of having visual displays of the cross section of the laminate at the ply level and FIG. 6 contrasts the conventional laminate stacking sequence definition with the laminate designer subroutine according to one aspect of the present invention.

It will be appreciated that this methodology, which is conceptually presented in FIGS. 2–6, can easily be extended to allow successive iterations, e.g., from the thickest region to a thick region, from a thick region to a thin region, and from a thin region to the thinnest region. This methodology has been found to work on all evaluations of composites designed for F/A-18, C-17, and T-45 aircraft programs.

The number of possible combinations in the stacking sequence can be vastly reduced by realizing that it is preferred to build laminate parts that have a centerline symmetric ply definition. This is because the number of stacking sequences has an exponential relation to the number of independent plies, i.e., the number of possible stacking sequences is equal to the number of ply orientations raised to the power of the number of plies (orientations$^{plies}$) For centerline symmetric laminates the number of independent plies is approximately one half that of unsymmetric laminates, thus the exponent is reduced by a factor of approximately two. Advantageously, this number can be reduced further by implementing the realization that it is also preferable to employ balanced laminates, i.e., laminates with equal numbers of plus and minus orientation angled plies. Beneficially, additional knowledge exists in the form of guidelines: (1) detailing how many plies can be dropped in a location; (2) which ply orientations can be located next to another ply orientation; and (3) how many plies of any particular orientation can be located together. By using this information at the earliest possible step in the composite design optimization process, rework and redefinition advantageously can be minimized.

It should be mentioned that this latest group of the knowledge to be integrated into the composite design optimization process was taken from the standard practices of a single design and fabrication facility. It should also be noted that the composite design optimization process also bracketed the variance in a family allowed when transitioning between regions for tighter control of strength variation within the part.

The secondary features of the composite design optimization process and corresponding system advantageously include the characteristics needed to make the process robust while keeping the process tailorable for the specific finctional requirements of any particular part. These secondary features include refinements to the basic laminate definition. More specifically, the secondary features typically create only local changes in the laminate, primarily in the form of cutouts, i.e., holes, build-ups for fasteners, i.e., pads, and load transition regions such as step lap joints, etc. The knowledge regarding secondary features at the ply level provides a fundamental key to design reusability.

The specific steps of the knowledge driven composite design optimization process according to the present invention will now be described with reference to FIGS. 7A–17B, which collectively depict a series of step-down flowcharts, with increasing depth of discussion between FIGS. 7A–7B and 8A–8D, respectively. FIGS. 9A–16 illustrate details and alternative subroutines which advantageously can be employed in the flowchart of FIGS. 8A–8D while FIGS. 17A–17B expand upon a step employed in the flowchart of FIGS. 7A–7B.

Before looking at FIGS. 7A–7B in detail, it should be mentioned that it is the composite design optimization process, taken as a whole, which provides the true advantages with respect to composite design processes. Whereas conventional composite design endeavors utilize many steps similar to those of the knowledge driven composite design optimization process according to the present invention, these conventional steps were implemented in only a haphazard and ambiguous way, if these conventional steps were implemented at all. As illustrated in the composite design optimization process overview of FIGS. 7A–7B, the present invention establishes how and where the specific revisions to the conventional design process occur.

In the analysis optimization, it is necessary to introduce properties for actual, manufacturable global laminates. This is outlined in detail in FIGS. 8A–8D, and in the subsequent flowcharts of FIGS. 9A–16. FIGS. 8A–16 illustrate the key innovation of establishing 3-D plies, i.e., designing to the ply level. Since connectivity, i.e., determining how the plies in a local laminate connect to the plies in adjacent local laminates, is crucial to establishing 3-D plies, it will be noted that a total of five distinct subroutines for establishing the connectivity are presented in FIGS. 9A–13C. It should be mentioned that these subroutines of the knowledge driven composite design optimization process have been developed to produce laminates which follow certain rules of "best" practice, such as distributing ply terminations and terminating plies toward the centerline whenever possible. Within these five subroutines, there advantageously can be a tremendous number of potential variations in the plies allowed, since the designer can freely select from the various subroutines to be performed. Thus, the designer has the flexibility to perform tradeoff studies to identify preferred connectivity solutions while tracking the specific method by which each solution was obtained. It will be appreciated that this innovative characteristic allows improved documentation of the composite design optimization process.

Although most features are defined in subsequent operations, as will be described later, ramps are an integral feature of every ply and thus are calculated with the base laminate. Ramps are produced because the occurrence of more than one ply termination at a specific location is not a good practice. Rather, the plies are extended slightly such that the ply terminations form a gradually sloping thickness transition. To truly design to the ply level, one must establish which ply boundaries should be extended to create these ramps. The subroutine needed to define these extended boundaries is outlined in FIGS. 14A–14G. This subroutine embodies several alternative methods for extending plies, depending on the requirements and geometry of the component. Again, the innovation lies in the systematic and well-defined approach which ensures a consistent and trackable extension mechanism.

Attempts at laminate optimization described in the open literature fail to realize that one cannot optimize every local laminate if an economically manufacturable component is required. It is a wasted effort to optimize each piece, without consideration for how the pieces fit together. These local optimizations are used judiciously with the new approach identified within this process, called Transition Rules, to achieve an optimal global solution. Connectivity using the methods described previously is powerful, yet it is merely a shadow of the power possible by redefining local stacking sequences to achieve optimal, manufacturable ply definitions. The process for this is also outlined in FIGS. 9A–16 and will be referred to as Transition Rules.

Connectivity attempts to join existing local laminates in the best way possible. Transition Rules, on the other hand, redefine the local laminates into specific patterns to ensure optimal connectivity. It should be mentioned that these techniques have never been outlined previously. One innovative canon of the knowledge driven composite design optimization process is in the realization that if successively thinner laminates only contain plies contained in thicker laminates, then one can be assured that the thinner laminates will connect well to the thicker laminates. It will be appreciated that one can vary the outcome of the Transition Rule by varying the starting and ending laminates. Moreover, the outcome of the Transition Rule will be affected by varying key parameters governing the rule, e.g., varying the number of adjacent terminations allowed, varying the family characteristics, and varying the number of continuous plies at either moldline or centerline, or both. Thus, the designer advantageously has the control of the composite design optimization process needed to conduct tradeoff studies while maintaining a trackable path to document the overall design process. It should be mentioned that the starting and ending laminates can be modified either by hand, by interacting with external codes, or by local optimization performed using the so-called laminate designer subroutine, as will be discussed in greater detail below with respect to FIGS. 15A–15E and 16. It should also be noted that the Laminate Designer process is also an innovation, allowing all families and stacking sequences within a given range to be evaluated in order to optimize the local stacking sequence. Although this can be a time-consuming process, the process becomes feasible because the process is only performed for critical regions of the overall design.

Figure 17A:
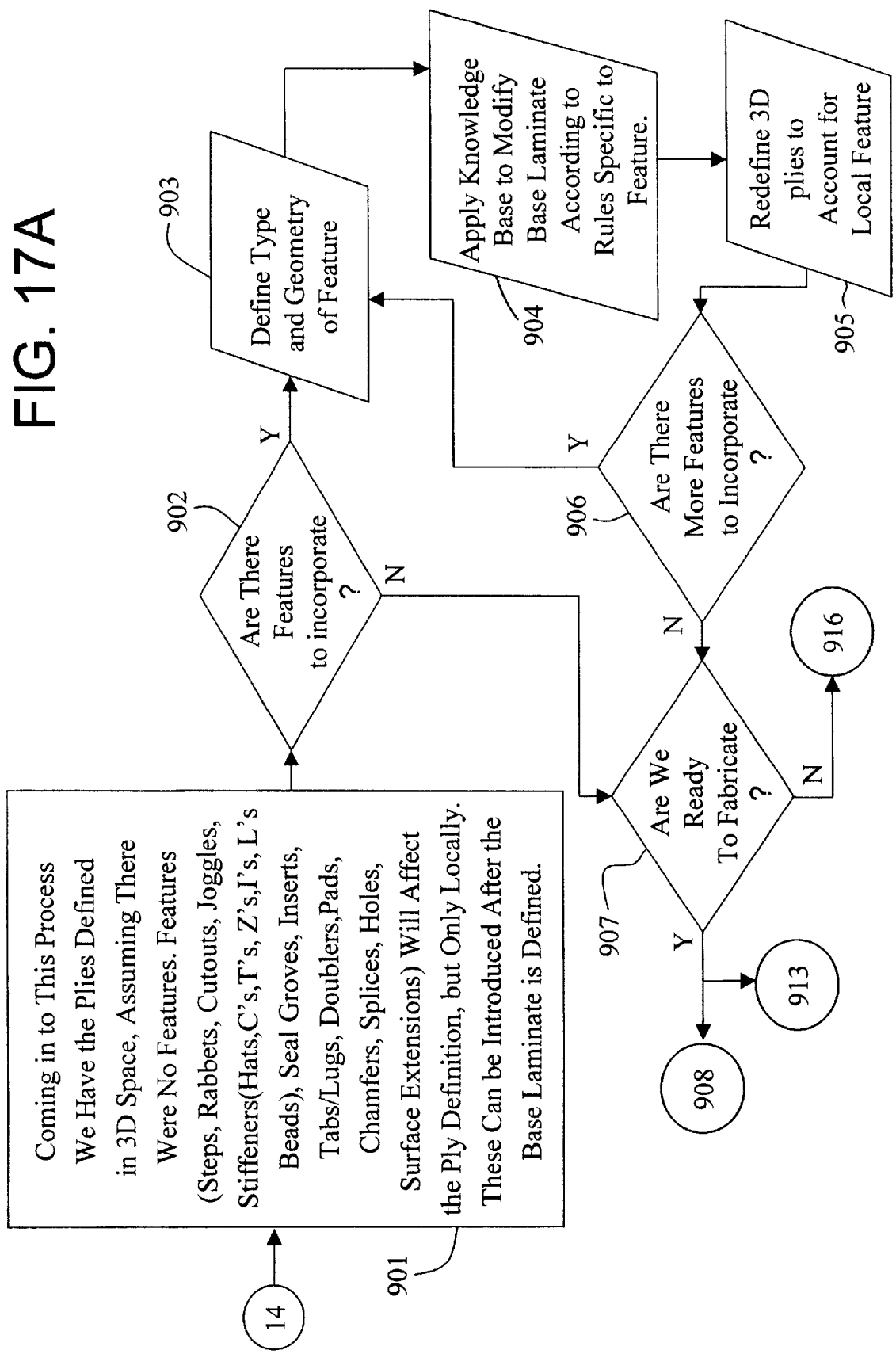
FIGS. 17A–17B collectively form a detailed flowchart of the subroutine corresponding to step 14 in FIGS. 7A–7B which advantageously can be employed to incorporate feature information into the globally optimized laminate design.
Figure 17B:
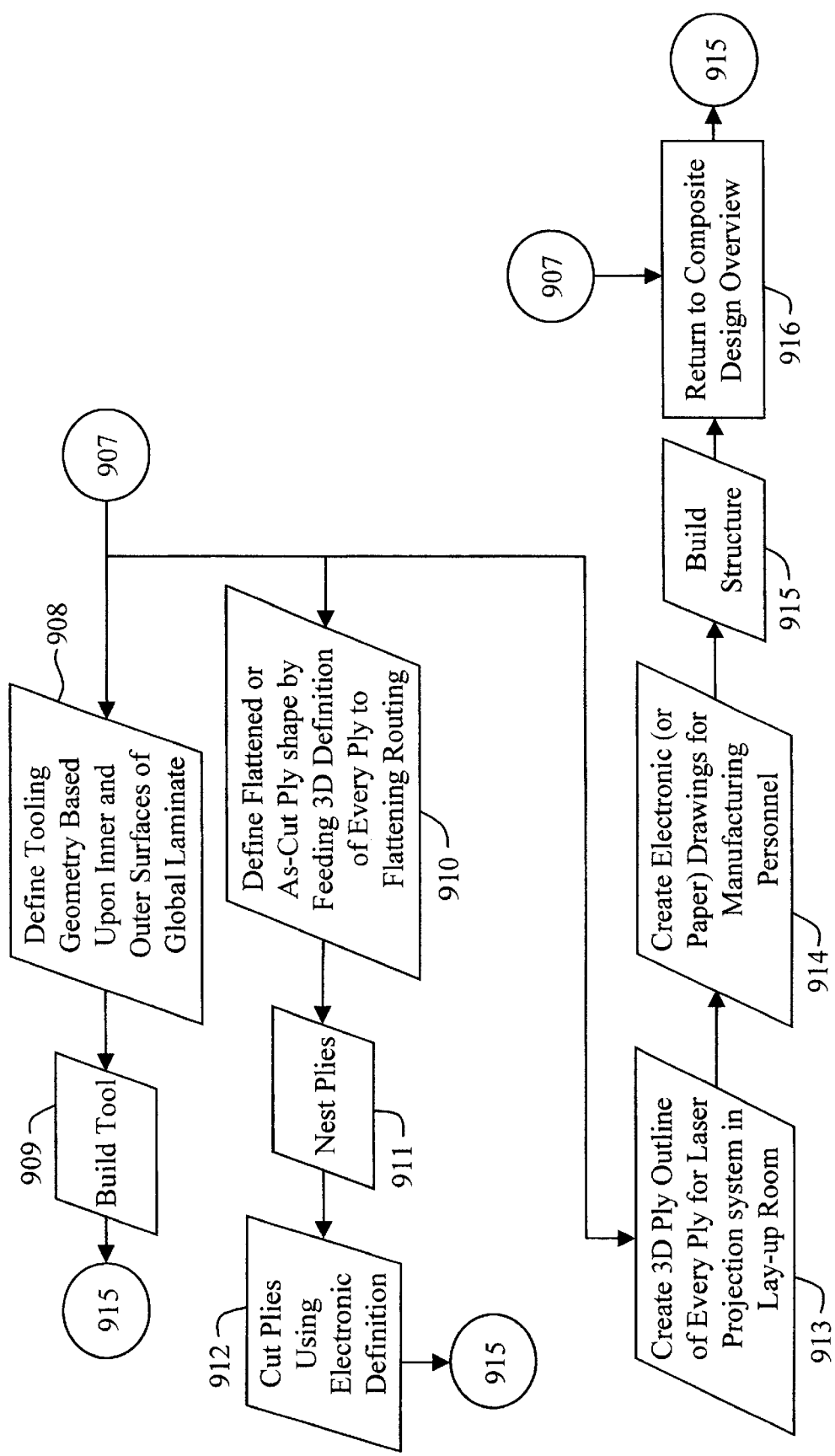

The final innovations are outlined in FIGS. 17A–17B. It will be noted that, first and foremost, the process flowchart illustrates a subroutine by which local features, e.g., holes, are incorporated into the global laminate only after the basic global laminate advantageously has been defined. One of ordinary skill in the art will appreciate that this is possible because, while each feature affects the global laminate, each feature affects the global laminate only locally. Thus, the designer preferably is able to define a set of rules governing the behavior of each specific feature, e.g., how the incorporation of a particular feature into the overall design will affect the global laminate.

The remaining innovations in the knowledge driven composite design optimization process involve manufacturing; the composite design optimization process includes specific requirements for ensuring manufacturability in the knowledge driven composite design optimization process flowcharts. It will be understood that separate databases are currently being used for tooling, ply flattening, i.e., projection of the as-laid-up plies onto planes to determine the cut shape prior to lay-up, ply nesting, laser projection, wherein outlines of the individual plies are projected onto the tool surface during lay-up to facilitate proper alignimnent, ply cutting, and the creation of manufacturing drawings. This occurs because each group involved in the overall design and fabrication effort uses different variations of the data, i.e., none of the groups consider the actual plies. Designing composites to the ply level, which necessitates using the outlined knowledge driven composite design optimization process, enables all of the data required for each of these distinct operations to be stored to and retrieved from a single database.

As discussed above, a knowledge driven composite design optimization system would be beneficial in reducing the manual work of the design and analysis team and in allowing the team to develop an understanding of the benefits of knowledge driven systems. A secondary advantage of the knowledge driven composite design optimization system is in organizing the knowledge required for feature-based design of composites using parametrics with a focus on:

(1) Composite laminate design;

(2) Documentation of ply organization;

(3) Decomposition of a laminate into composite plies in 3-D space;

(4) Automated section cut creation at interactively picked locations; and (5) Automated drawing presentation.

It should be mentioned that the knowledge driven composite design optimization software, which advantageously can be stored on a record medium, e.g., a hard disk or CD-ROM, beneficially converts a general purpose computer system, such as that running a conventional CAD program, into a special purpose computer system, i.e., a knowledge driven composite design optimization system. Hereinafter, the term "system" will be used to designate both the composite design optimization software program and the special purpose computer system running the composite design optimization software program.

Preferably, the knowledge driven composite design optimization system is a feature-based, parametric, knowledge-based system for design automation of composite laminates, which incorporates a geometrical reasoning engine supported by a knowledge-base to automate the design and layout of the plies based upon the surface geometry and the associated structural loads. The input to the system preferably includes the external surface geometry of the part or panel, and the associated finite element model, along with the internal loads computed as a result of the applied loads.

The knowledge driven composite design optimization system advantageously can be organized in two modules or program blocks that perform the various functions leading to the composite plies parametrically defined and located in 3-D space, in addition to the computation of geometry for the bounding surfaces to facilitate data transfer to manufacturing activities. The composite design optimization system preferably implements composite laminate design rules along with interfaces enabling electronic access to help, additional information, and advice. It should be mentioned that the user retains the ability to override optimization logic and warnings through the user interfaces.

Referring to FIGS. 7A–7B, an overview of the composite design optimization process will now be presented in detail. The process according to the present invention starts with step 1, in which basic design requirements are defined and step 2, in which the structural concept definition for the part takes place. During step 3, the design space itself is designed, thus limiting the possible portion of total design space from which an optimal design solution can be obtained. Moreover, during step 4, meshable geometry is created and, during steps 5 and 7, the meshable geometry is loaded into a database, e.g., the Design, Manufacturing and Producibility Simulation (DMAPS) database.

In parallel with updating the DMAPS database, the mesh geometry is prepared for finite element analysis (FEA) during step 6. Afterwards, historical loads, geometry information, and material properties are applied to the prepared mesh geometry during step 8 and global FEA optimization with respect to thickness distribution is performed during step 9. Subsequently, global beam and panel optimizations advantageously are performed during step 10. Preferably, the Parametric Composite Knowledge System (PACKS) module, i.e., the subroutine wherein the design of a manufacturable component with graphical interrogation is performed, receives the results of the optimization processing from step 10 and establishes 3-D plies in step 11, as discussed in greater detail below. The composite design optimization process then advances to step 12.

During step 12, a global ply definition is defined. The process then determines whether the design is optimized in step 13. If the answer is negative, the process updates the FEA mesh using new properties and/or parameters during step 18 and loops back to the start of step 9. When the answer at step 13 is affirmative, an additional subroutine of PACKS is performed, wherein features are incorporated, the mesh geometry is updated and a build-to data package is generated during step 14. During steps 15 and 16, the database properties advantageously are modified and the DMAPS database is updated, respectively. Lastly, the parametric geometry model preferably is updated during step 17.

In short, the initial laminate definition for the part or panel is calculated from the finite element model mesh with base system rules for connectivity. After viewing this laminate, the user can make modifications to the laminate. These modifications allow the user to try several scenarios, analyze alternatives to the input laminate, or simply refine the original design without starting the finite element and drafting/design processes over again.

The PACKS module, which is invoked at step 11, requires three inputs, which contain the definition of the geometry, materials, and laminate arrangements for a given project. In addition, a fourth, optional input is the loads file resulting from analysis of the finite element analysis (FEA) mesh. Preferably, the design surface or geometry, i.e., the outer moldline of the laminate, can be provided as a UNIGRAPHICS (™) NURB-128 or an IGES-formatted file. It will be appreciated that these file formats are well known to one of ordinary skill in the art; further discussion of file formats will be omitted. Moreover, the laminate definition includes the laminate geometry, ply stacking sequence, ply materials, (and hence thickness), and ply orientation. Advantageously, the laminate definition can be obtained from the finite element model mesh. Preferably, the FEA mesh defines the geometry of each element in the laminate stack, gives the ply stacking sequence used in the analysis, and provides references for each of the coordinate systems used in the file. To maintain a consistent database within the analysis, the knowledge driven composite design optimization system advantageously can obtain all required information from the analytical database, e.g., a PATRAN (™) database, directly. This will ensure correlation to related versions of the finite element model. The system will record the filename and date of the source file in the analytical database so that the user will know the source of the original laminate definition.

Other input capabilities can be included in the knowledge driven composite design optimization system. For example, a sketcher input subroutine can be included to allow the user to draw the laminate definition instead of obtaining it from the FEA mesh. Moreover, the user advantageously can input region boundaries from the UNIGRAPHICS (™) CAD program as part of the laminate definition. Furthermore, the internal loads obtained from the NASTRAN (™) finite element solution can be retrieved from a direct query of the analytical database. It will be noted that the elements in the loads preferably correspond to the elements defined in the FEA mesh. It should also be mentioned that this input is required only when the user wishes to visualize the load distribution or use the laminate designer subroutine, discussed in greater detail below, for stress checks.

Advantageously, in order to provide for efficient use of the composite design optimization process and corresponding system, and to facilitate debugging of errors in the input files, the system includes one or more subroutines to verify the content and format of the input files. Specific checks include, but are not limited to, checking for the presence of unsymmetrical laminates, the presence of gaps or discontinuous elements, the absence of required element properties, i.e., thickness, laminate definition, surface correlation, material properties, and coordinate references, as well as for consistency of element normals.

In order for the user to directly edit the laminate, the composite design optimization system advantageously allows the user to add, remove, or change a ply in the active model. The user may also modify the ply's thickness, orientation, or material. Preferably, the composite design optimization system determines the effect of any direct edit on the geometry of the other plies in the laminate, allowing the laminate to be regenerated automatically.

It will be appreciated by one of ordinary skill in the art that laminate regions are continuous sections of identical laminate definition. For a specified region, the user advantageously can change the number of plies, or the target family, i.e., the ideal percentages by volume of the different directional constituents in the laminate. Preferably, the laminate family includes plies oriented at up to four orientations: zero; ninety; forty-five and negative forty five degrees from their defined zero axis, which axis is defined in the FEA data. Thus, a laminate family identified by the nomenclature "50/40/10" includes 50% 0° oriented plies, 40% oriented plies and 10% 90° oriented plies. The system advantageously allows the user to modify the new target family by selecting a region and specifying the new target family or specifying the target family for a number of regions at once.

Additionally, the user can edit transitions in the laminate families within a component to achieve the target family or to minimize ply terminations. This function can be accomplished by incorporation of rules for generating intermediate families given a description of a starting thick section lay-up and an ending thin section lay-up, and the rules for ply transitions there between.

Laminate lay-ups within a region advantageously can be determined by selecting the whole ply solution which minimizes the average variance from the target family of that region. It will be appreciated that the variance can be determined by computing the absolute difference in percent content between each directional constituent and the corresponding target. By default, the tool permits a 5 percent variance from each directional constituent in the target family. The user beneficially may specify a different allowable variance. Preferably, the system also enforces a global minimum and maximum percentage makeup for all directional constituents in all regions, these values being 7 percent and 55 percent, respectively, by default in an exemplary case. However, the user can freely input their own minimum and maximum percentages.

Advantageously, a number of rules and best practices for section lay-ups, ply dropoffs, and ply extensions are incorporated into the composite design optimization system. These rules are generally enforced during laminate editing by the user, although some rules are fixed while other rules may be overridden, customized, or even turned-off in accordance with the user's current needs.

It should also be mentioned that all potential families for a given number of plies are determined by the knowledge driven composite design optimization system and corresponding process. The family with the least average absolute difference from the target is denoted the selected family which controls the orientation of the plies that must terminate from the next thickest region. In the event that the target family for a given region cannot be reached within the allowed variance, then the tool determines if the target can be reached by dropping fewer plies. If no acceptable family is found after the thickness is increased up to and including the thickness of the thickest adjacent region, then the user is presented with the following options:

(1) use the lay-up of the adjacent region;

(2) use the closest target outside the defined variance; or (3) redefine the target and/or variance of the region in question. Where transitions between two laminate regions are necessary, there are rules governing which plies should be terminated, and how far to extend these plies prior to termination. These rules will be discussed in greater detail below.

Figure 8B:
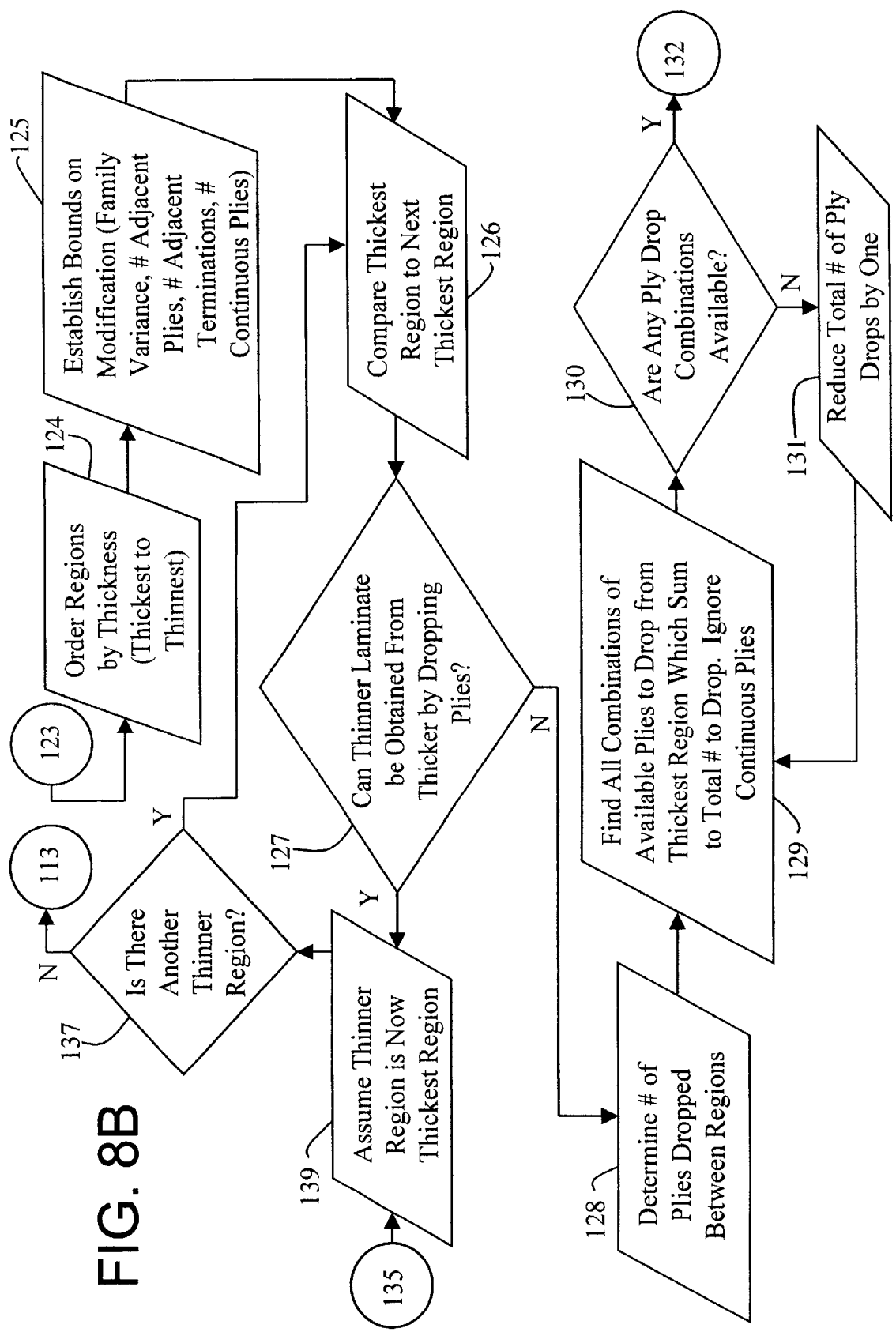
Figure 8C:
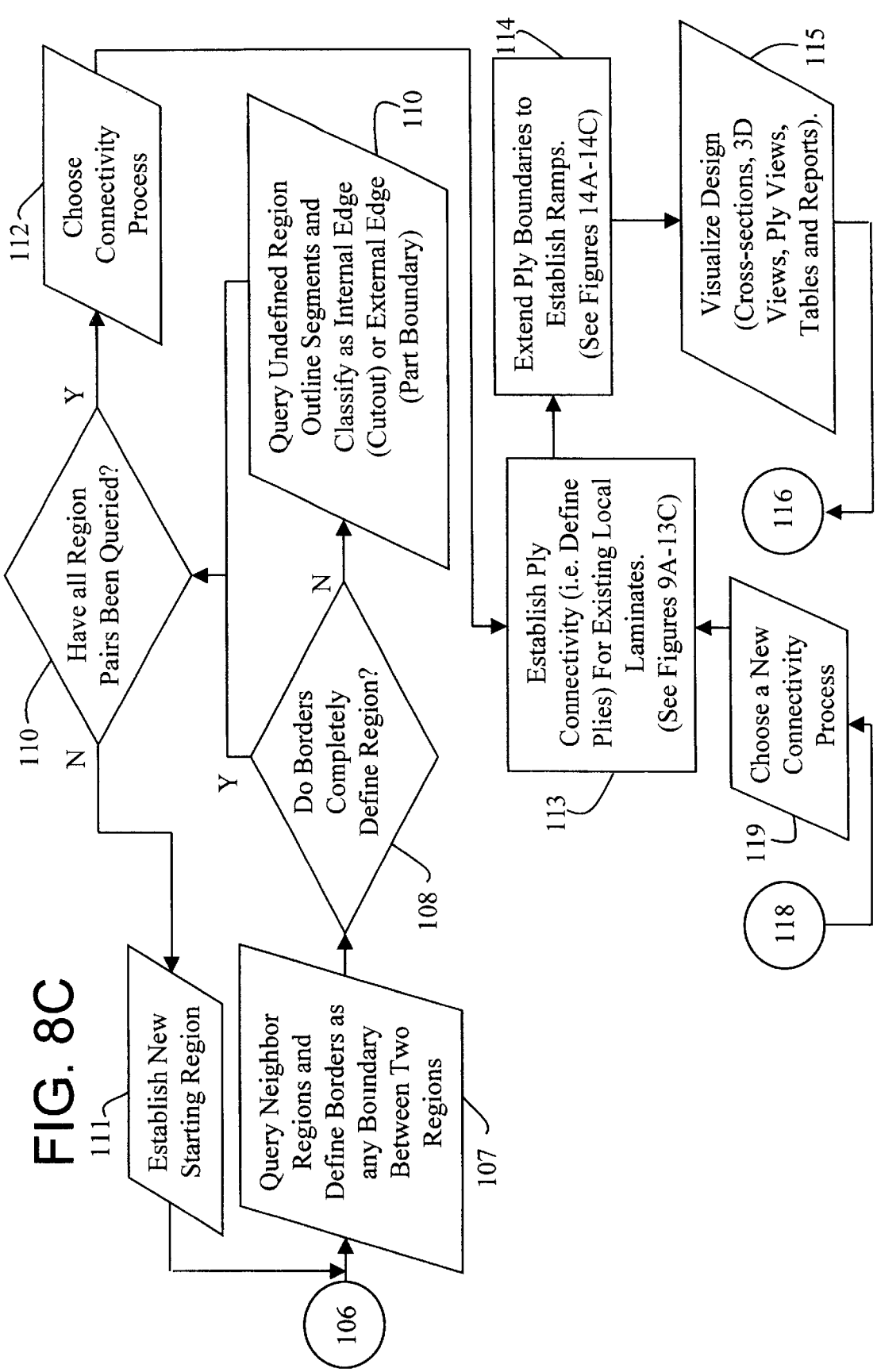
Figure 8D:
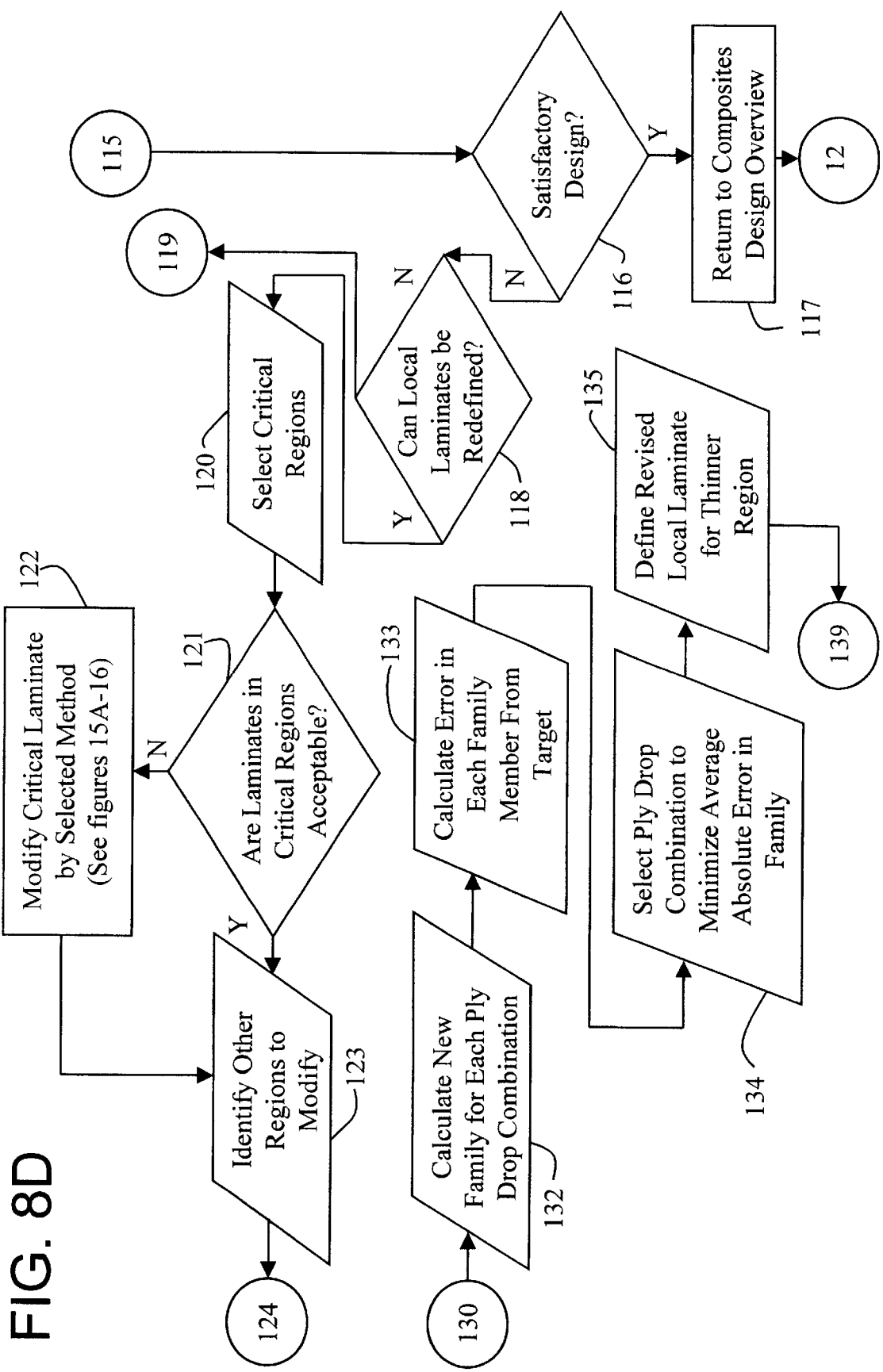
Figure 9A:
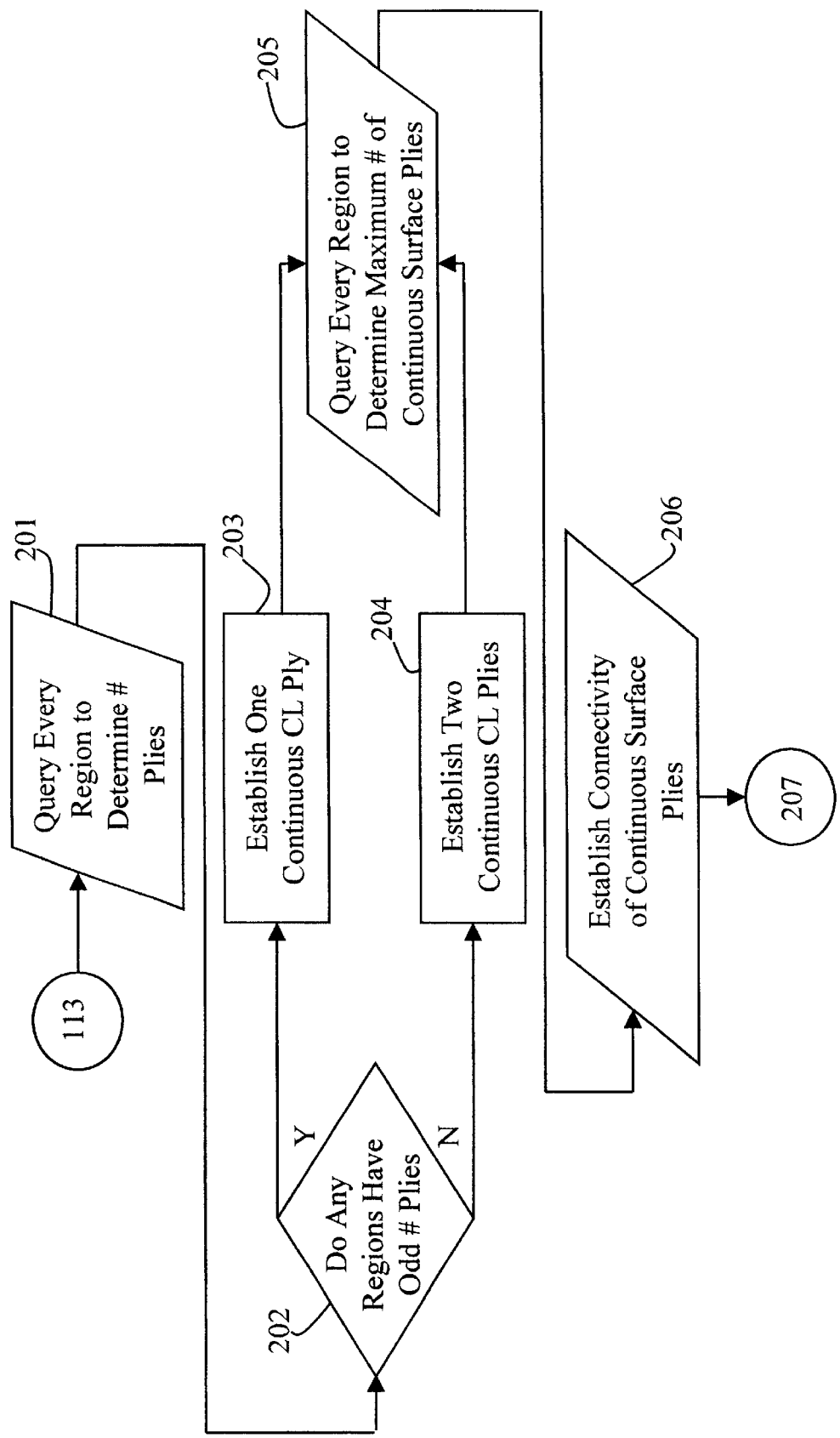
Figure 9B:
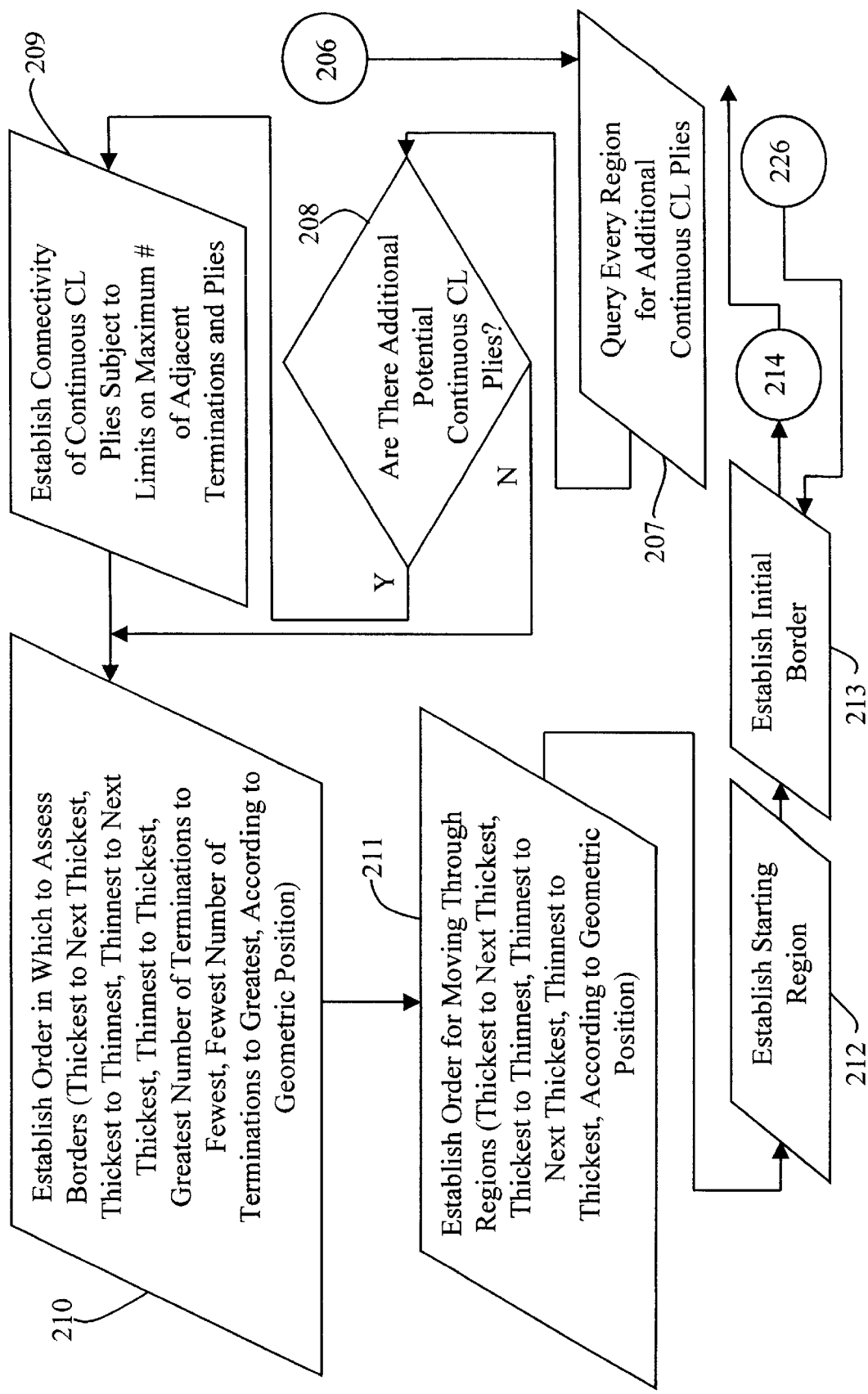
Figure 9C:
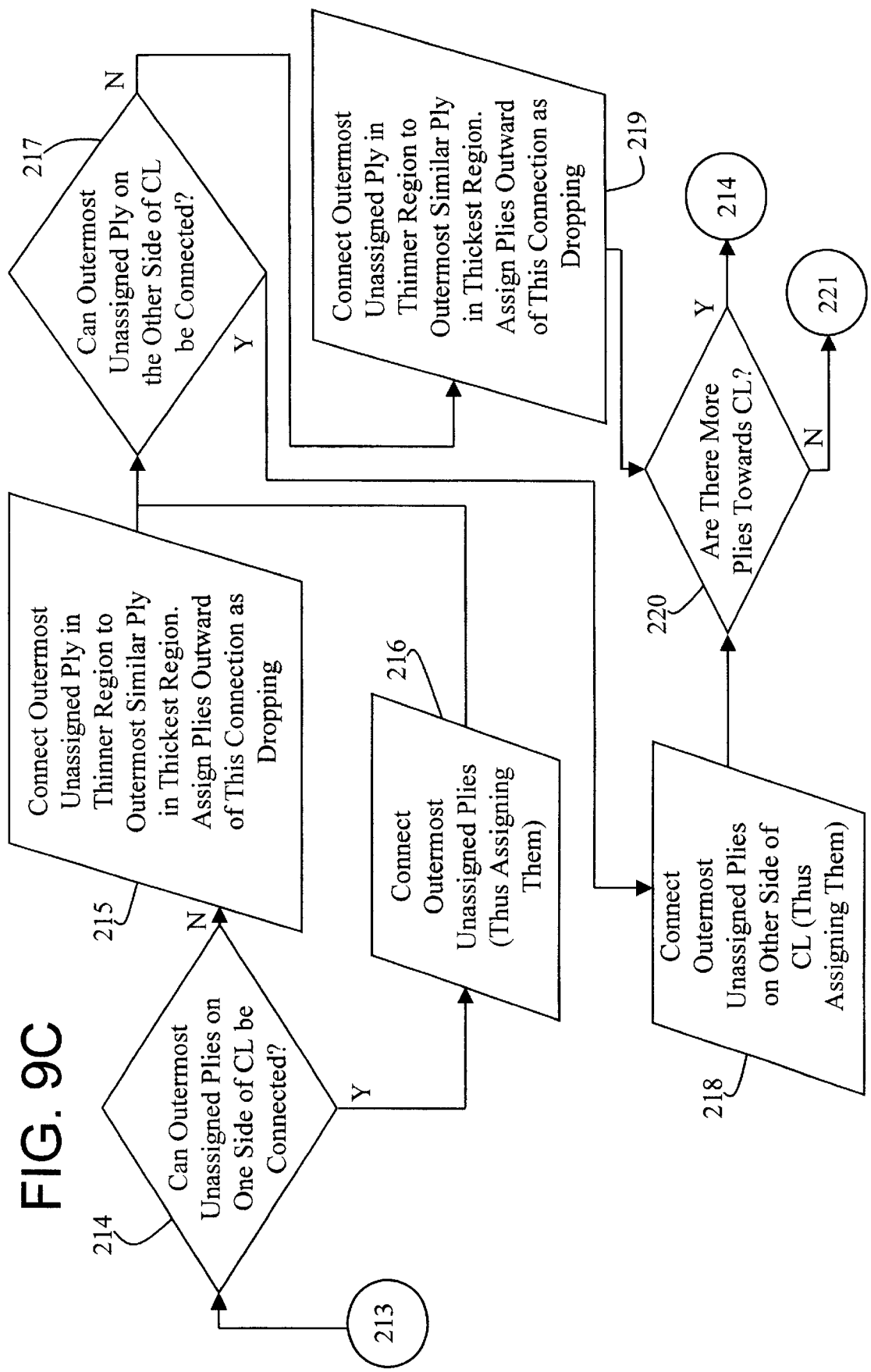

Referring specifically to FIGS. 8A and 8D, which collective illustrate the program module generally comprising step 11 in FIGS. 7A–7B, PACKS advantageously includes the fundamental steps for establishing the 3-D plies used in the knowledge driven composite design optimization process according to the present invention. As discussed above, optimization requires the introduction of properties for actual, manufacturable global laminates, i.e., the key innovation of establishing 3-D plies which allows designing to the ply level. Since connectivity, i.e., determining how the plies in a local laminate connect to the plies in adjacent local laminates, is crucial to establishing 3-D plies, it should again be mentioned that a total of five distinct subroutines for establishing the needed connectivity are presented in FIGS. 9A–13C and discussed in greater detail below. It should also be mentioned that these subroutines of the knowledge driven composite design optimization process have been adapted to produce laminates which follow certain rules of "best" practice. Finally, it should be noted that these five subroutines are alternatives; the design team can freely select from the subroutines. All of these variations, including a variation produced by selecting steps from among the alternative subroutines illustrated in FIGS. 9A–13C, are considered to be within the scope of the present invention.

During step 100 of the subroutine of step 11, the surface, the material distribution of laminate families and the thickness of the laminate parts advantageously are designed while, during step 101, the model is queried for geometry and materials. At step 102, the starting location on the surface of the object being designed is established. During steps 103 through 105, an iterative loop is established whereby all adjacent areas of identical laminate definition are connected into regions (step 103), a determination as to whether the entire surface has been defined as the regions are made (step 104) and, when the answer at step 104 is negative, a new starting location on the surface is established (step 105), and the subroutine loops back to the beginning of step 103. When the answer is affirmative, a starting region is established during step 106.

During step 107, neighboring regions are queried to permit borders, which are defined as any boundary between two regions, to be established. At step 108, a determination is made as to whether or not the borders completely define the starting region. When the answer is negative, undefined regions are queried, segments are outlined and classified as internal (cutout) or external (part boundary) edges during step 109. After step 109 has been completed, or in the event that the inquiry at step 108 is affirmative, the subroutine jumps to step 110 and a determination is made as to whether all region pairs have been queried. When 10 the answer is negative, a new starting region is established (step 111) and the subroutine loops back to the beginning of step 107. When the answer is affirmative, the applied connectivity process advantageously is chosen during step 112.

Preferably, ply connectivity is established, i.e., defined, for existing local laminates during step 113. As mentioned above, determining the connectivity between laminate panels entails specifying which ply or plies within each laminate stack terminate or continue and determining the impact of changing the order of stacking within a region or regions. It will be appreciated that the impact can be on both the overall optimization process in other mating regions as well as on the strength level of the composite laminate. It will be appreciated that the impacts on manufacturability and the overall strength of the laminate panels with respect to decisions regarding connectivity are extensive.

It should be noted that the choice for which of the plies will be terminated preferably is governed by the position of each of the plies within the laminate stack. In an exemplary case, the plies closest to the centerline can be dropped first, within the constraints of the defined number of continuous plies at the centerline. The default number of centerline plies advantageously can be determined by a query of selected thick and thin regions. If both of these regions are defined by an even number of plies, then the default number of centerline plies beneficially can be set to two. If either region is composed of an odd number of plies, then the default number of centerline plies preferably is one. Moreover, the default number of continuous moldline plies can be determined by a query of the selected thin region. All plies which are not continuous centerline plies in the thin region can be, by default, designated as continuous moldline plies. Thus, the specific default number of continuous moldline plies advantageously can be determined by subtracting the number of continuous centerline plies from the number of plies in the thin region, dividing the remained by two, and then using the closest integer number to this value. As a result, in a laminate created using the default values, all plies appearing in the selected thin region are continuous throughout the laminate.

In the event that a significant number of plies are terminating between adjacent regions, the dropped plies advantageously can be distributed throughout the laminate panel. In an exemplary case, a maximum of six plies can be dropped at a specific depth location in the laminate stack. If a greater number of plies must be dropped, then these plies must be evenly distributed in groups of six or fewer plies throughout the depth of the laminate, as illustrates in FIG. 18. It will be appreciated the step 113 advantageously can be implemented using any of the alternative subroutines illustrated in FIGS. 9A–13C, which subroutines are all discussed m greater detail below.

Moreover, step 114 is subsequently performed to thereby extend the ply boundaries to establish needed ramps. As discussed above, the ply boundaries advantageously can be extended according to the subroutine set forth in FIGS. 14A through 14G, as discussed in greater detail below.

As a general rule, no more than one ply can terminate in a specific location in a basic laminate. By default, plies are extended prior to their drop-off so that a ramp ratio of 20:1 advantageously can be formed in the primary load direction and a ramp ratio of 10:1 can be formed in the transverse load direction. It will be appreciated that the primary load direction is parallel to the zero degree axis as defined by the local finite element coordinate system, i.e., as defined by the finite element model. Preferably, the user can specify alternate ramp ratios, provided that the specified ramp ratio is not less than 3 degrees, nor more than 90 degrees, in either or both directions.

Figure 19:
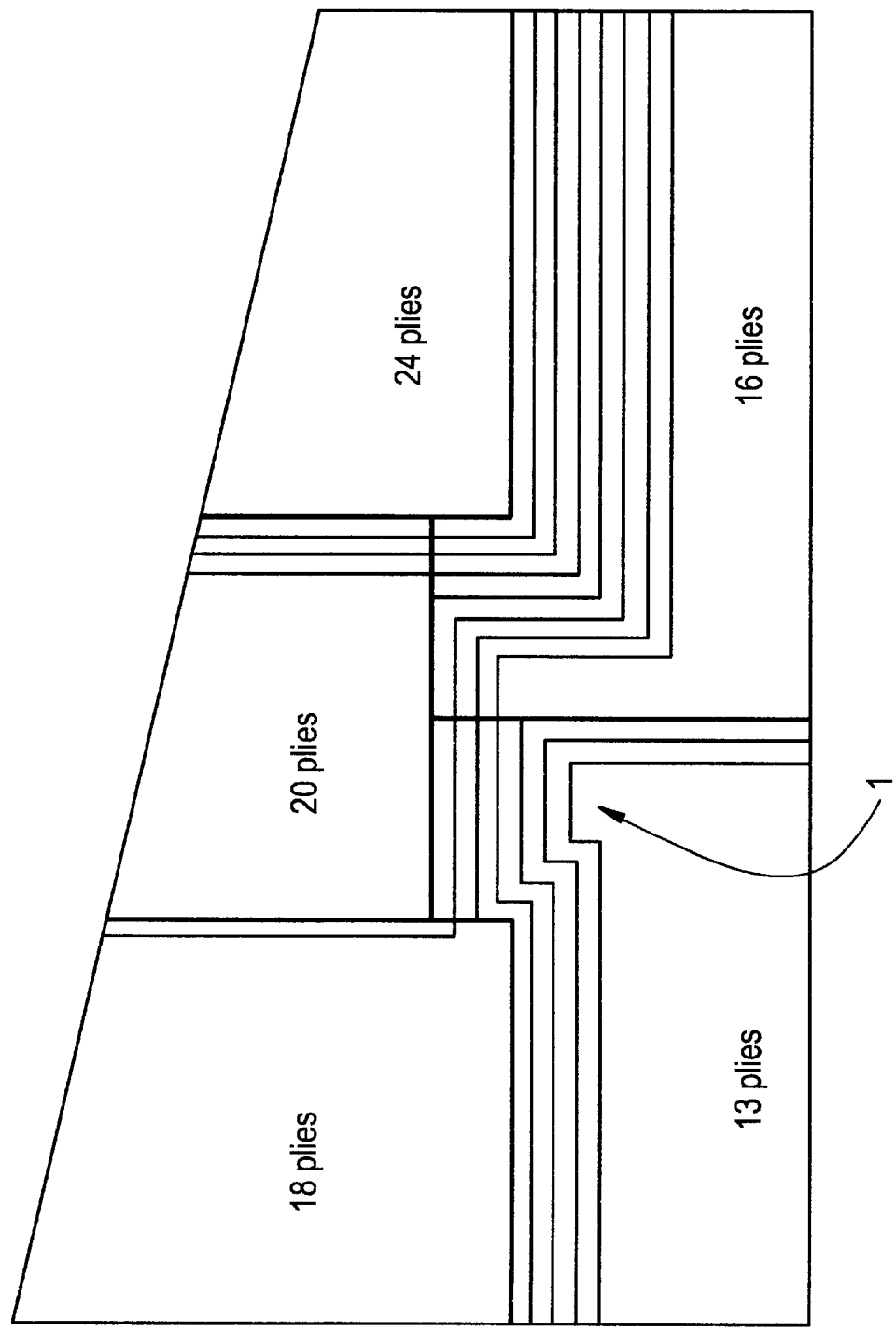
FIG. 19 illustrates the principle of global ply extension according to the present invention.
Figure 20:
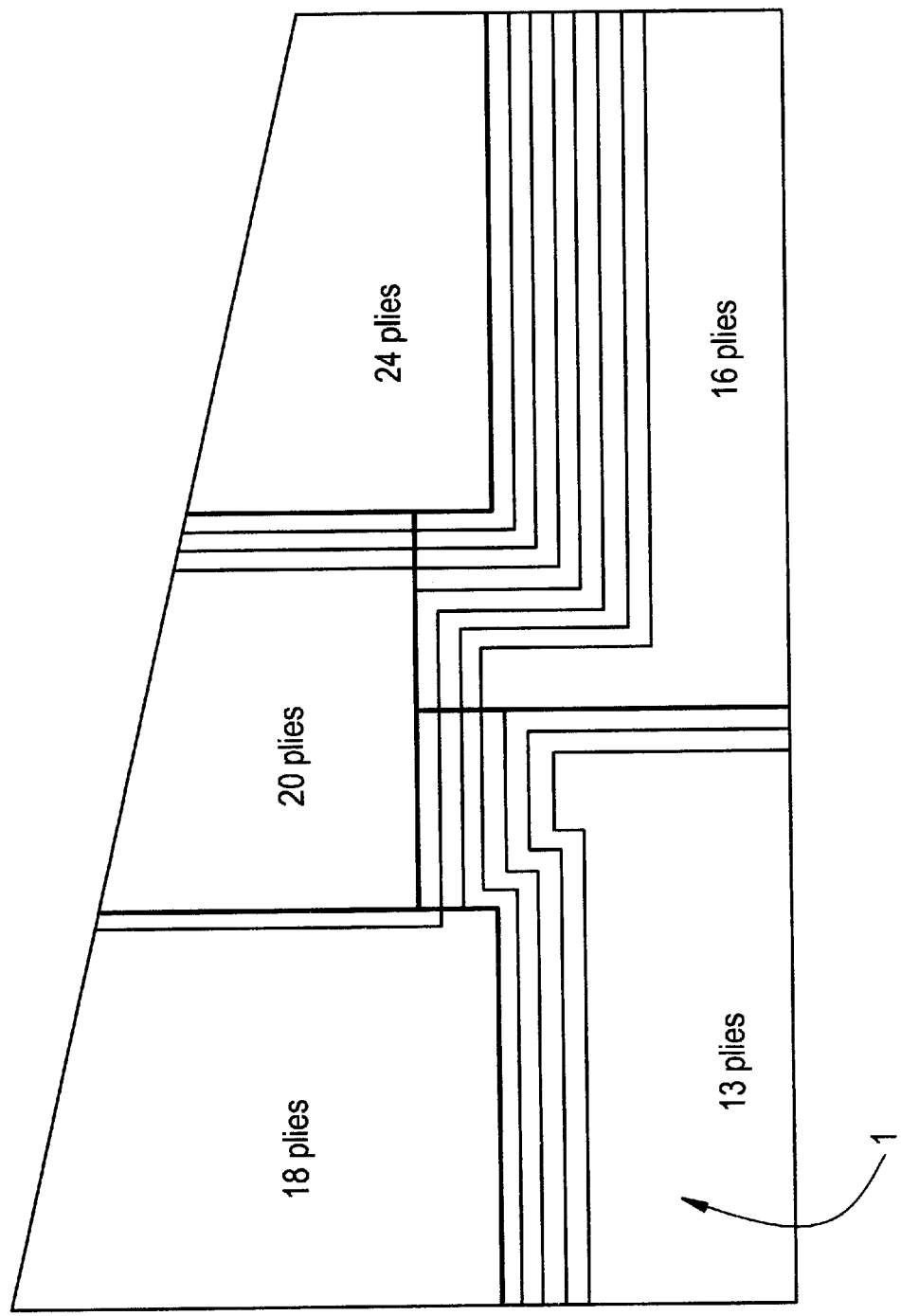
FIG. 20 illustrates a ramp feature developed using global ply extension according to the present invention.

It should be mentioned that extensions can be determined by starting in the thickest region and working toward the thinnest region. Plies extended in one region should continue in all adjacent regions along approximately collinear borders. Although this affects the start of the ramp in some regions, this constraint ensures that smooth ramps will be created between regions of different thicknesses. An example of panels before and after carrying out extensions in adjacent regions can be seen in FIGS. 19 and 20, respectively. More specifically, the arrow #1 in FIG. 19 identifies a laminate region where ply extensions neglecting adjacent plies results in a laminate having numerous ramp comers and a complex moldline geometry. In contrast, the arrow #1 in FIG. 20 illustrates the point that modifying the onset of the ramp feature in adjacent regions of the laminate to account for plies terminating in those adjacent regions results in a laminate having smooth ramp details and a simple inner moldline geometry.

Advantageously, the user can be given a choice of ply extension rules. The default rules will be used to create symmetric extensions. However, the user may choose to create non-symmetric extensions by modifying the default ply extension rules.

Figure 18:
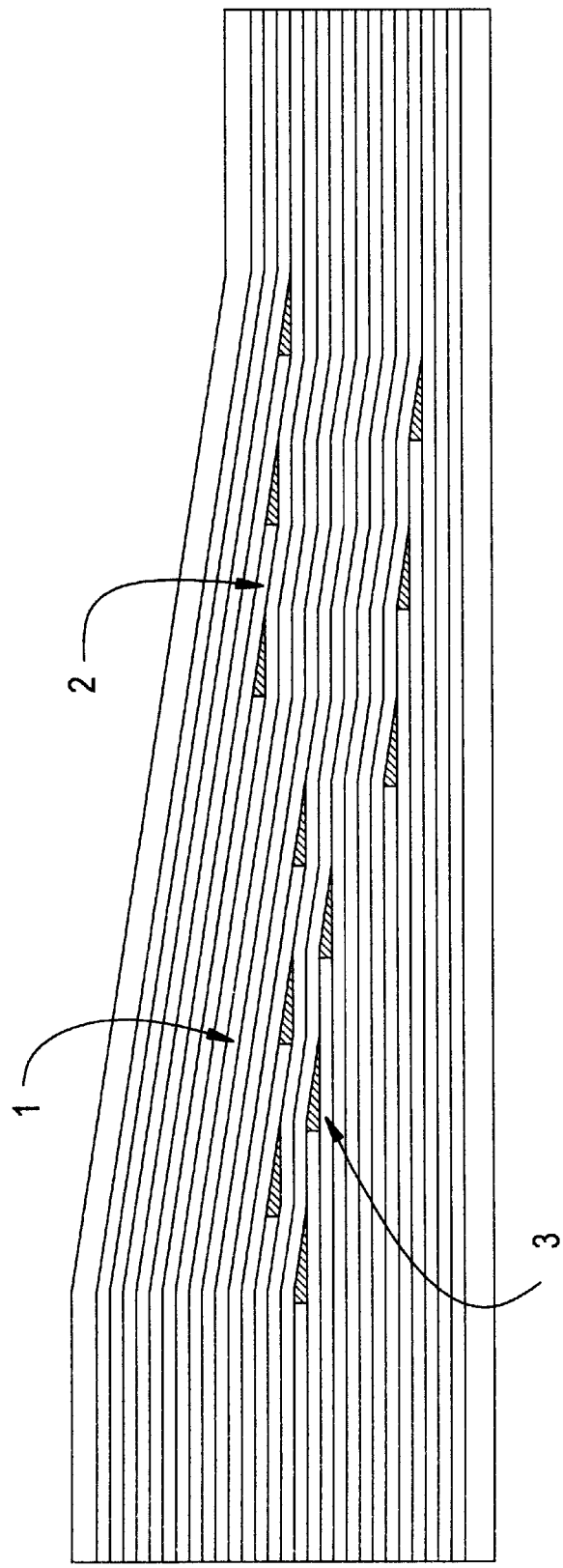
FIG. 18 illustrates the principle whereby plies are dropped between regions according to the present invention.

Symmetric extensions advantageously are created to minimize the area of the unsymmetrical region created by the transition. This is accomplished by extending the plies in pairs, alternating above and below the centerline of the laminate. Below the centerline, the plies closest to the tool side are preferentially extended the furthest to simplify placement and alignment of the plies. Above the centerline, the plies furthest from the tool side are extended the furtherst to stay symmetric with its pair below the centerline. An example of symmetric extensions is illustrated in FIG. 18. In FIG. 18, the arrow denoted #1 indicates that up to 6 plies can be dropped toward the centerline where minimal bending stress exists in the laminate; arrow #2 denotes a region wherein additional plies are required to terminate at an alternate depth in the laminate to avoid overloading adjacent plies; and arrow #3 illustrates that the plies closest to the tool side extend furthest for increased manufacturability. In should also be noted that arrows #1 and #3 illustrate that the plies are extended in symmetric pairs such that successive ply terminations alternate above and below the centerline of the laminate.

Figure 21:
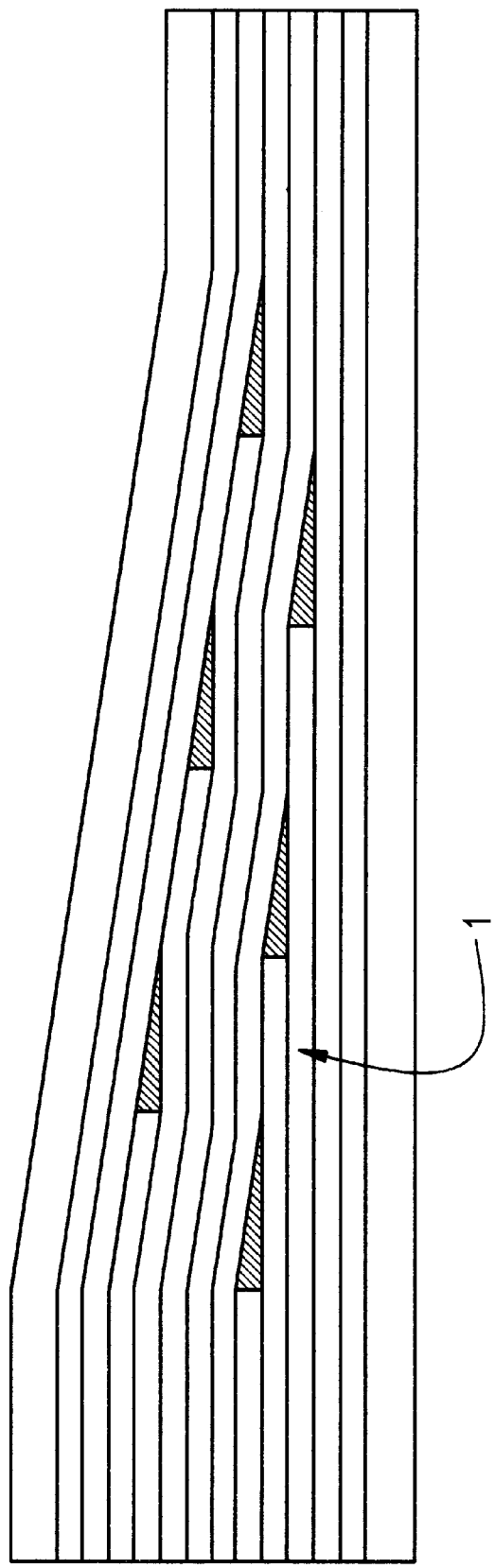
FIG. 21 illustrates application of one of the "best practice" rules in accordance with the present invention.

As an alternative, the user may wish to define extensions to simplify the placement and alignment of plies during manufacturing. This is accomplished by extending the plies closest to the tool side the furthest in all cases. As a result, plies will not be dropped in pairs, thus creating a non-symmetric extension. An example of non-symmetric extensions may be seen in FIG. 21. More specifically, the arrow #1 in FIG. 21 illustrates a laminate transition region where the plies closest to the tool surface extend furthest above and below the centerline for improved manufacturability, even though this results in unsymmetric terminations of ply pairs.

During step 115, the design is converted into a viewable form, e.g., cross-sections, 3-D views, ply views, tables and/or reports to permit the designer to visualize the design. A determination is then made during step 116 for whether the design is considered to be satisfactory.

In the event that the inquiry at step 116 produces a positive response, step 117 is performed to thereby return to the composites design overview illustrated in FIGS. 7A–7B. If the response is negative, the subroutine makes a determination of whether or not the local laminates can be redefined at step 118. If the answer is negative, a new connectivity process is chosen (step 119) and step 113 repeats. If the answer is affirmative, step 120 is performed to select critical regions. Furthermore, during step 121, an inquiry is performed to determine if the laminates in the critical regions are acceptable. When the answer is affirmative, step 123 of the subroutine is performed to identify other regions to modify; when the answer is negative, step 122 is performed to modify critical laminate by a selected method. It will be noted that, as discussed above, the alternative methods which advantageously can be selected are illustrated in FIGS. 15A–15E and 16. FIGS. 15A–15E and 16 will be discussed in greater detail below.

During step 124, the regions are ordered by thickness, i.e., thickest to thinnest and during step 125, the bounds on modification, e.g., family variances, the number of adjacent plies, the number of adjacent terminations, and the number of continuous plies, are established. Then, the thickest region is compared to the next thickest region during step 126. An inquiry is then performed as step 127 to determine whether a thinner laminate can be obtained from a thicker laminate by the expedient dropping of plies. When the answer is negative, step 128 is performed to determine the number of plies dropped between the regions and step 129 is performed to determine all combinations of available plies to drop from the thickest region which sum equal to the total number of plies to drop. In step 129, continuous plies are ignored. At step 130, an inquiry as to whether there are any ply drop combinations available is made. When the answer is negative, step 131 is performed to reduce the total number of ply drops by 1 and step 129 is repeated.

In the event that the inquiry at step 130 is affirmative, step 132 is executed to calculate a new family for each of the ply drop combinations, step 133 is performed to calculate the error in each family member from the target and step 134 is initiated to select the ply drop combination needed to minimize the average absolute error in the family. Moreover, step 135 is performed to defme the revised local laminate for a thinner region. Following step 135, it is assumed that the thinner region is now the thickest region at step 136 and an inquiry is performed during step 137 to determine if there is another, thinner region. In the event that the answer is affirmative, step 126 is repeated; if the answer is negative, step 113 is repeated to establish ply connectivity.

It will be appreciated that many features may be included in the knowledge driven composite design optimization system to provide the laminate designer with visual information regarding the present state of the laminate design. Although the primary focus of the paragraphs immediately below is with respect to the visual presentation of data at the end of steps 113 and 114 of FIGS. 8A and 8B, it will be appreciated that some percentage of the data is accessible by the laminate designer at every stage of the design process. For example, the original design surface is immediately displayable upon selection of a surface, and any time thereafter. Moreover, the original surface can be displayed as any of a wireframe, a shaded surface, or a faceted surface. Rather than attempt to discuss each visual display mode with respect to a single associated step, the general aspects of the user interface will now be described.

Figure 22:
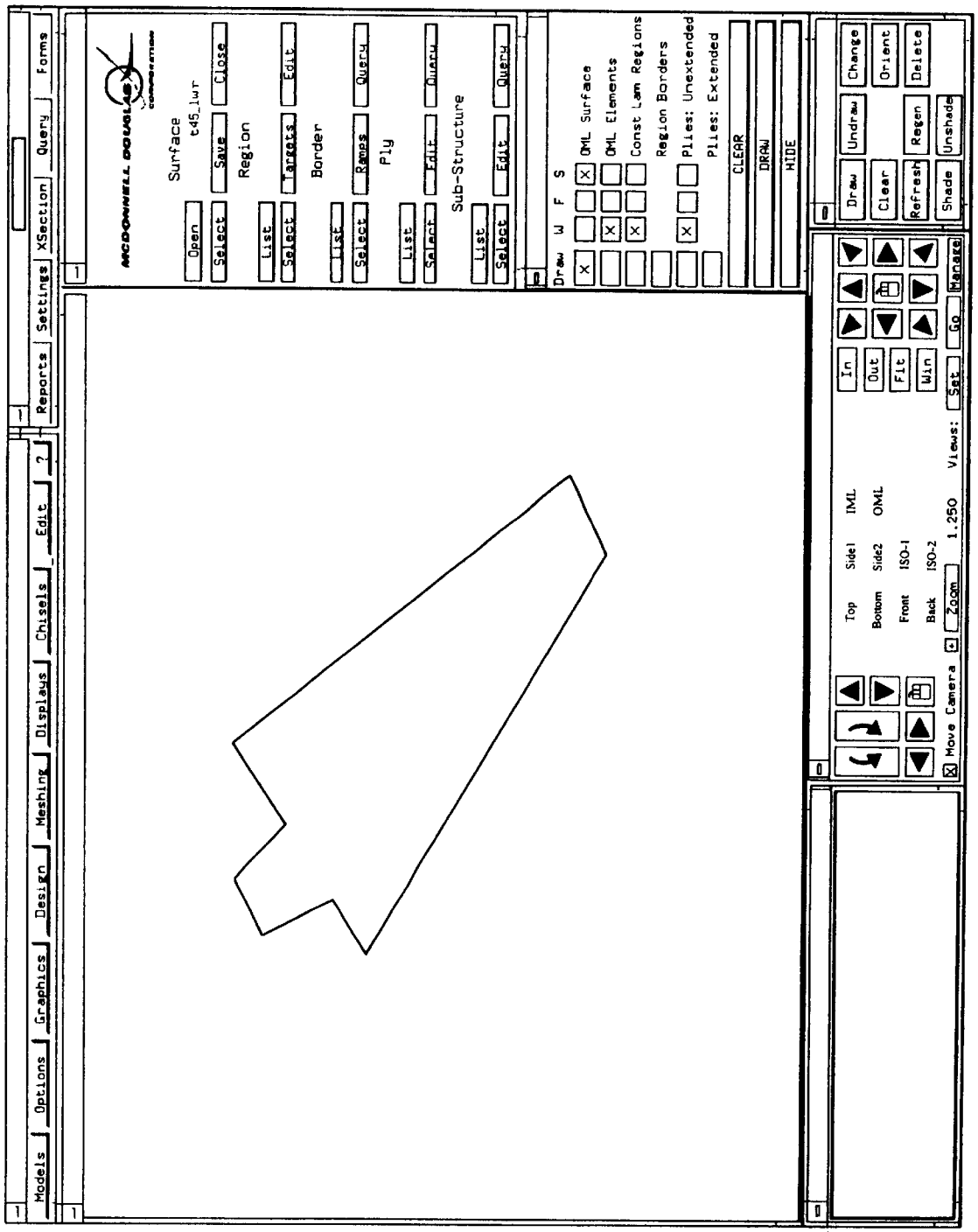
FIGS. 22–37 depict various aspects of the user interface of a knowledge driven composite design optimization system according to the present invention.

The user advantageously can control knowledge driven composite design optimization process, including PACKS, through a consistent graphical user interface (GUI). This GUI, in an exemplary case, can be created using OSF/Motif and standard Athena widgets. The GUI consists of multiple windows and dialog boxes for user input. Upon startup, a limited set of windows will appear. By default, these startup windows consistently appear in the same places on the screen for each session. An example of this default arrangement is illustrated in FIG. 22. As previously discussed, the user can override this default through the use of X-window resources defined in the user's .Xdefaults file, which preferably is located, in an exemplary case, in the home directory of the user.

The main window of the GUI advantageously can display most of the views of the finite element model. This window appears upon startup for display of the main menu. It should be mentioned that the menu advantageously can be used to control all functionality common to the entire application, such as setting user preferences. The main window is depicted in FIG. 22. Additionally, a message window appears upon startup, to permit the display of status messages to the user, e.g., when background activity will cause a delay in program initiation. It will be noted that these messages additionally provide the user with progress information. The message window is also illustrated in FIG. 22.

Figure 23:
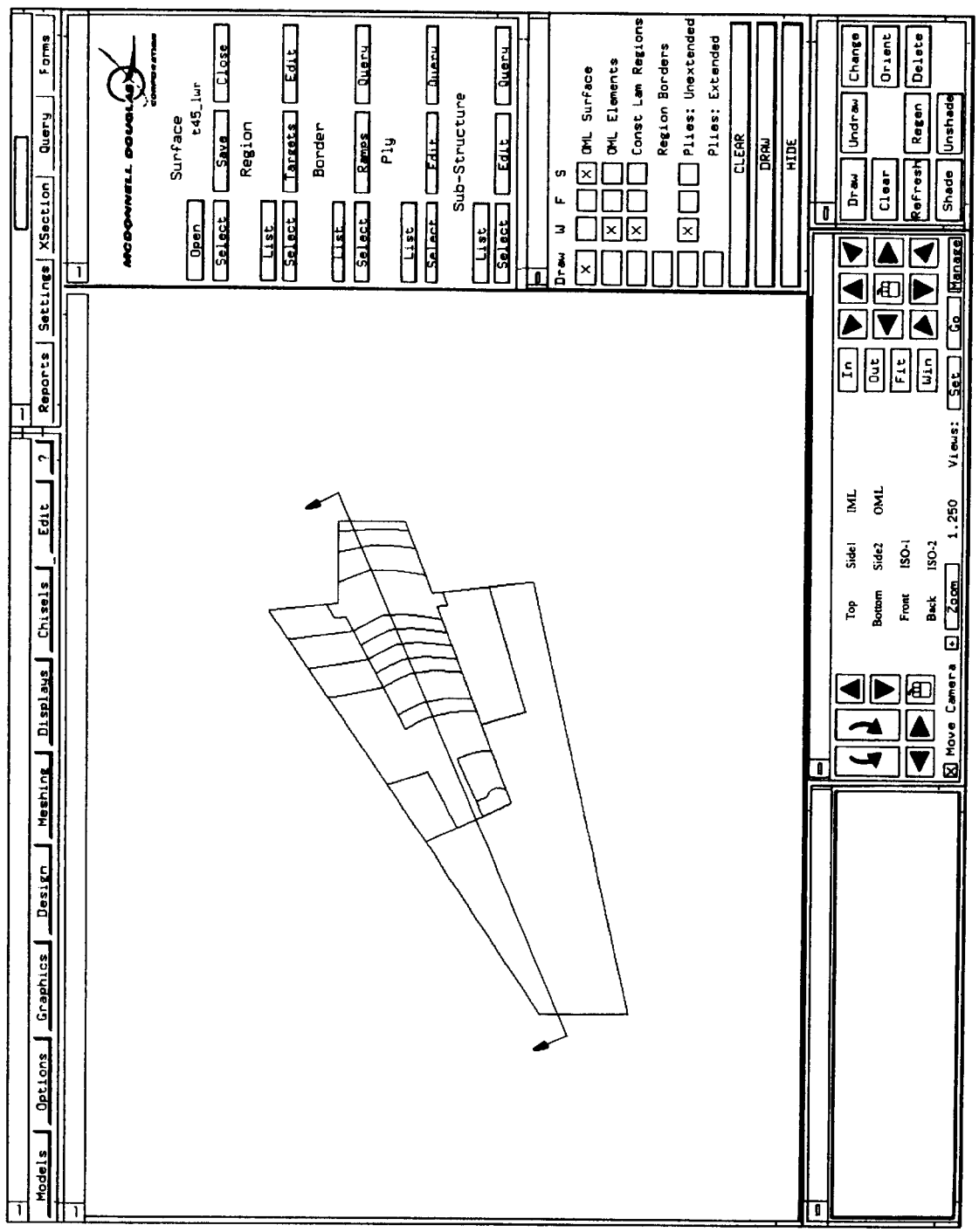
Figure 24:
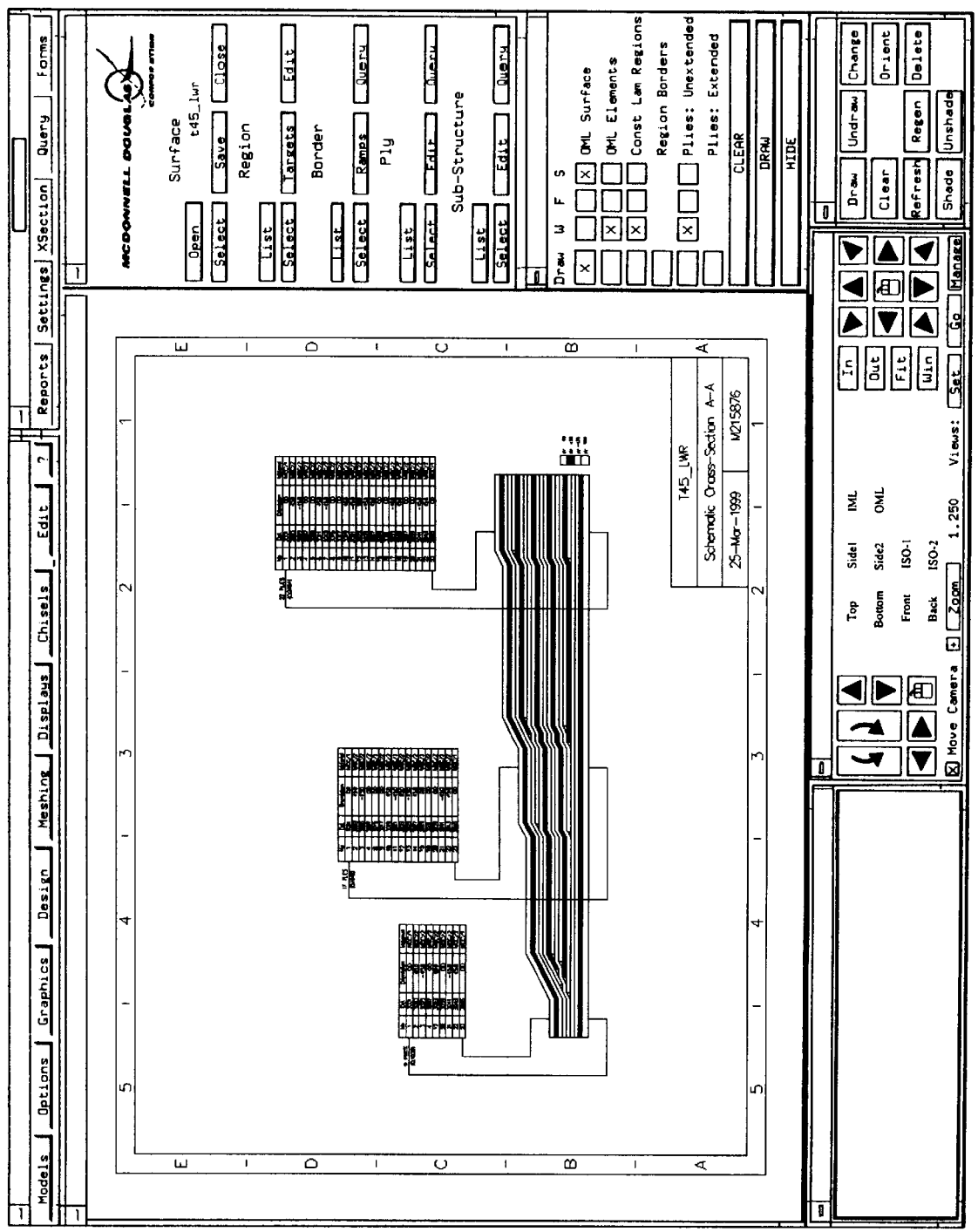
Figure 25:
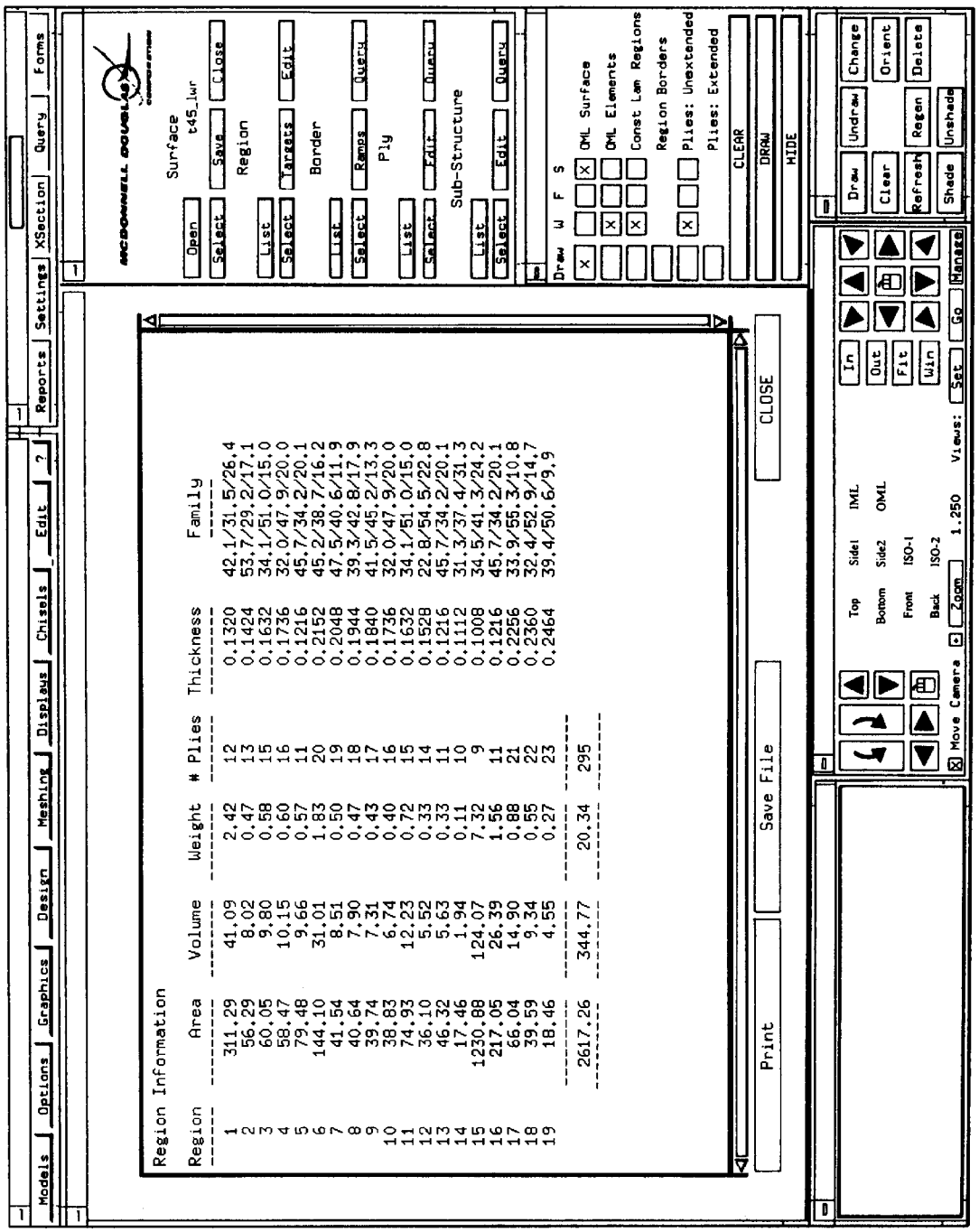

It will be appreciated that, in addition to the main window, one or more child windows pop up whenever the user selects an operation or operations that the user desires to display along with the display presented in the main window. In particular, each of the following operations will pop up a new window:

(1) Cross Sections—When the user selects or creates a section cut location, a planform view window will pop up identifying the borders of the constant laminate regions and the cutting plane selected, as depicted in FIG. 23. Moreover, when the user displays a created or selected cut, the cross section window will pop up, as depicted in FIG. 24. This latter window advantageously can contain a menu with options that apply only to cross sections, such as settings.

Figure 26:
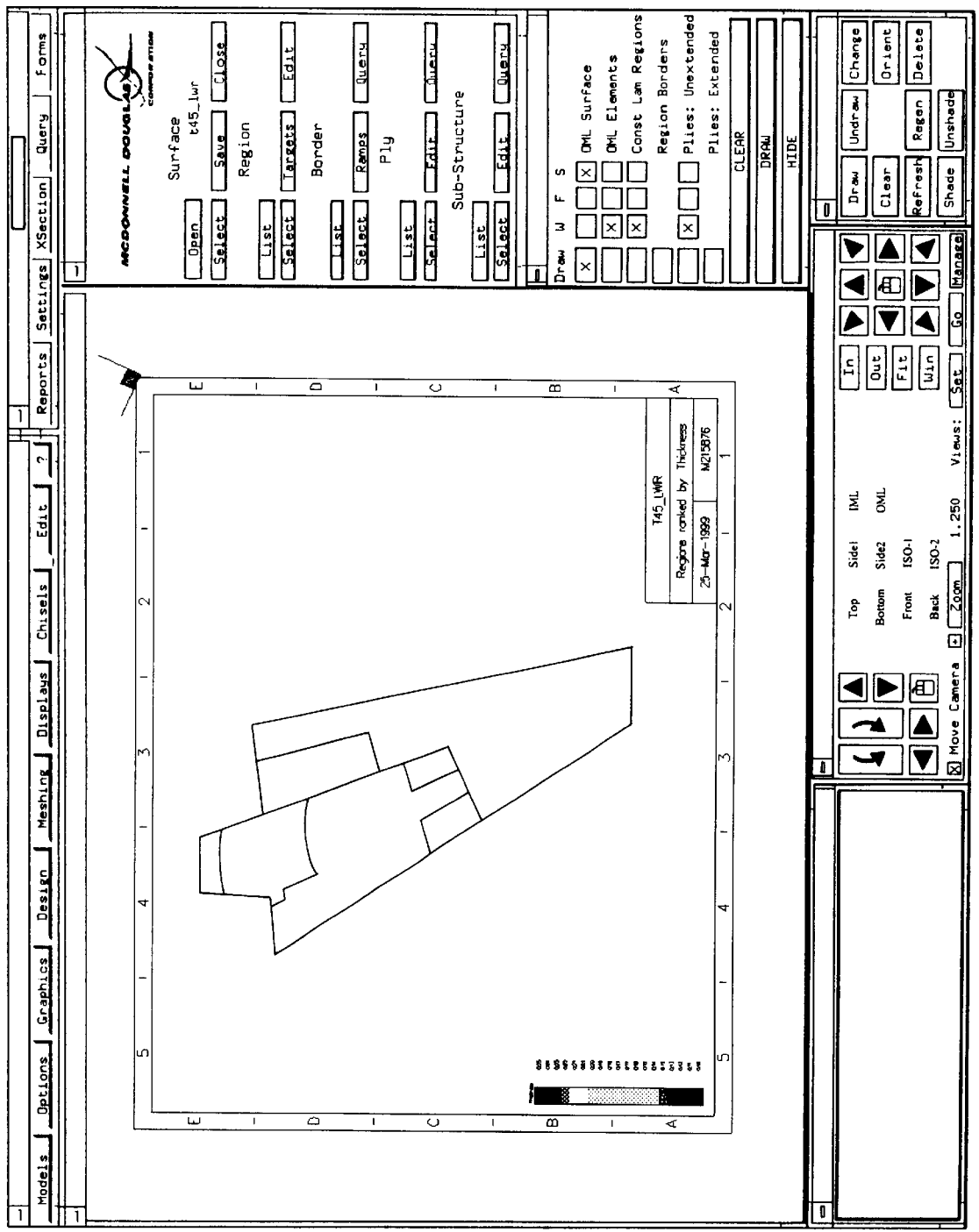
Figure 27:
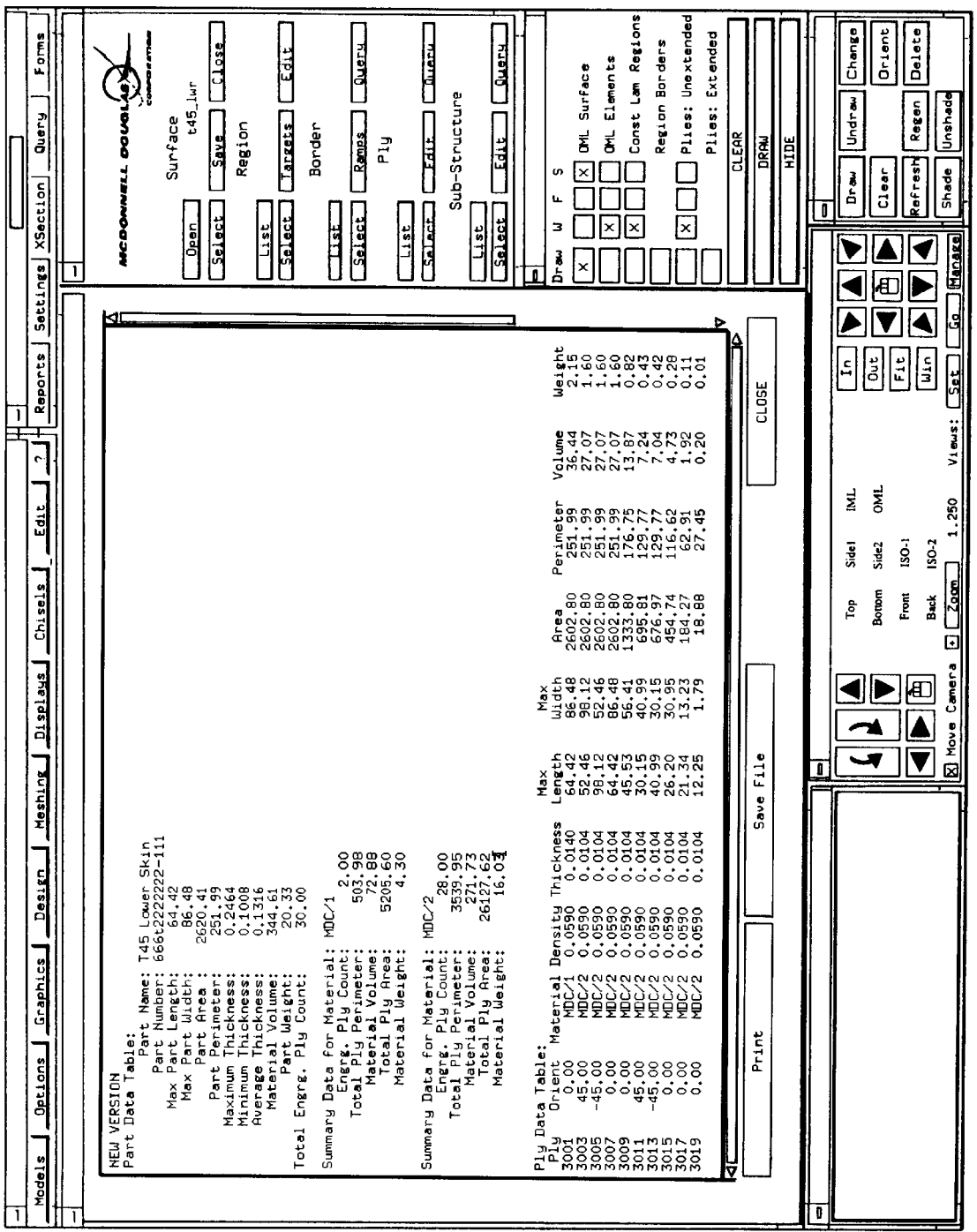
Figure 28:
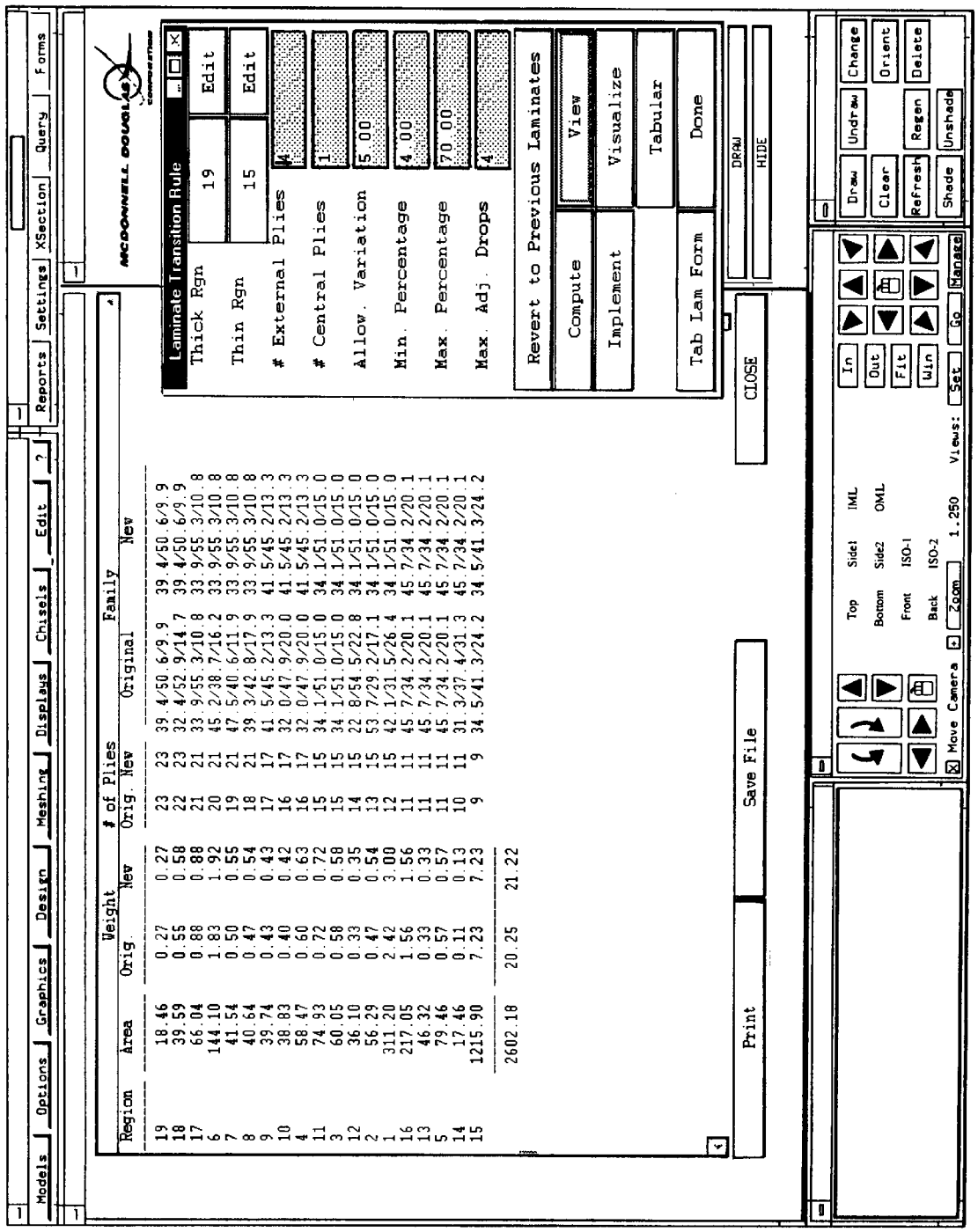
Figure 29:
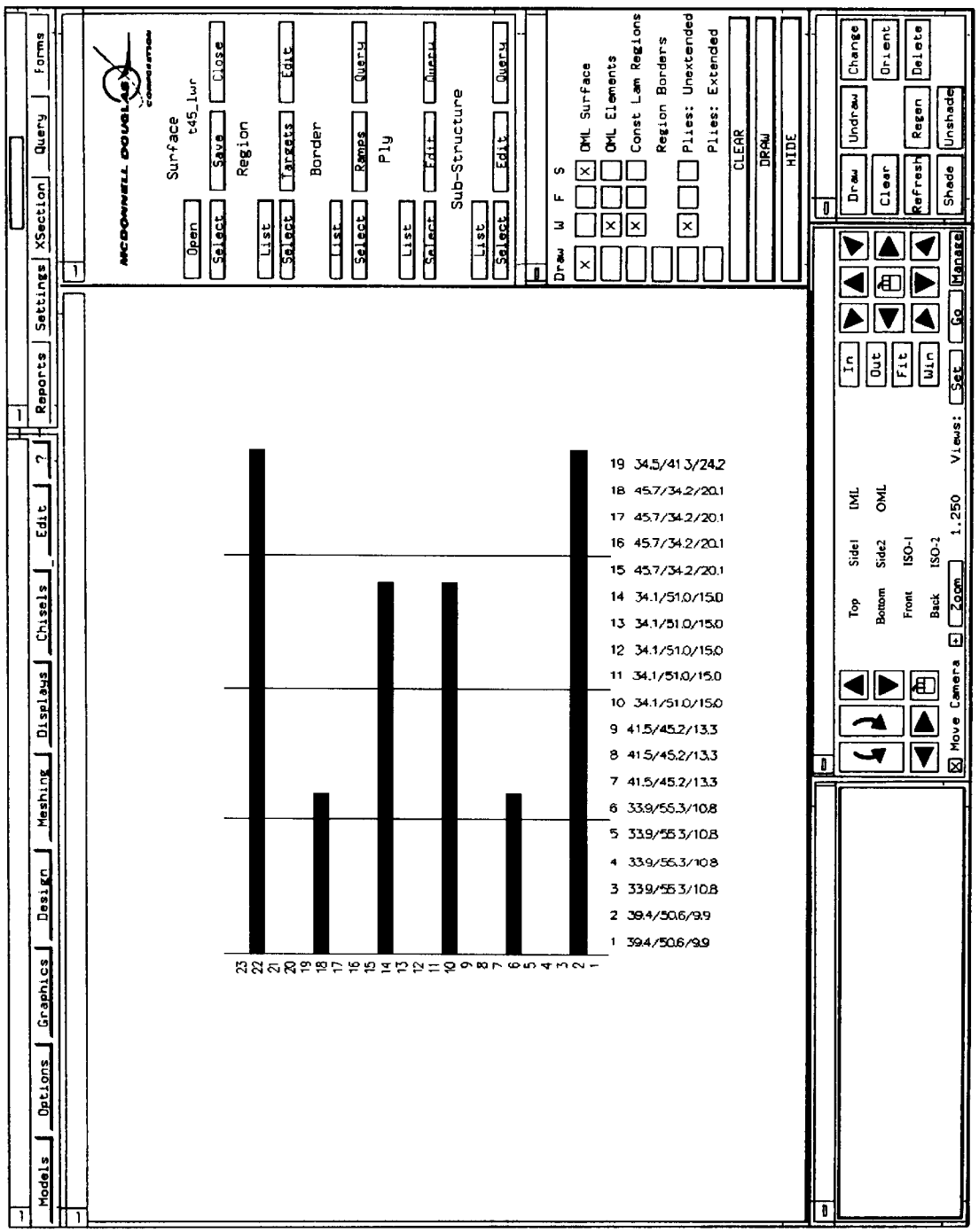

(2) Reports—Reports, either graphical or tabular, can be made to appear in a pop up window, as illustrated in FIGS. 25–29. These reports allow the user access to design information in a multitude of formats. For example, FIG. 25 demonstrates a tabular report of region information and FIG. 26 illustrates a graphical representation of the number of plies in the various regions. Summary ply data relating to overall component cost can be seen in the tabular report of FIG. 27. In addition, the system advantageously is capable of developing summary reports of the status of the analysis, as seen in FIGS. 28–29. These reports can include the initial material properties and laminate definitions as well as the current material properties and laminate definitions. Furthermore, these reports summarize the total number of plies, the number of transitions, and the component weight for both the initial configuration and the current configuration. It will be appreciated that these reports will facilitate tradeoff studies for internal ply arrangement and will provide an indication to the user of which solutions merit further consideration, i.e., should be saved as new files for later recall and reuse.

Figure 30:
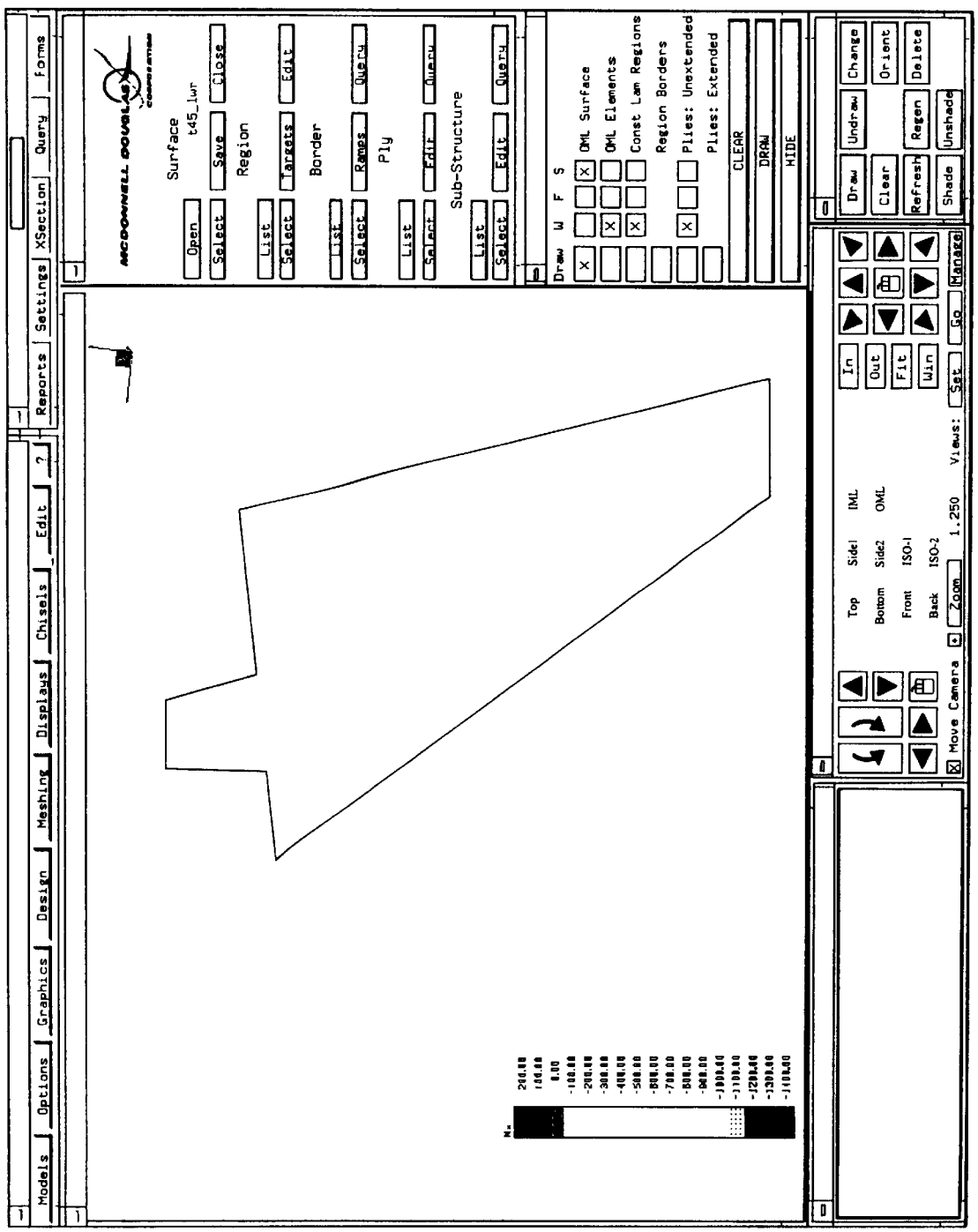

(3) Loads—Internal element loads advantageously can be displayed in a pop up child window as text or graphical reports, as depicted in FIG. 30. The user can freely select a load condition and either the element or region loads. Based on the user's selection, the load view will then be displayed in a new window.

Figure 31:
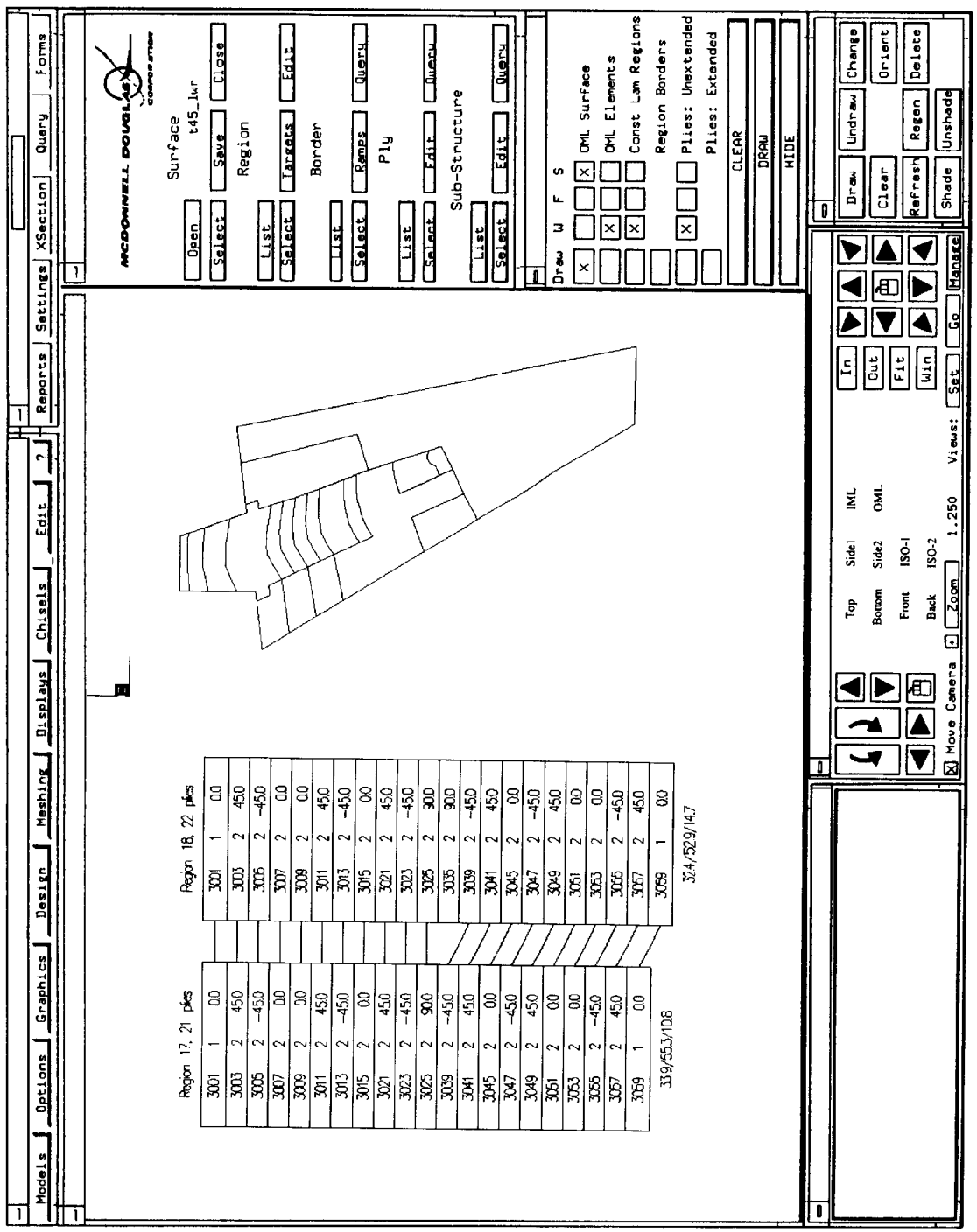
Figure 32:
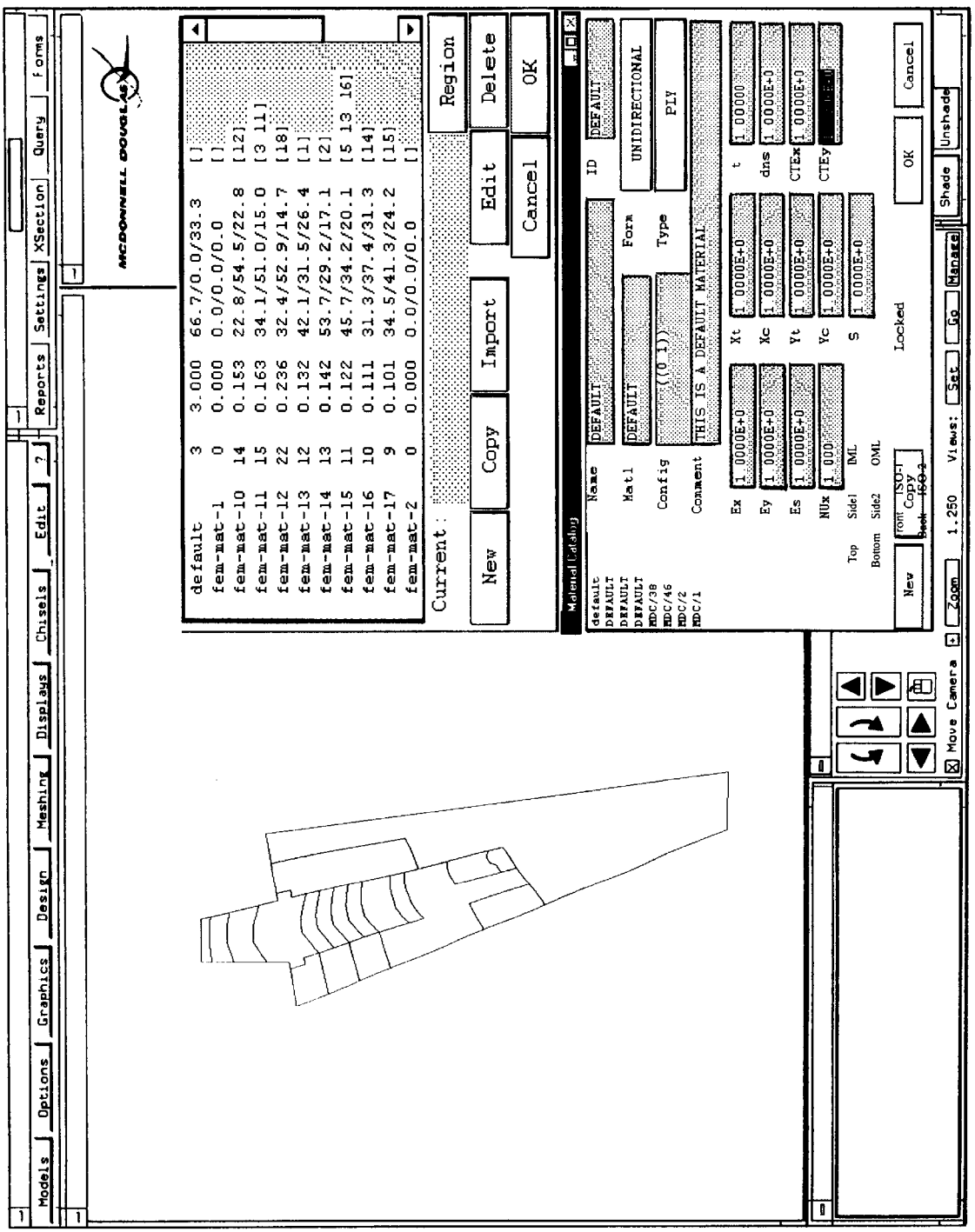
Figure 33:
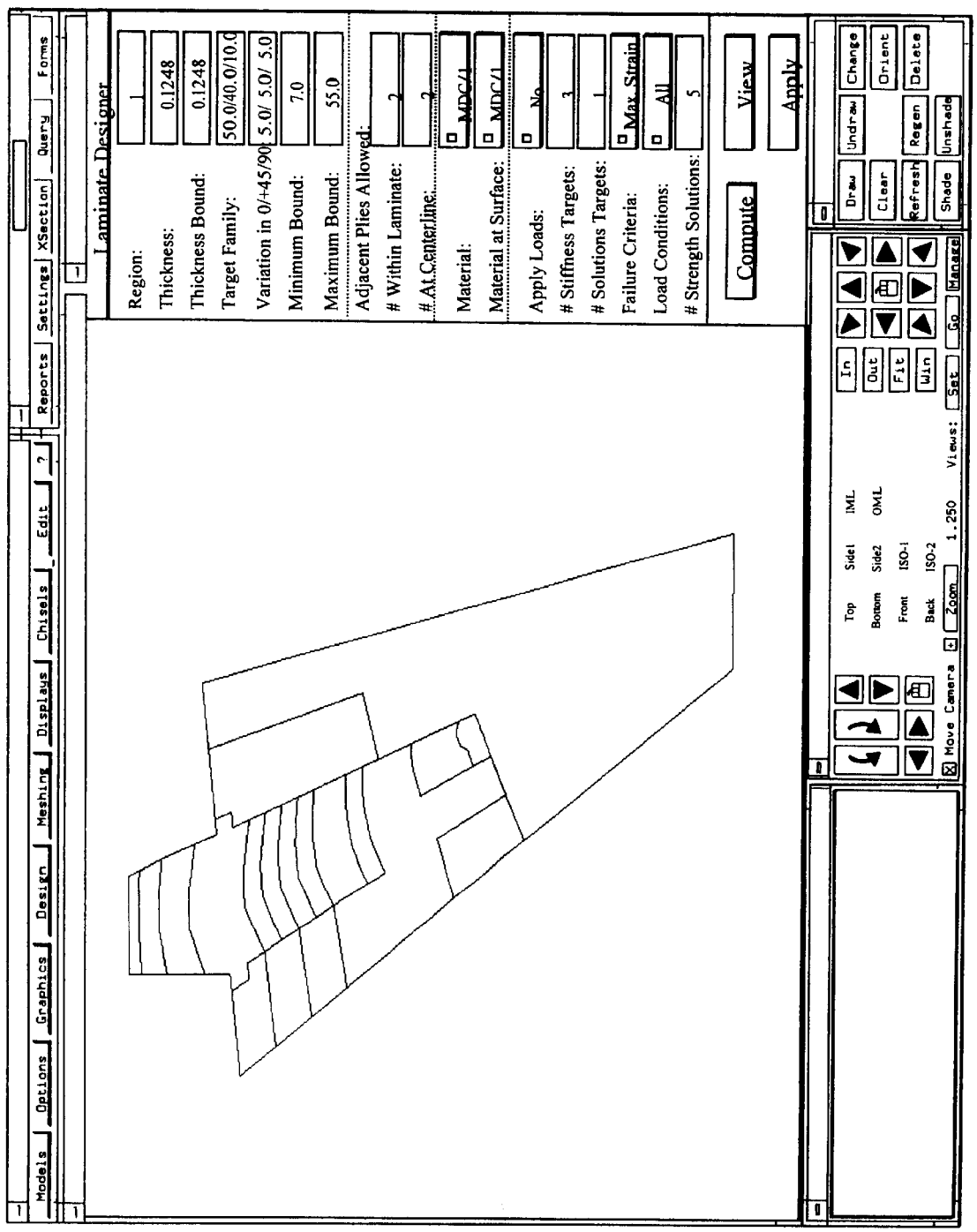
Figure 34:
Figure 35:
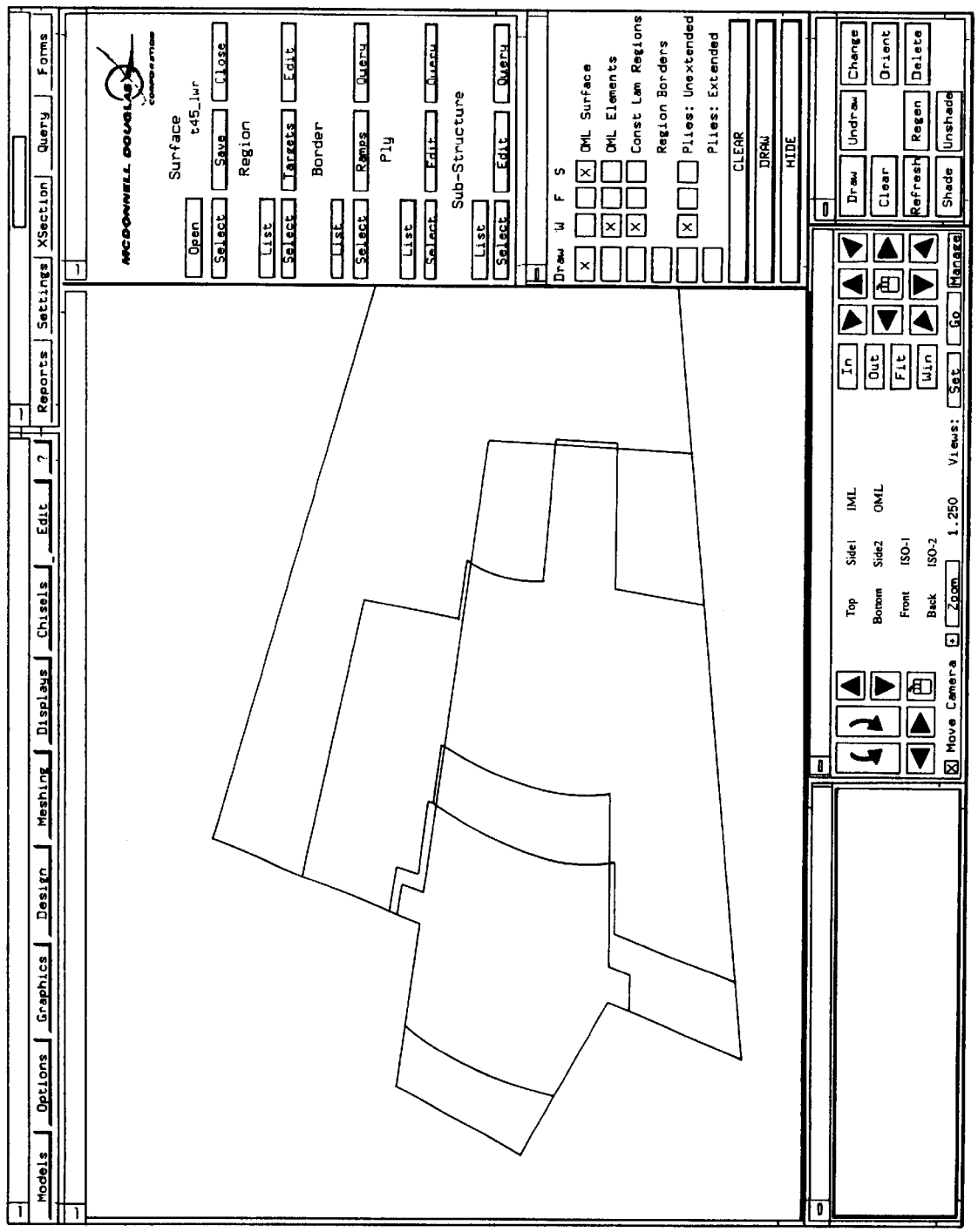
Figure 36:
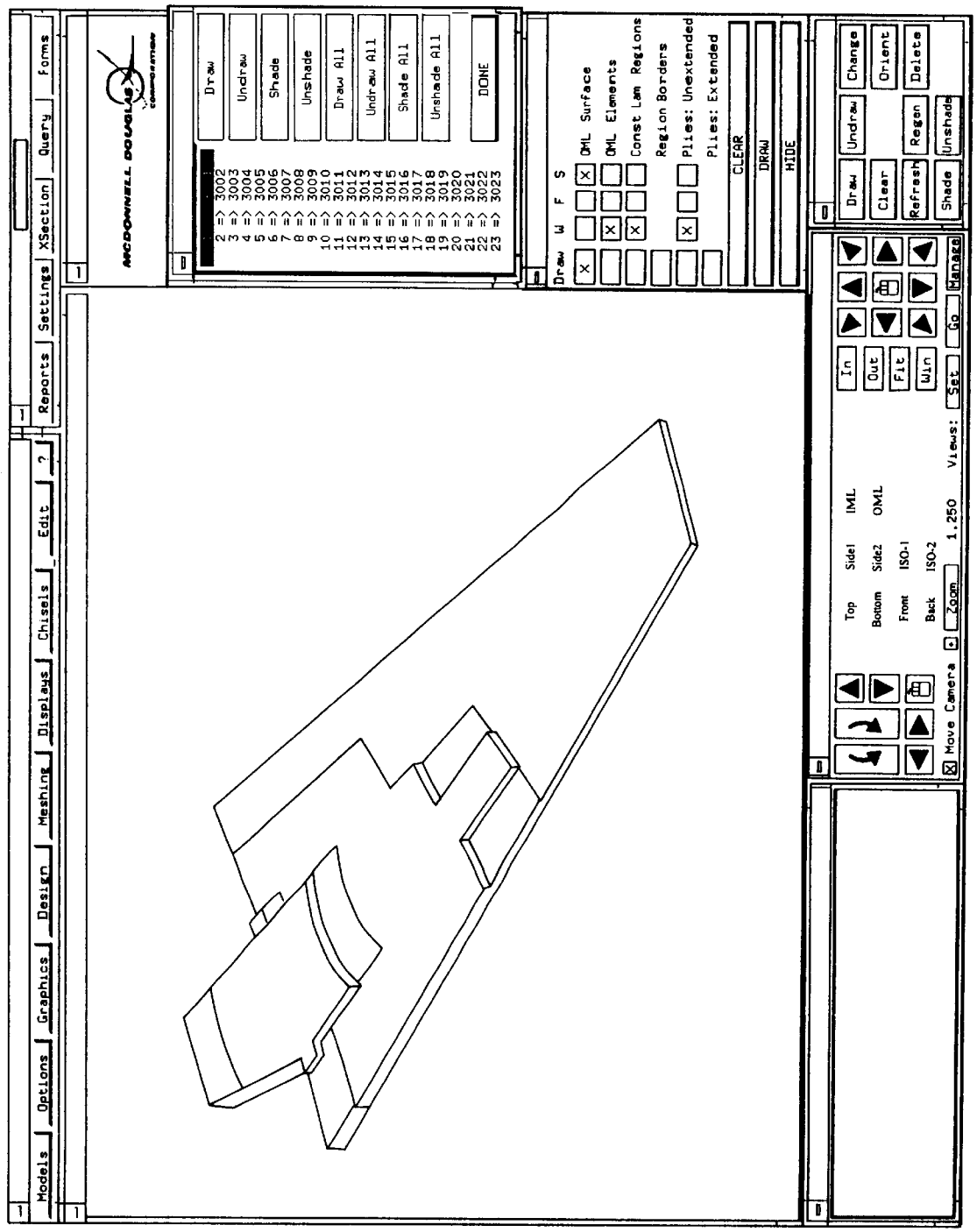
Figure 37:
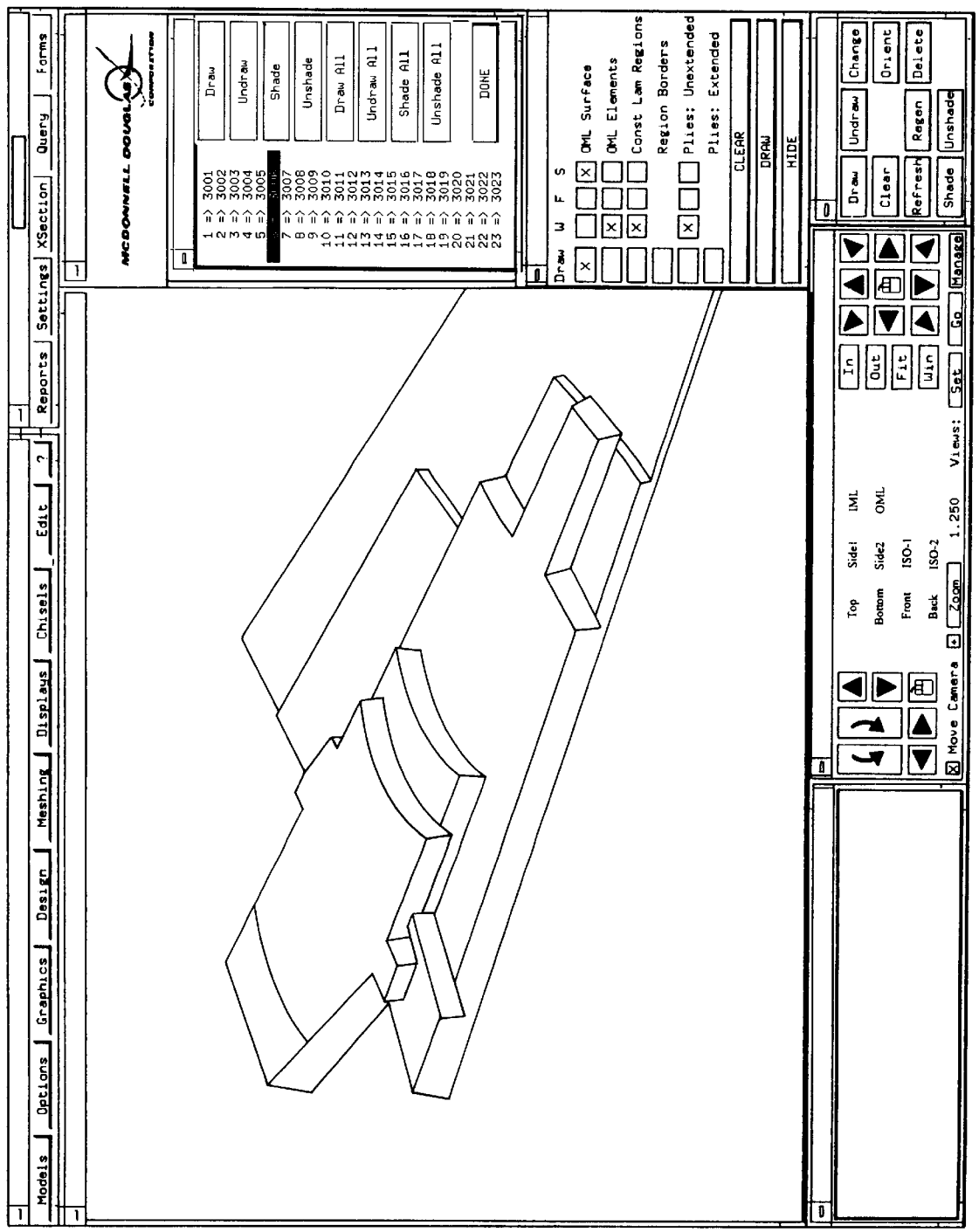

(4) Dialog Boxes—Preferably, dialog boxes are used to obtain input from the user. During startup, dialog boxes for the main window, as well as the draw and view dialogs will appear, as shown in FIG. 22. The draw dialog permits the user to specify what views of the model should be displayed and how they should appear when displayed. Other dialog boxes advantageously can be used for user input during the laminate editing steps. For example, the view dialog permits the user to manipulate the current view. An interface to scrolling, panning, moving, zooming and rotating views is provided for that purpose, as well as a view manager to allow the user to save the selected settings. Interactive dialog boxes allow the user to query for design information, or to interactively modify the design. For example, FIG. 31 illustrates the result of a border query to identify the ply connectivity at a specific border. Similarly, FIG. 32 depicts the result of an interactive region edit, allowing the user access to local ply and material properties. In addition, user input to laminate transitions editing advantageously can be performed through the laminate transitions dialog, which is depicted in FIGS. 28 and 29. Moreover, editing laminate transitions may pop up other dialog boxes permitting editing of target families, to invoke the interface of the laminate designer subroutine, as illustrated in FIG. 33, or to edit ply or region data. The ply solutions, including the connectivity between regions and the extensions necessary to produce the ramps, can be visualized as seen in FIGS. 34 and 35. In addition, to allow the user the extra functionality necessary to draw three-dimensional plies, a three-dimensional ply's dialog box, depicted in FIGS. 36 and 37, can be used. Additional dialog boxes advantageously can be used to facilitate the laminate design process. For example, a select loads dialog box allows the user to select which loads to are to be applied.

(5) Views—A number of distinctive views are provided by the knowledge driven composite design optimization system and corresponding process to assist the user in visualizing the part or panel both during the design process or after the design is finalized. It will be appreciated that the latter views assist the design team in communicating with the fabrication facility to ensure that all aspects of the design are reflected in the finished panel. For example, the finite element model mesh can be displayed immediately upon selection of a surface. As mentioned previously, the FEA mesh may be displayed as a wireframe, a shaded surface, or a faceted surface. In addition, an identical laminate regions view allows the design team to determine areas of identical laminate stacks. It will be appreciated that the identical laminate regions view requires that the regions must be generated before they can be displayed. The regions are created by joining adjacent elements in the FEA mesh which have an identical laminate definition. The region boundaries define where transitions will occur in the laminate. These regions may also be displayed as a wireframe, a shaded surface, or a faceted surface. Furthermore, an unextended plies view can be used to show a projection of each ply onto evenly spaced copies of the design surface, assuming each ply termination will be on a region boundary. Moreover, all views must also be capable of being printed to a userselected scale, saved for future printing, or exported to UNIGRAPH-ICS (™) as IGES entities.

(6) Text Output—Various specialized textual presentations can also be provided by the composite design optimization system to enhance understanding of both the composite design optimization process and the completed laminate design. For example, tabular views of the laminate ply data can be generated by the knowledge driven composite design optimization system for display and printing, as depicted in FIG. 27. In an exemplary case, this data advantageously can include ply detail dash number, ply sequence number, fiber orientation, material stock number, material density, cured ply thickness, ply area, ply perimeter, ply maximum length and width, and the defining ply boundary. In addition, laminate tables are displayable in either a cross section view or through a region query. A laminate table contains the ply number (sequence number), ply detail dash number. fiber orientation, and material stock number for the laminate of a given region. Moreover, a master ply table contains the ply number (sequence number), ply detail dash number, fiber orientation, and material stock number for every ply in the component.

It will be noted that each layer within a given laminate is assigned a ply detail dash number and a ply number or sequence number, which indicates the sequence of lamination of each ply detail, starting with I as the first ply laid down on the tool surface and increasing sequentially as the laminate is assembled. By convention, all ply details to be applied in the same sequence, i.e., set, have the same sequence number. All plies within a given lay-up having the exact same planform fiber orientation and material composition are permitted to share a common dash number providing they fall in different ply levels while identical ply details falling on the same ply level are assigned different dash numbers.

It should also be mentioned that for each view and table, the user can perform zooming in and out, scrolling up and down, panning left and right, and rotation around the X, Y and Z axis of the display screen of the computer system running the composite design optimization process software. The user advantageously can save any view by a selected name, and then recall that view by selecting it from a list of saved views. These actions are accessible at any time, i.e., they may be performed during intermediate steps in the operation. In this manner, a user could query a feature, zoom in to select one parameter, pan to select another, and then generate new results based on the indicated design changes.

Preferably, a laminate visualization overview function is provided with the system, the primary purpose of which is to allow the user to browse through several different three-dimensional views of the laminate. These views allow, for example, the laminate designing user to get a quick overview of the laminate and get an idea of the quality of its design as compared with other possible designs based upon the experience of the user. In addition, this overview function also allows laminate manufacturing users to interactively select the views of the laminate, its plies, or its cross sections that they find will best allow them to conceptualize the laminate. Preferably, the user can interactively annotate any view with rosettes and end of ply markers. Rosettes advantageously allow the designer to specify the spot where the prescribed orientation is applied to the mold, e.g., during lay-up. In an exemplary case, the designer can locate the rosette anywhere within the outline of the part. Furthermore, the end of ply markers allow the designer to completely define the ply outline. The end of ply markers advantageously can be created with a leader line pointing toward the ply interior. In addition, all cross section views can be annotated with one or more laminate tables.

It should again be mentioned that the alternative subroutines illustrated in FIGS. 9A–13C correspond to step 113 in FIGS. 8A–8D. Each of these alternative embodiments will now be discussed in greater detail immediately below.

The subroutine of FIGS. 9A–9D, which advantageously illustrates the method whereby ply connectivity is established according to the so-called dropping plies out-to-in method starts with the step 201 in which a query is conducted for every region to determine the number of plies in each region. Then, step 202 is performed to determine whether any of the regions have an odd number of plies. In the event that the answer is affirmative, step 203 is performed to establish one continuous centerline ply; when the answer is negative, step 204 is performed to establish two continuous centerline plies. Step 205 is then performed to query every region to determine the maximum number of continuous surface plies. During step 206, the connectivity of continuous surface plies preferably is established after which step 207 is performed to query every region for additional continuous centerline plies. At step 208, a determination is made for whether there are additional potential continuous centerline plies. If the answer is affirmative, step 209 is initiated to establish the connectivity of continuous centerline plies, subject to limits on the maximum number of adjacent terminations and plies and step 210 is executed to establish the order in which to access the borders, e.g., thickest to thinnest, thinnest to next thickest, thinnest to thickest, greatest number of terminations to fewest number of termination, and fewest number of terminations to greatest number of terminations, according to geometric position. Step 211 is then performed in order to establish the order for moving through the regions, e.g., thickest to next thickest, thickest to thinnest, thinnest to next thickest, thinnest to thickest, again according to geometric position. Then, step 212 is performed to establish the starting region and step 213 is performed to establish the initial border to be considered. It will be noted that when the answer to the question posed in step 208 is negative, step 209 is skipped, i.e., the subroutine jumps to step 210.

Following the prefatory steps discussed immediately above, step 214 is performed to determine whether the outermost unassigned plies on one side of the centerline advantageously can be connected. If the answer is negative, step 215 is executed to connect the outermost unassigned ply in a thinner region to the outermost similar ply in the thickest region and to designate the plies outward of this connection as dropping. In contrast, when the answer is affirmative, step 216 is performed to connect the outermost unassigned plies, thus assigning these plies. In any event, step 217 is then performed to determine whether the outermost unassigned ply on the other side of the centerline advantageously can be connected. An affirmative reply permits step 218 to be performed to thereby connect the outermost unassigned plies on the other side of the centerline, thus assigning these plies also. On the other hand, a negative response at step 217 initiates step 219 to connect the outermost unassigned ply in a thinner region to the outermost similar ply in the thickest region and to designate plies outward of this connection as dropping.

A determination is then made for whether there are any more plies toward the centerline at step 220. An affirmative answer causes step 214 to be repeated; a negative answer initiates step 221, which determines whether there is another border to investigate in this region. If the answer is affirmative, step 214 is repeated after step 222 is performed to establish the border to be evaluated based on the previously established order. When the response to step 221 is negative, step 223 is performed to determine whether there are more regions to investigate. Step 224, which calculates the boundary of every ply, and step 225, which returns to the PACKS process of FIGS. 8A–8D, are performed when the answer is negative. When the answer is positive, step 226 is first performed to establish the next region to investigate based on the previously established order and then step 213 is repeated.

Figure 10A:
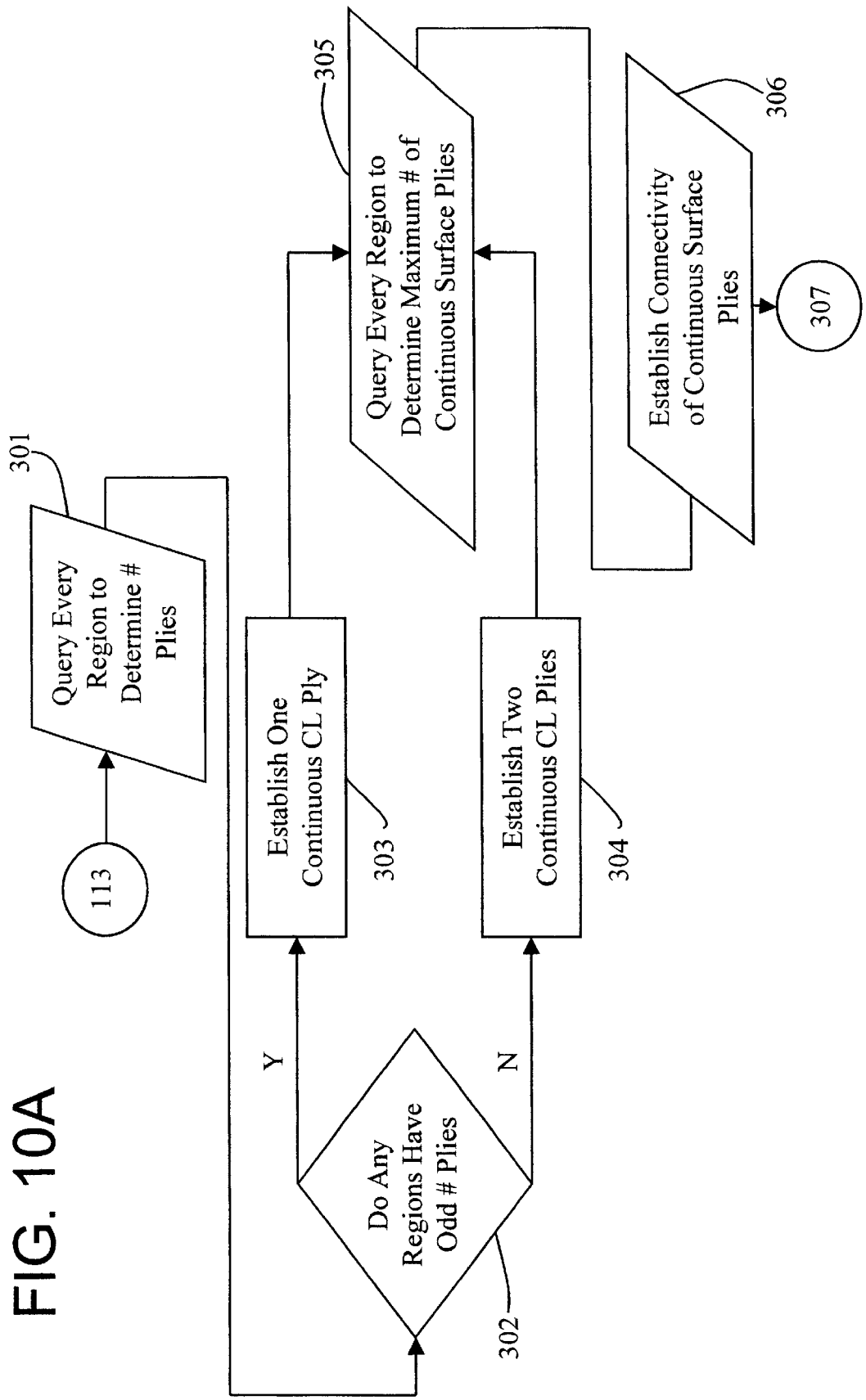
Figure 10B:
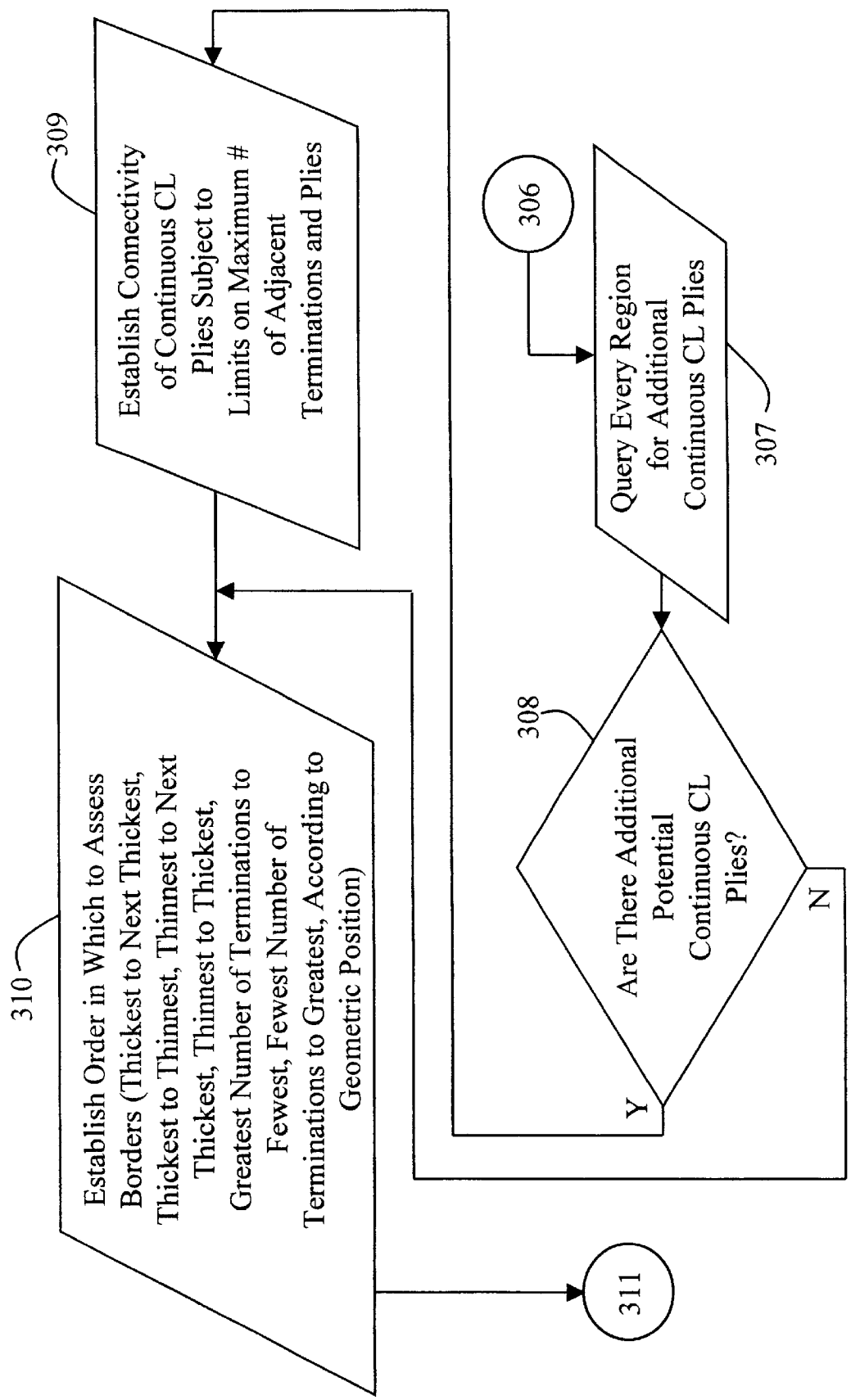
Figure 10C:
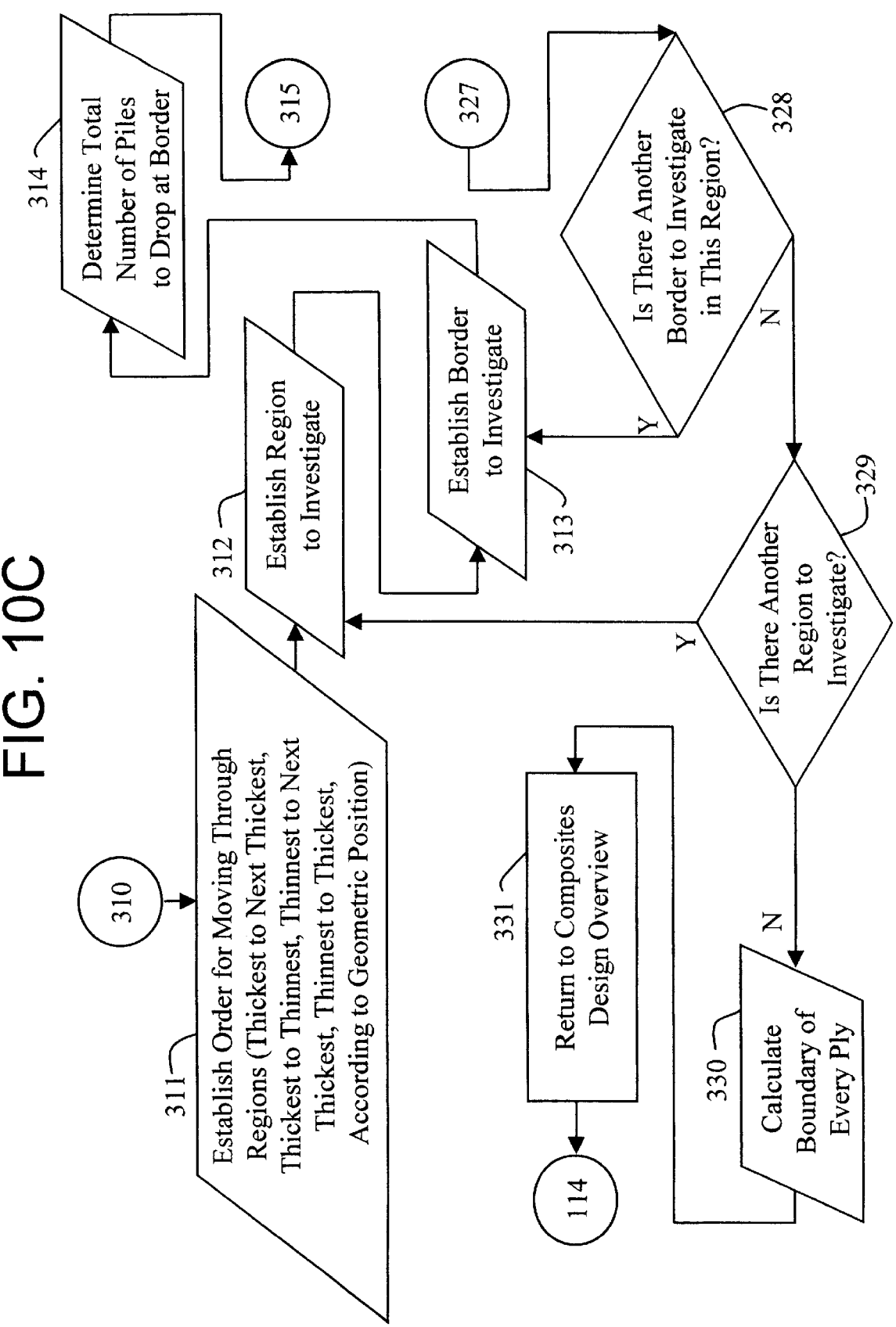
Figure 10E:
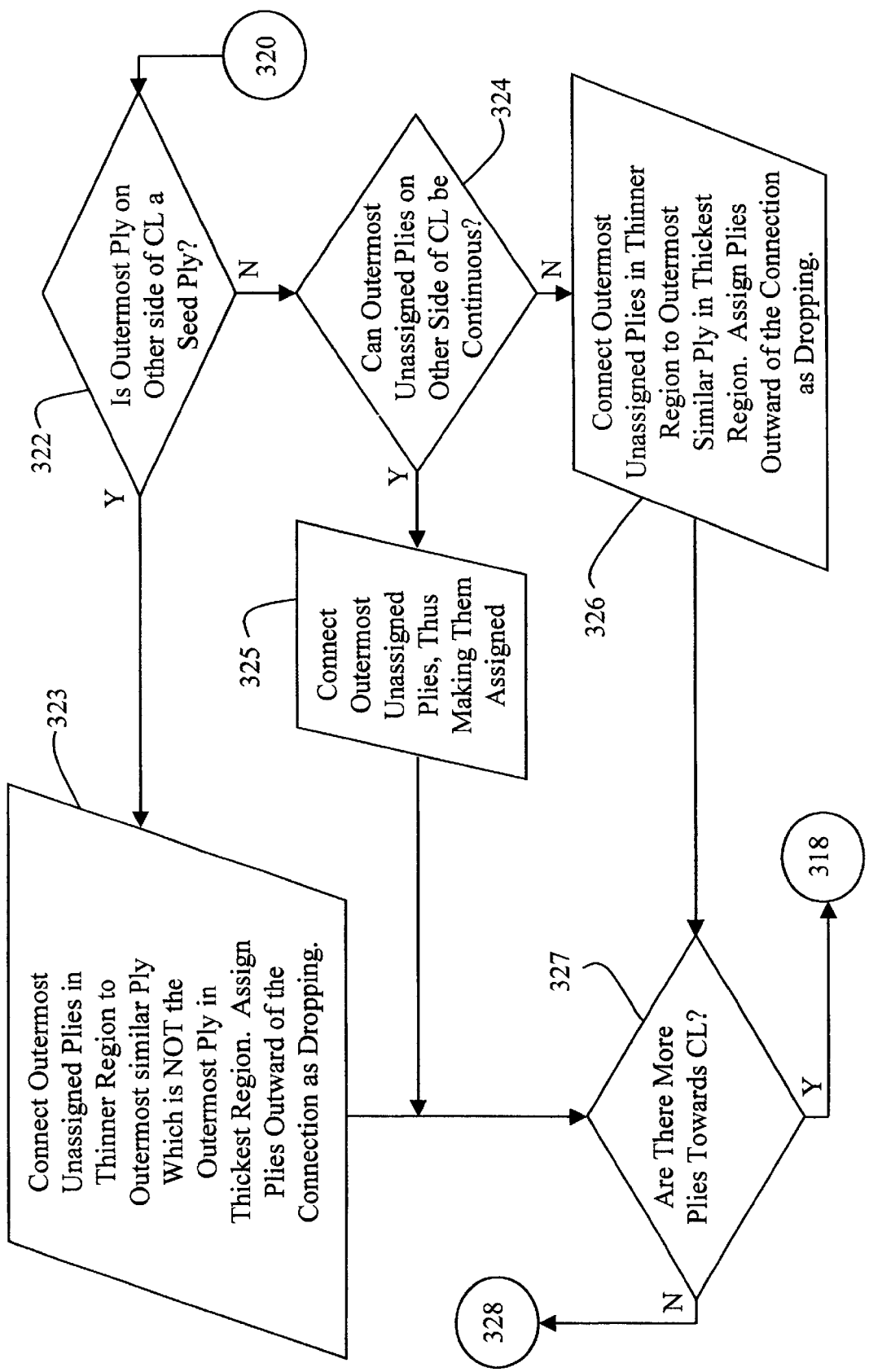
Figure 11A:
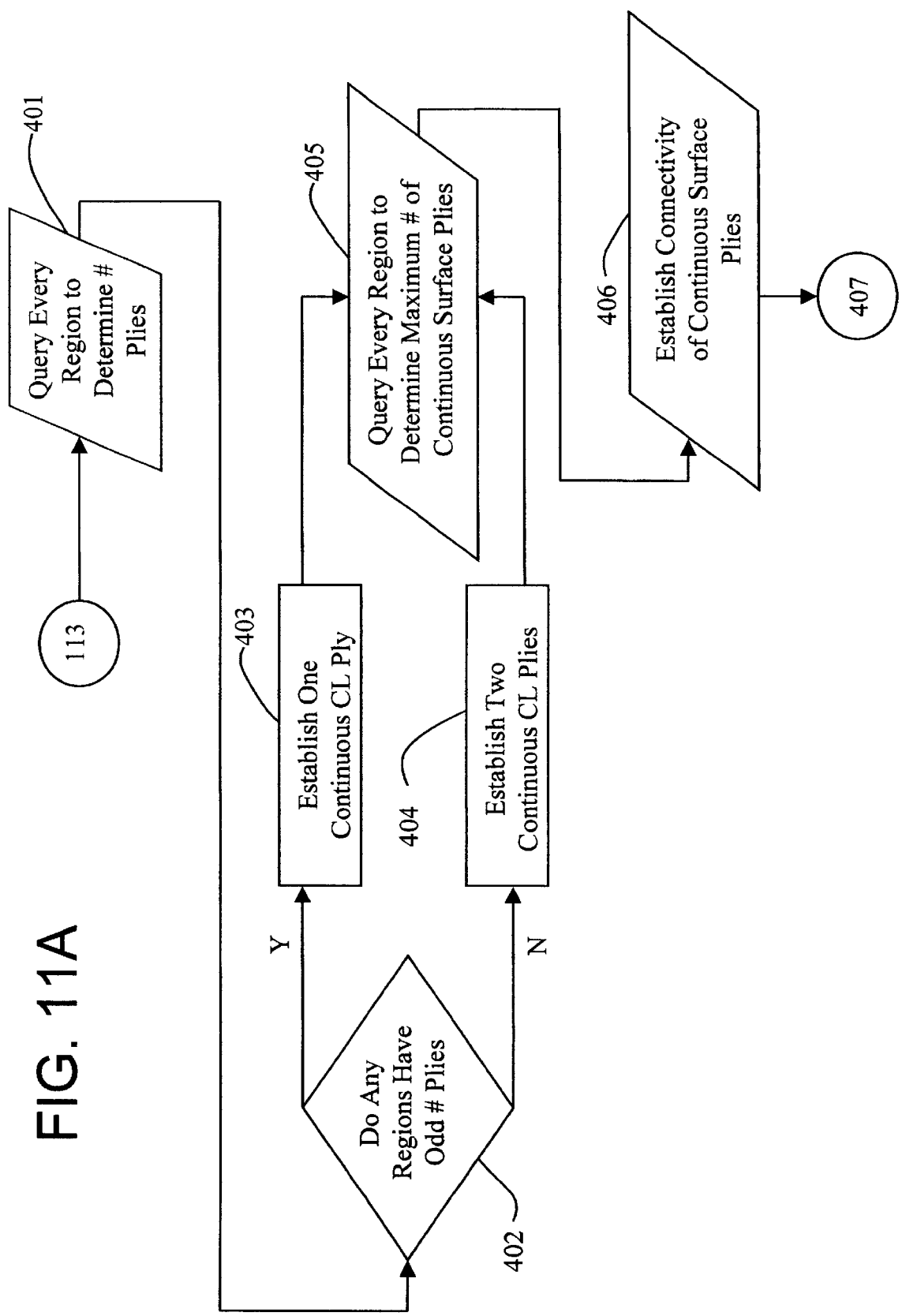
Figure 11C:
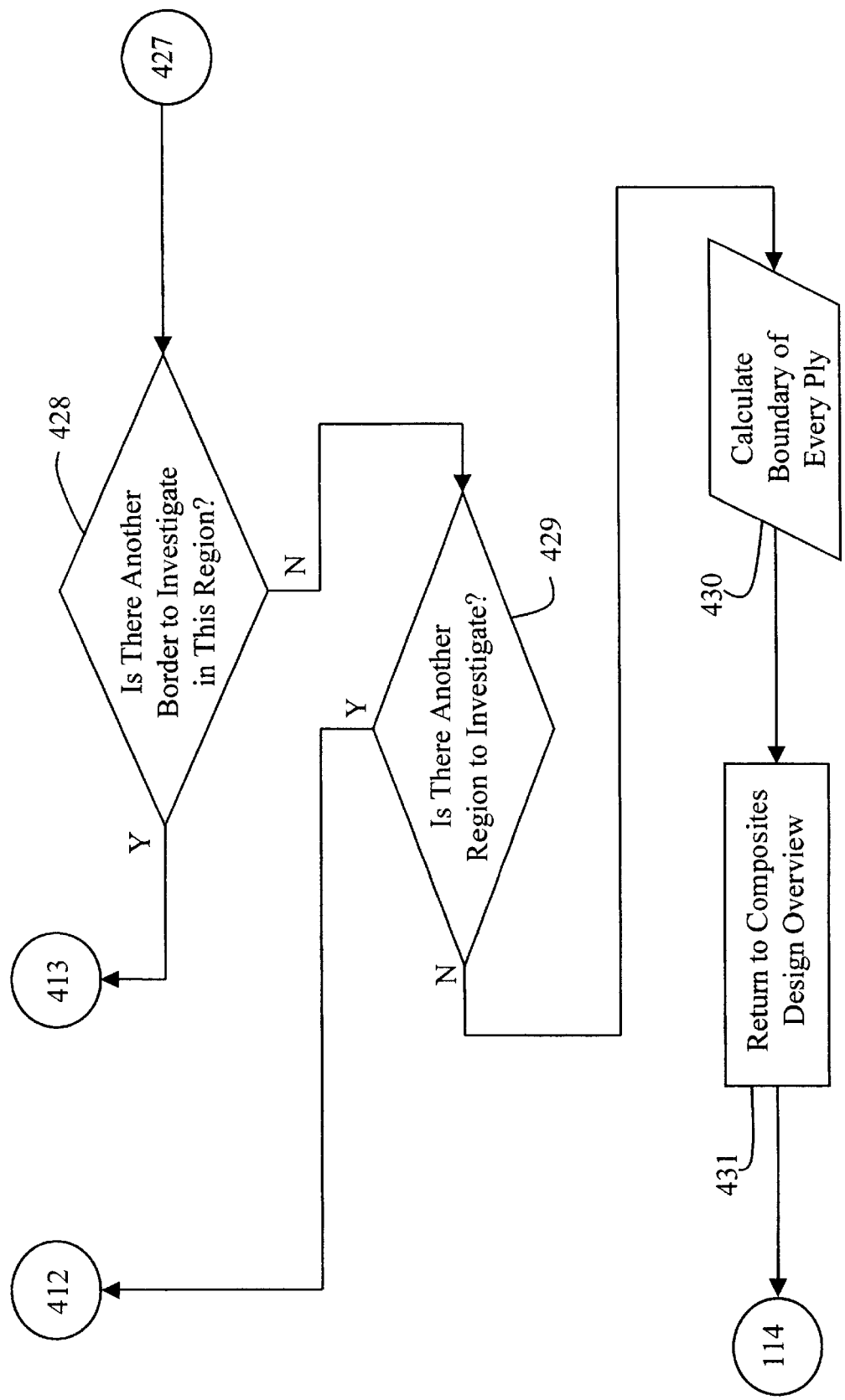
Figure 11D:
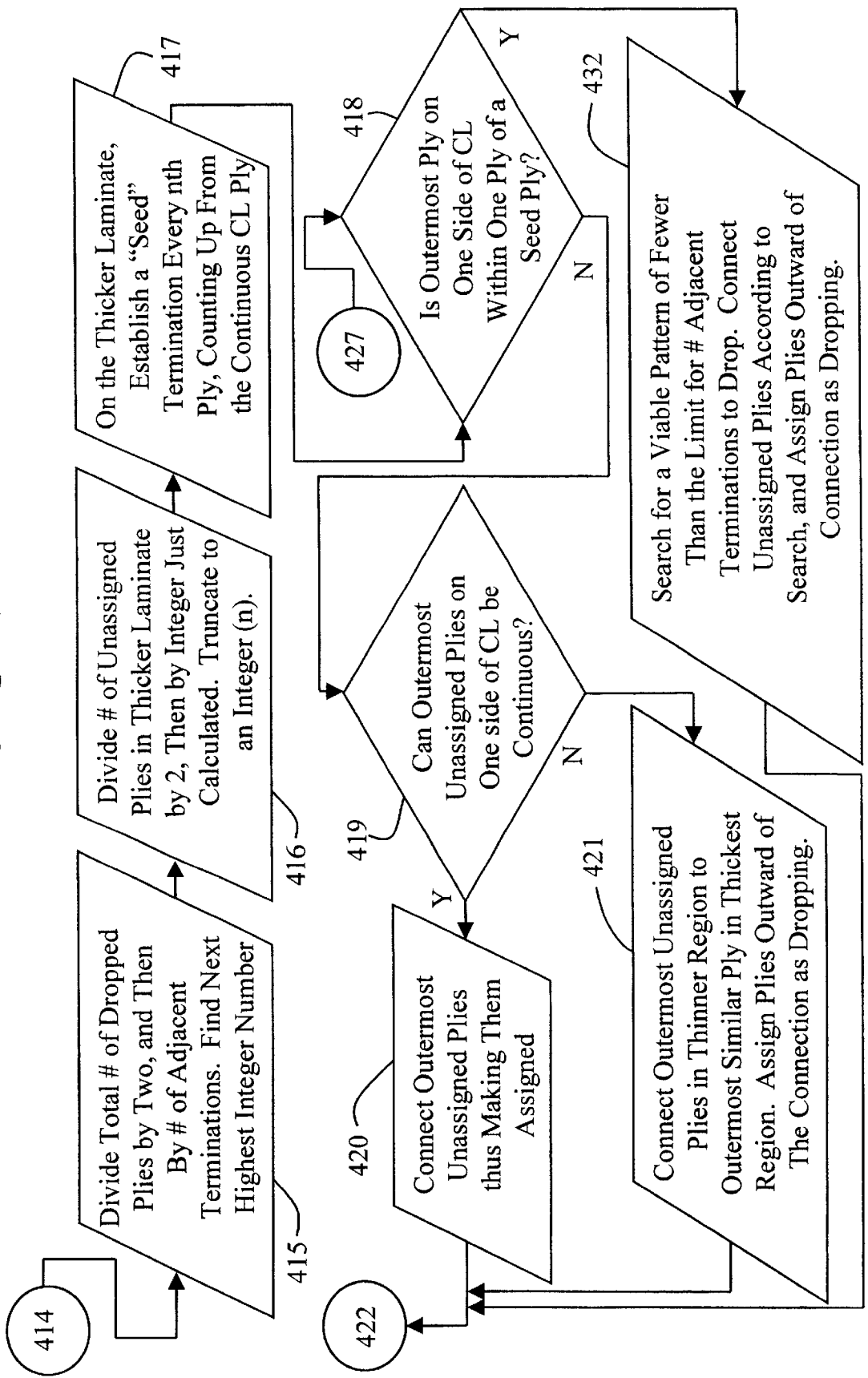
Figure 11E:
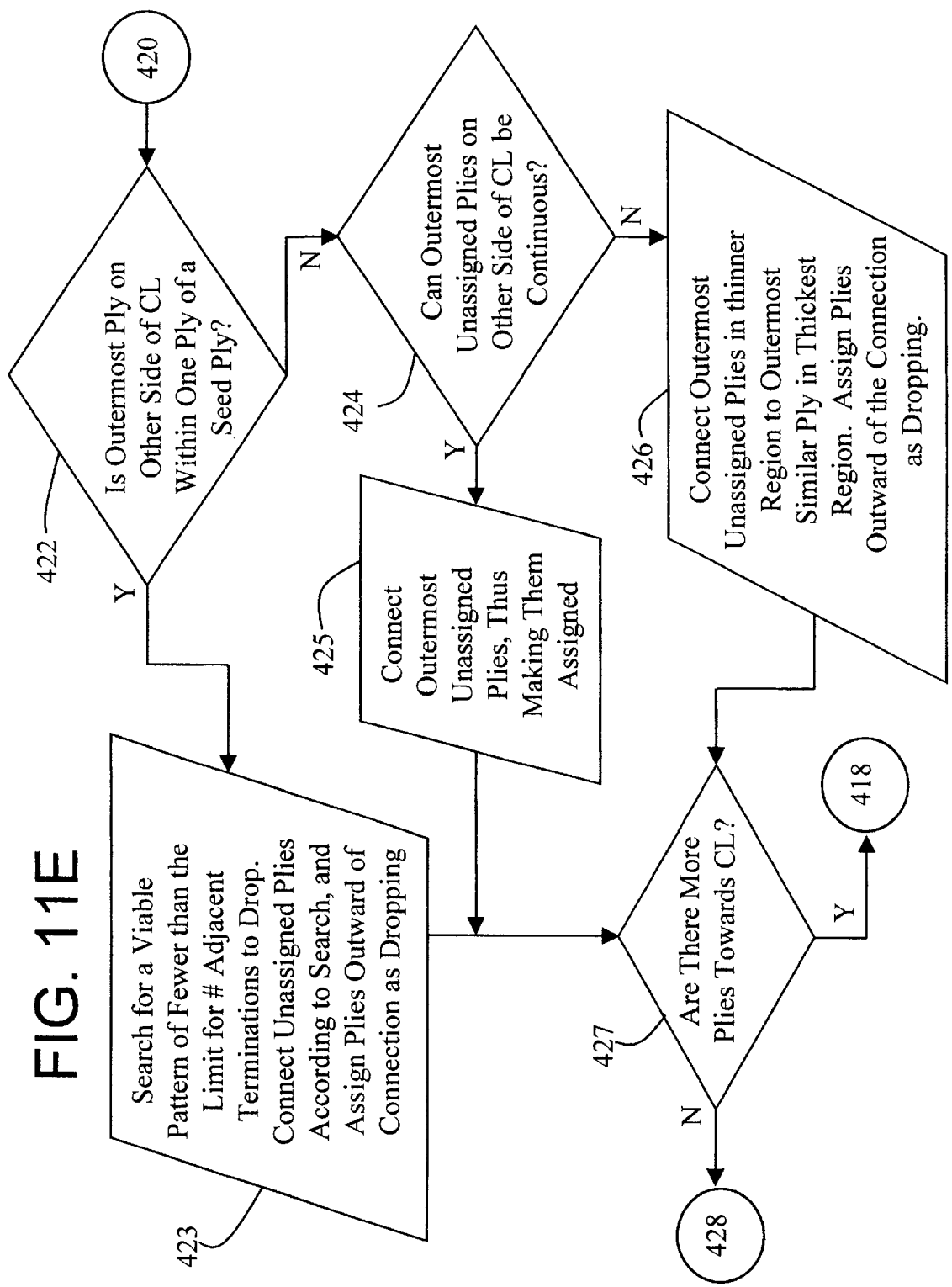
Figure 12A:
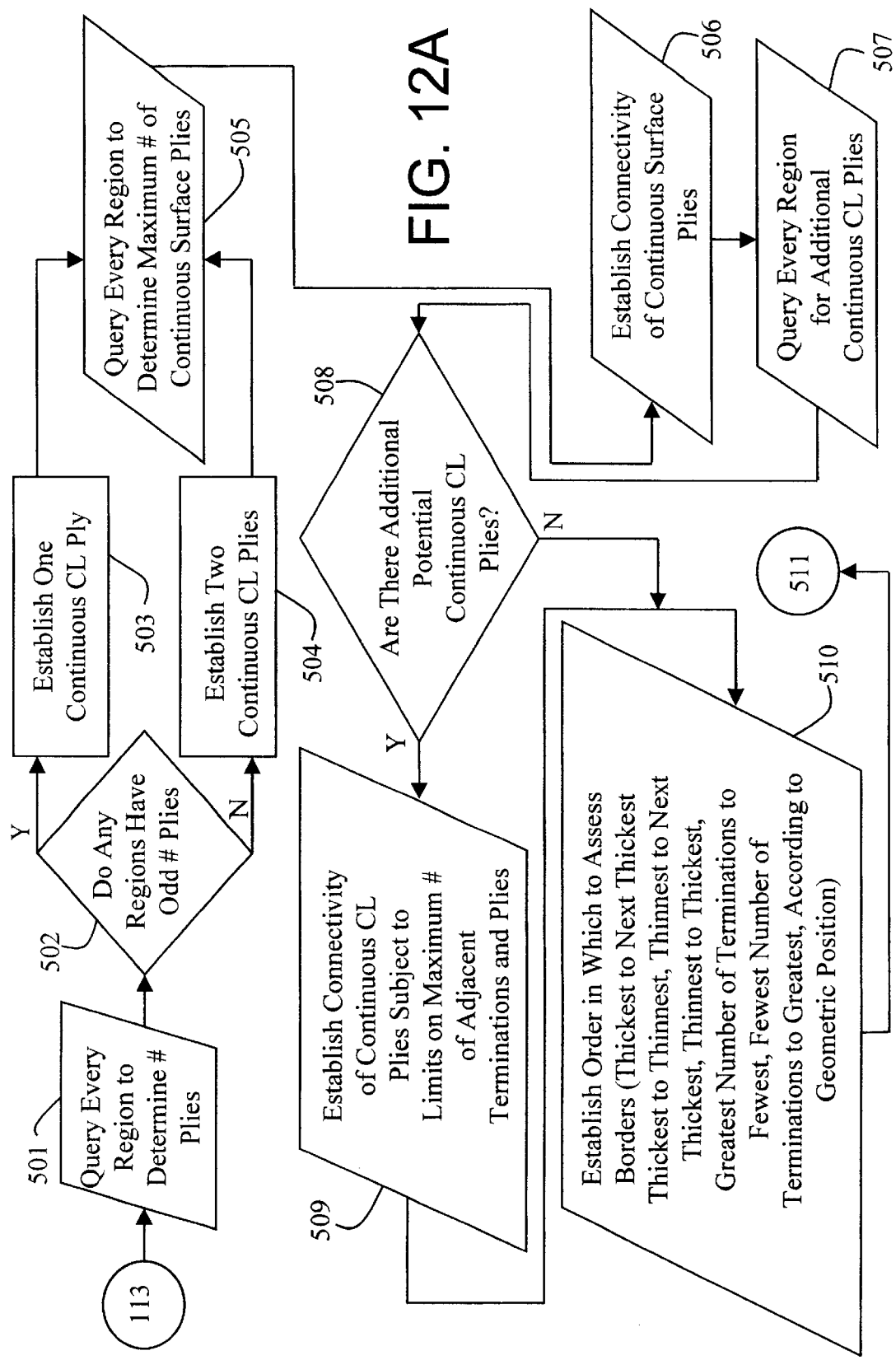
FIGS. 12A–12D collectively show a fourth alternative subroutine for establishing ply connectivity in PACKS described in FIGS. 8A–8D.
Figure 12B:
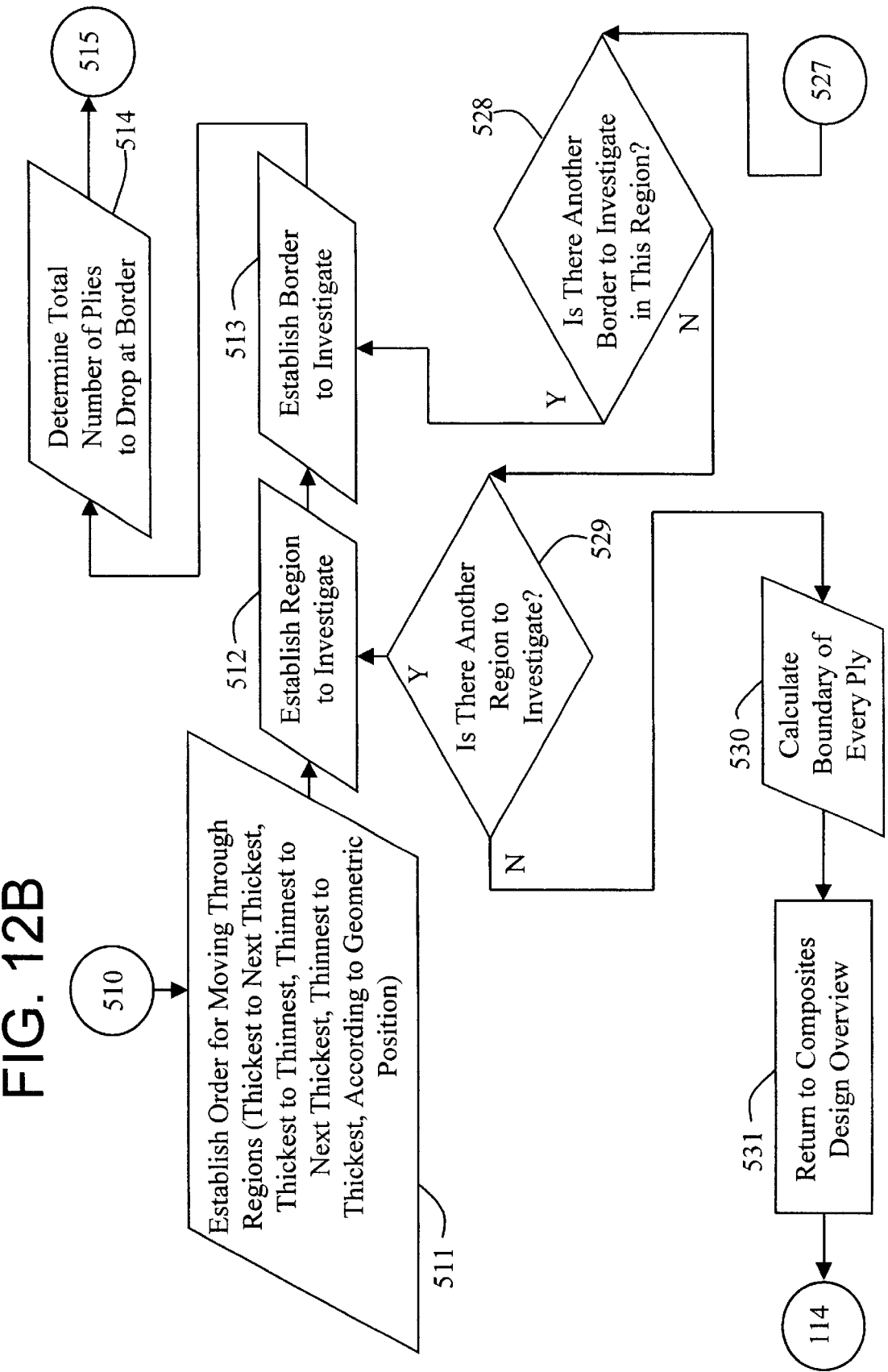
Figure 12C:
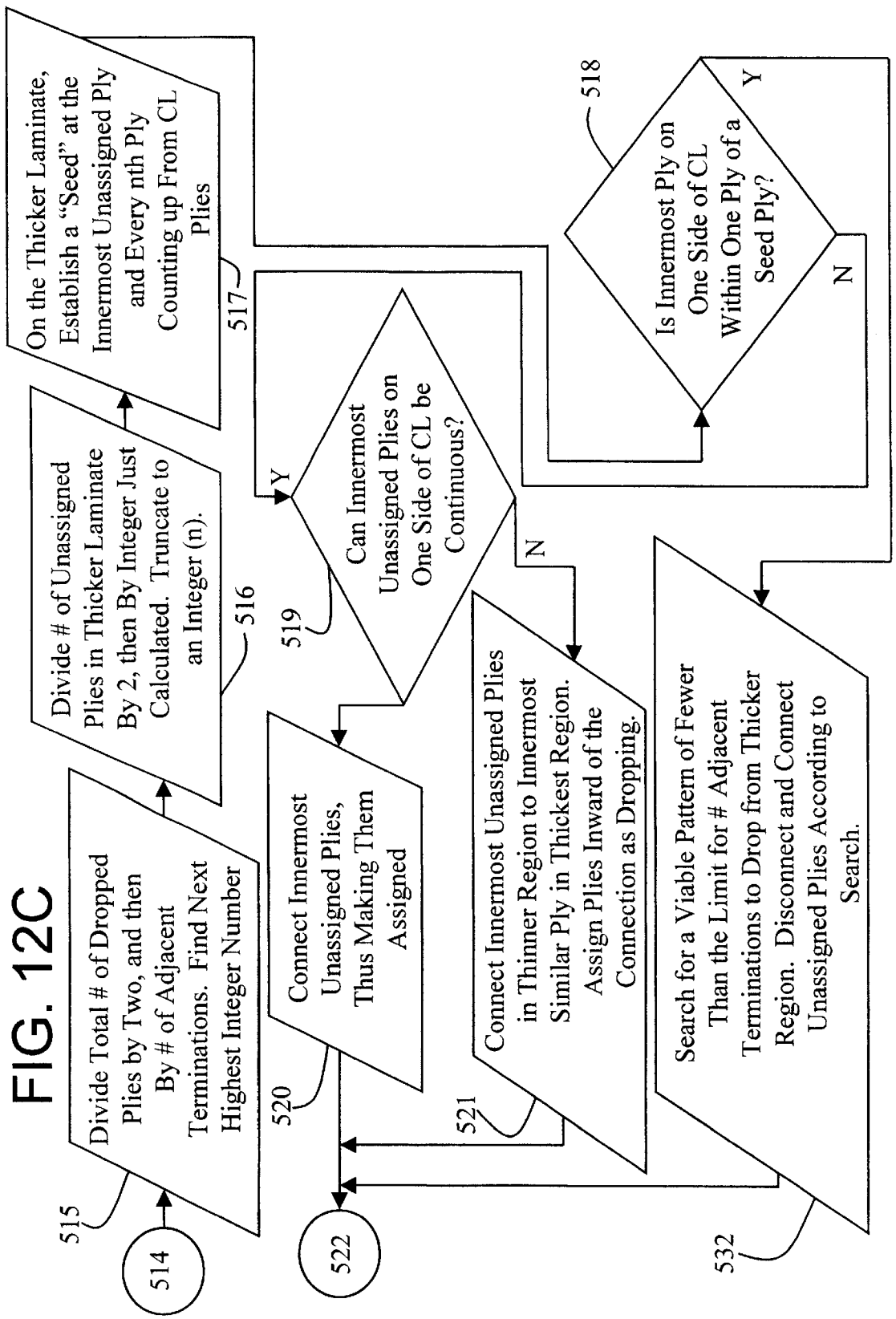
Figure 12D:
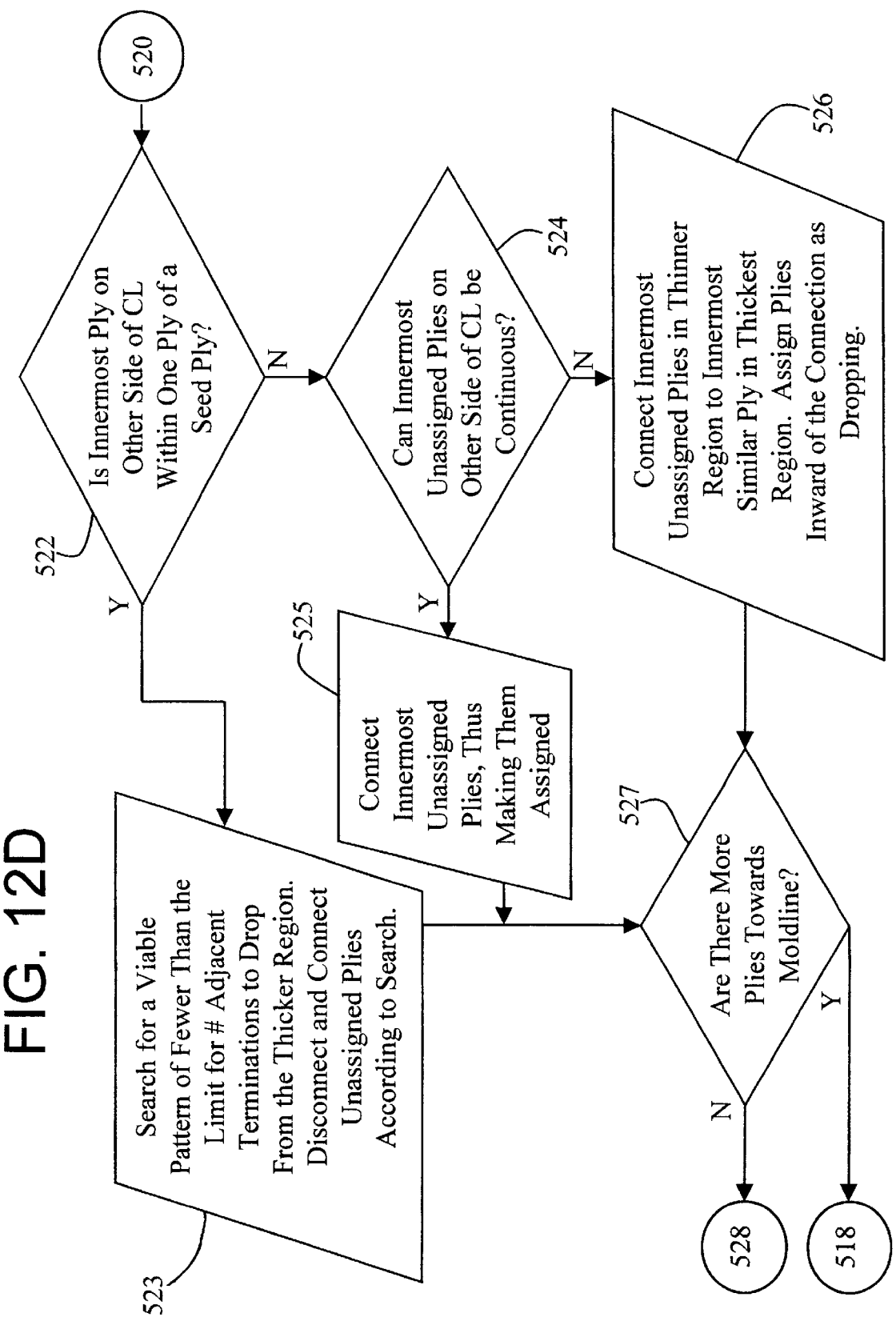

An alternative preferred embodiment of the composite design optimization process according to the present invention illustrated in the flowchart of FIGS. 10A and 10E will now be described briefly. It should be mentioned that the subroutine depicted in FIGS. 10A and 10E refers to the so-called method of establishing ply connectivity by dropping plies at seed plies moving out-to-in. It should also be mentioned that the preparatory steps, i.e., steps 301 to 313 of FIGS. 10A and 10B are virtually identical to similar steps in the flowchart of FIGS. 9A–9D. Thus, steps 301 to 313 of FIGS. 10A and 10E will not be described in the interest of brevity.

Jumping ahead to step 314, the total number of plies to drop at the border is determined. Then, step 315 is performed to divide the total number of dropped plies by two, and then by the number of adjacent terminations; based on these results, the next highest integer number is determined. Next, step 316 is executed to divide the number of unassigned plies in a thicker laminate by two, then by the integer just calculated in step 315. The result is then truncated to an integer (n). During step 317, a "seed" termination is established every Nth ply, counting up from the continuous centerline ply, on the thicker laminate.

A series of queries is then performed to determine ply optimization with respect to the seed ply. First, step 318 is performed to determine if the outermost ply on one side of the centerline is the seed ply. When the answer is negative, an additional query is performed at step 319 to determine whether the outermost unassigned plies on one side of the centerline can be made continuous. If the answer is affirmative, step 320 is performed to connect the outermost unassigned plies, thus making these plies assigned; when the answer is negative, step 321 is executed to connect the outermost unassigned plies in the thinner region to the outermost similar ply in the thickest region and to assign plies outward of the connection as dropping. It will be noted from FIGS. 10A and 10B that when the response at step 318 is affirmative, step 332 is performed to connect the outermost unassigned plies in the thinner region to the outermost similar ply which is not the outermost ply in the thickest region and to assign the plies outward of the connection as dropping. In any event, step 322 is performed following completion of one of the steps 320, 321 and 332.

At step 322, another query is performed in order to determine whether the outermost ply on the other side of the centerline is a seed ply. Assuming the answer is YES, step 323 is performed to connect the outermost unassigned plies in the thinner region to the outermost similar ply which is not the outermost ply in the thickest region and to assign the plies outward of the connection as dropping. In the event that the answer is negative, step 324 can be performed to determine whether the outermost unassigned plies on the other side of the centerline advantageously can be made continuous. When the answer is affirmative, step 325 is executed to connect the outermost unassigned plies, thus making these plies assigned; when the answer is negative, step 326 is performed to connect the outermost unassigned plies in the thinner region to the outermost similar ply in the thickest region and to assign the plies outward of the connection as dropping.

Regardless of the action taken responsive to step 322, step 327 is then performed to determine whether there are more plies toward the centerline. When the answer is affirmative, the subroutine repeats step 318 and subsequent steps; when the answer is negative, step 328 is performed to determine whether there is another border to investigate in this region. If there are no more borders, step 329 is performed to determine whether there is another region to investigate. When the answer at step 328 is affirmative, the subroutine jumps to the start of step 313; when the answer at step 329 is affirmative, the subroutine jumps to the start of step 312. In the event that the answer at both steps 328 and 329 are negative, step 330 is performed to calculate the boundary of every ply and then step 331 is performed to return to the PACKS process of FIGS. 8A–8D.

Another alternative preferred embodiment of the composite design optimization process according to the present invention illustrated in the flowchart of FIGS. 11A–11E will also be described briefly. It should be noted FIGS. 11A–11E refer to the so-called method of establishing ply connectivity by dropping ply packs at seed plies moving out-to-in. It should also be mentioned that the preparatory steps, i.e., steps 401 to 413 of FIGS. 11A–11E are virtually identical to similar steps in the flowcharts of FIGS. 9A–9D and 10A–10E. For that reason, a detailed discussion regarding steps 401 to 413 of FIGS. 11A–11E will not be provided.

Starting with step 414, the total number of plies to drop at the border is first determined. Then, step 415 is performed to divide the total number of dropped plies by two, and then by the number of adjacent terminations; based on these results, the next highest integer number is determined. Next, step 416 is executed to divide the number of unassigned plies in a thicker laminate by two, then by the integer just calculated in step 415. The result is then truncated to an integer (n). During step 417, a "seed" termination is established every Nth ply, counting up from the continuous centerline ply, on the thicker laminate.

Step 418 is then performed to determine whether the outermost ply on one side of the centerline is within one ply of a seed ply. If the answer is negative, step 419 is performed to question whether the outermost unassigned plies on one side of the centerline advantageously can be made continuous; when the answer is affirmative, step 432 is executed to search for a viable pattern of fewer than the limit for the number of adjacent terminations to drop, to then connect the unassigned plies according to the search results, and to assign plies outward of the connection as dropping. With respect to step 419, when the answer is affirmative, step 420 is executed to connect the outermost unassigned plies, thus making these plies assigned; when the answer is negative, step 421 is performed to connect the outermost unassigned plies in the thinner region to the outermost similar ply in the thickest region and to assign the plies outward of the connection as dropping. In any event, step 422 is performed following completion of one of the steps 420, 421 and 432.

At step 422, another query is performed in order to determine whether the outermost ply on the other side of the centerline is within one ply of a seed ply. Assuming the answer is YES, step 423 is then performed to search for a viable pattern of fewer than the limit for the number of adjacent terminations to drop, to connect unassigned plies according to the search results, and to assign plies outward of the connection as dropping. In the event that the answer is negative, step 424 can be performed to determine whether the outermost unassigned plies on other side of the centerline advantageously can be made continuous. When the answer is affirmative, step 425 is executed to connect the outermost unassigned plies, thus making these plies assigned; when the answer is negative, step 426 is performed to connect the outermost unassigned plies in the thinner region to the outermost similar ply in the thickest region and to assign the plies outward of the connection as dropping.

Irrespective of the action taken responsive to step 422, step 427 is then performed to determine whether there are more plies toward the centerline. When the answer is affirmative, the subroutine repeats step 418 and subsequent steps; when the answer is negative, step 428 is performed to determine whether there is another border to investigate in this region. If there are no more borders, step 429 is performed to determine whether there is another region to investigate. When the answer at step 428 is affirmative, the subroutine jumps to the start of step 413; when the answer at step 429 is affirmative, the subroutine jumps to the start of step 412. In the event that the answer at both steps 428 and 429 is negative, step 430 is performed to calculate the boundary of every ply and then step 431 is performed to return to the PACKS process of FIGS. 8A–8D.

Yet another alternative preferred embodiment of the composite design optimization process according to the present invention illustrated in the flowchart of FIGS. 12A–12D will also be described briefly. It should be noted that the connectivity subroutine depicted in FIGS. 12A–12D refers to the so-called method of establishing ply connectivity by dropping ply a packs at seed plies moving in-to-out. It should also be mentioned that the prefatory steps, i.e., steps 501 to 516 of FIGS. 12A–12D are substantially similar to like numbered steps in the flowcharts of FIGS. 9A–9D through 11A–11E. For that reason, a detailed discussion regarding steps 501 to 516 of FIGS. 12A and 12B will be omitted.

Starting with step 517, a "seed" termination is established at the innermost unassigned ply and every Nth ply thereafter, counting up from the centerline plies, on the thicker laminate. Step 518 is then performed to determine whether the innermost ply on one side of the centerline is within one ply of a seed ply. If the answer is negative, step 519 is performed to question whether the innermost unassigned plies on one side of the centerline advantageously can be made continuous; when the answer is affirmative, step 532 is executed to search for a viable pattern of fewer than the limit for the number of adjacent terminations to drop from the thicker region, and to then disconnect and reconnect the unassigned plies according to the search results. With respect to step 519, when the answer is affirmative, step 520 is executed to connect the innermost unassigned plies, thus making these plies assigned; when the answer is negative, step 521 is performed to connect the innermost unassigned plies in the thinner region to the innermost similar ply in the thickest region and to assign the plies inward of the connection as dropping. In any event, step 522 is performed following completion of one of the steps 520, 521 and 532.

At step 522, another query is performed in order to determine whether the innermost ply on the other side of the centerline is within one ply of a seed ply. Assuming the answer is YES, step 523 is then performed to search for a viable pattern of fewer than the limit for the number of adjacent terminations to drop from the thicker region, and to disconnect and reconnect unassigned plies according to the search results. In the event that the answer is negative, step 524 can be performed to determine whether the innermost plies on other side of the centerline advantageously can be made continuous. When the answer is affirmative, step 525 is executed to connect the innermost unassigned plies, thus making these plies assigned; when the answer is negative, step 526 is performed to connect the innermost unassigned plies in the thinner region to the innermost similar ply in the thickest region and to assign the plies inward of the connection as dropping.

Irrespective of the action taken responsive to step 522, step 527 is then performed to determine whether there are more plies toward the moldline. When the answer is affirmative, the subroutine repeats step 518 and subsequent steps; when the answer is negative, step 528 is performed to determine whether there is another border to investigate in this region. If there are no more borders, step 529 is performed to determine whether there is another region to investigate When the answer at step 528 is affirmative, the subroutine jumps to the start of step 513; when the answer at step 529 is affirmative, the subroutine jumps to the start of step 512. In the event that the answers at both steps 528 and 529 are negative, step 530 is performed to calculate the boundary of every ply and then step 531 is performed to return to the PACKS process of FIGS. 8A–8D.

Figure 13A:
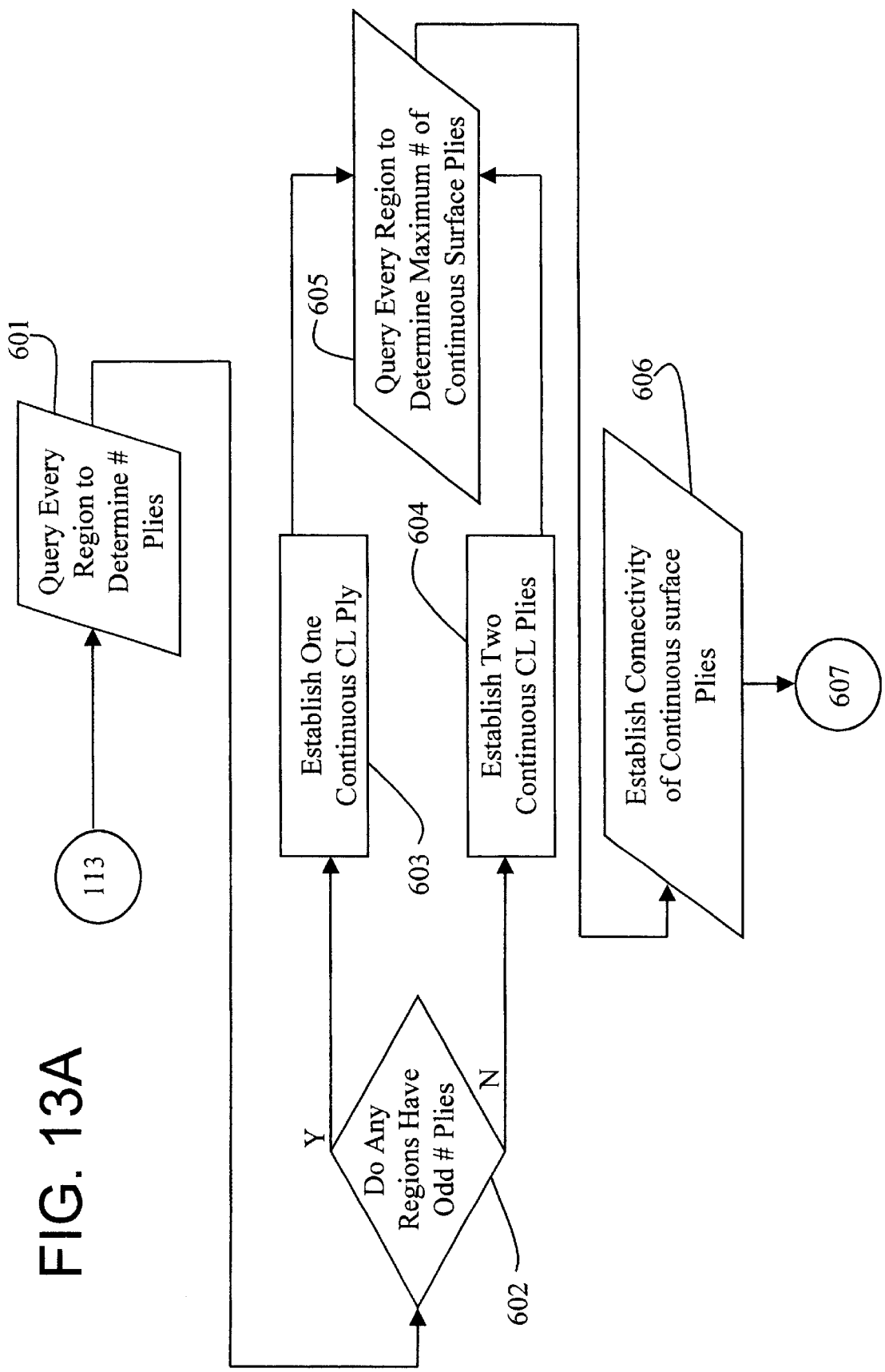
FIGS. 13A–13C depict a fifth alternative subroutine for establishing ply connectivity in PACKS described in FIGS. 8A–8D.
Figure 13B:
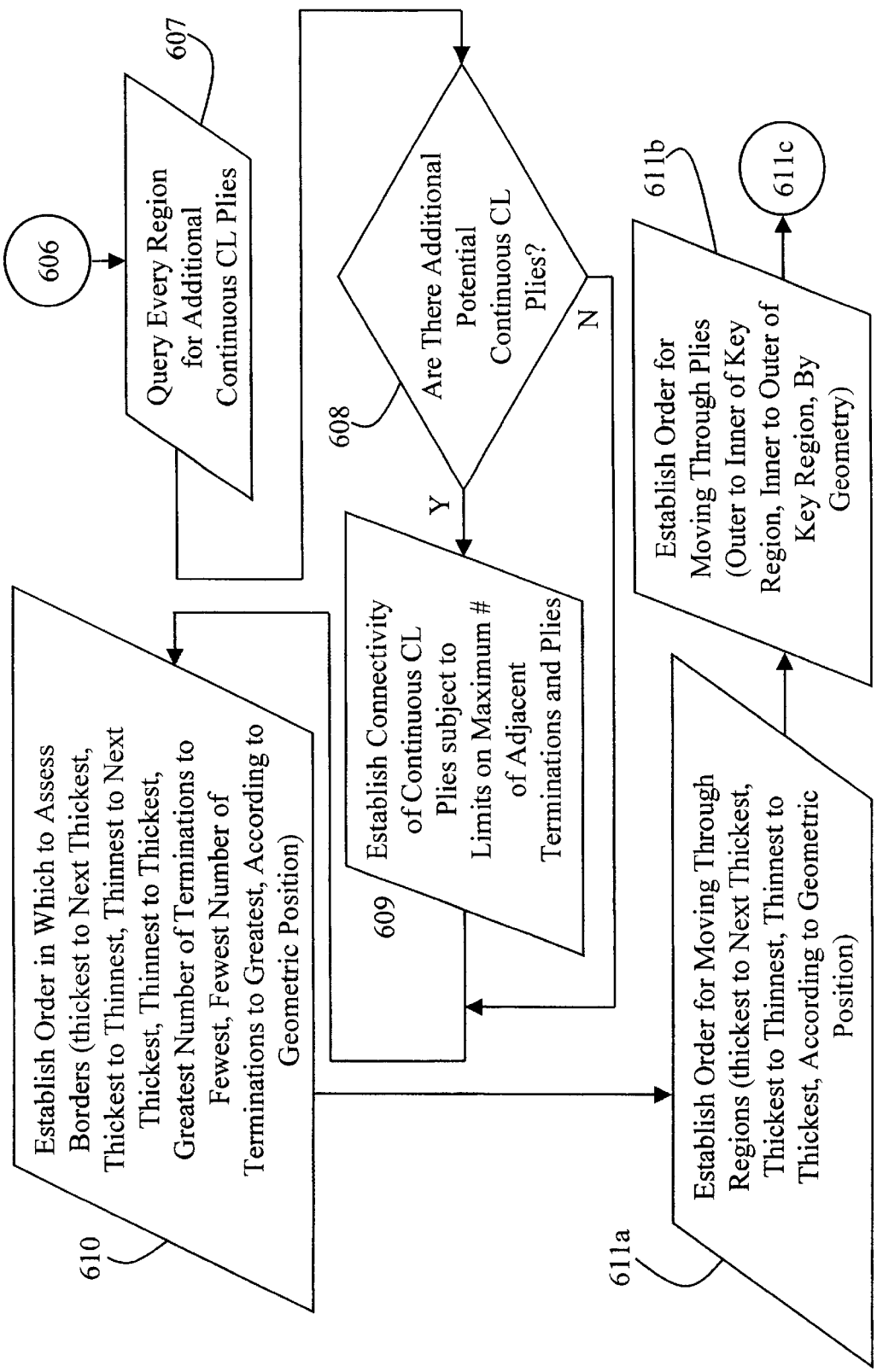
Figure 13C:
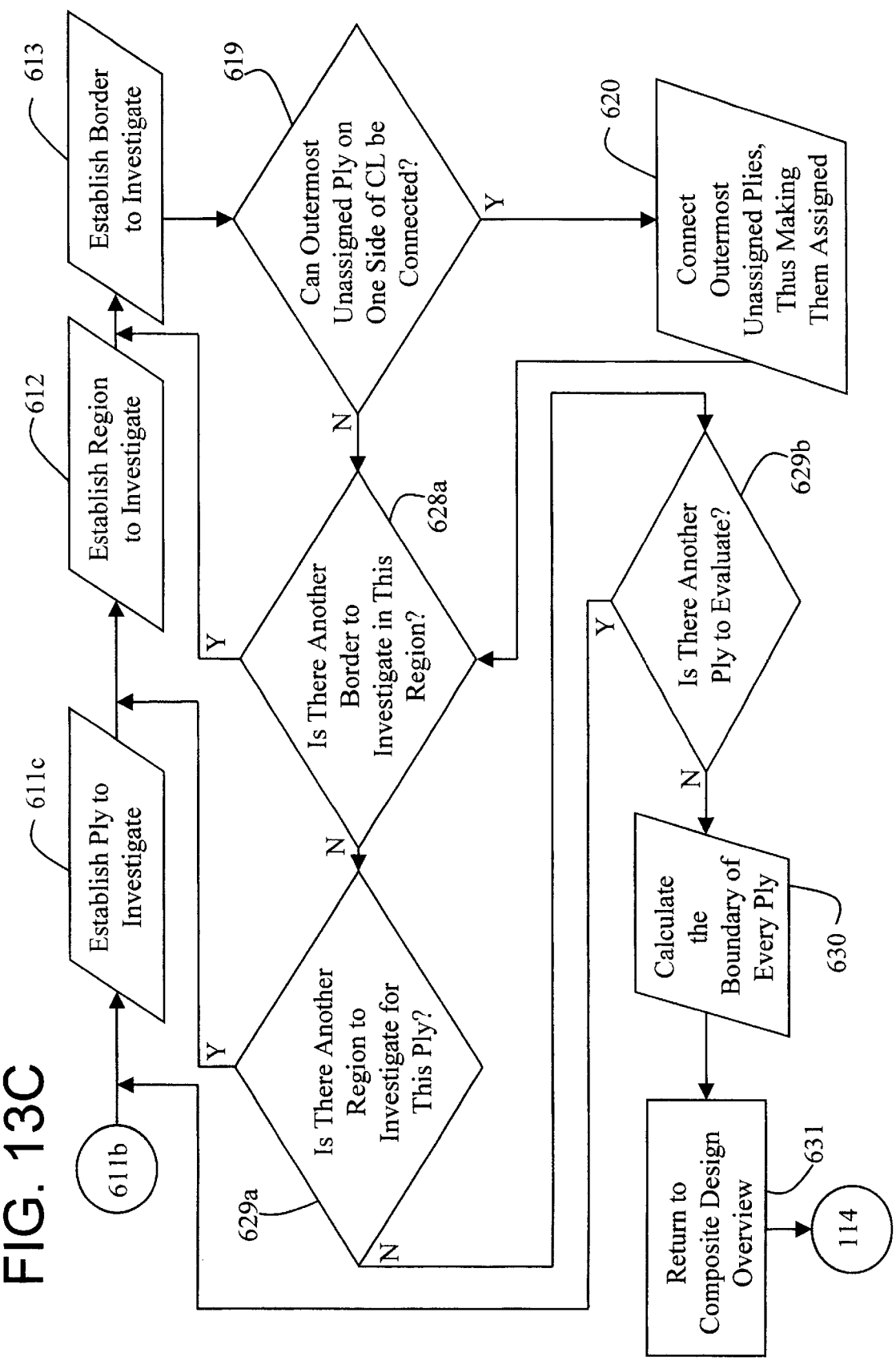
Figure 14B:
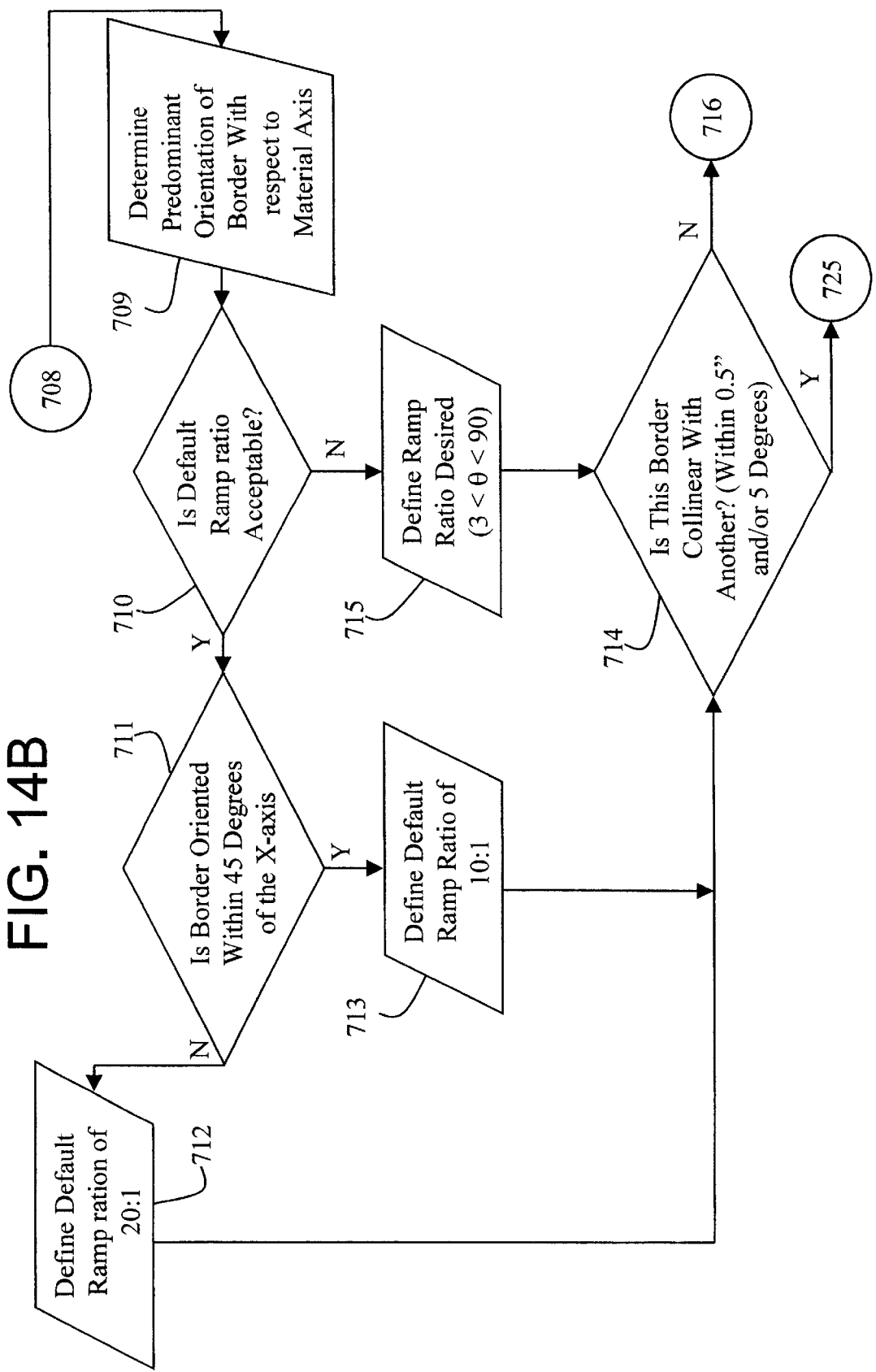
Figure 14C:
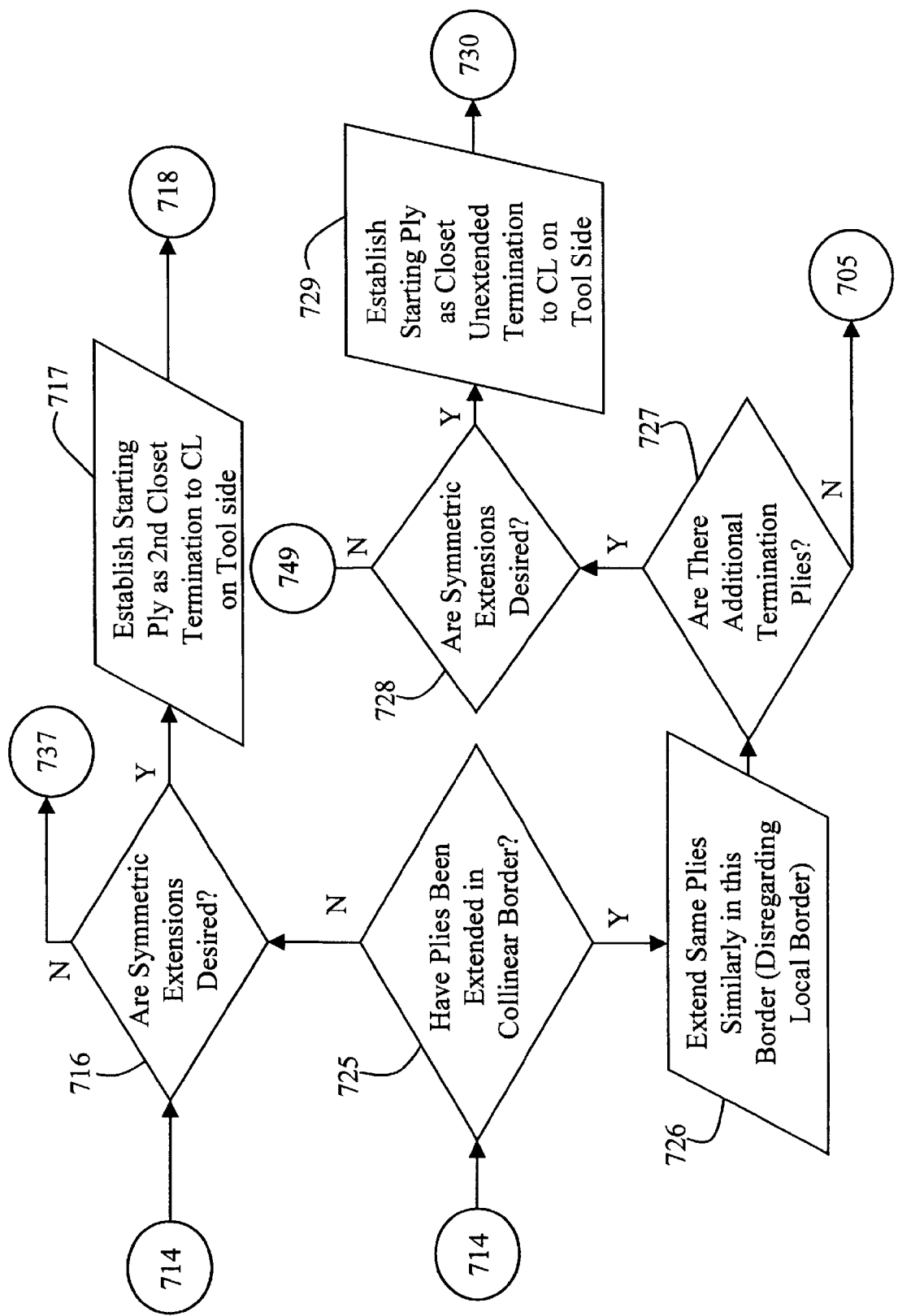
Figure 14D:
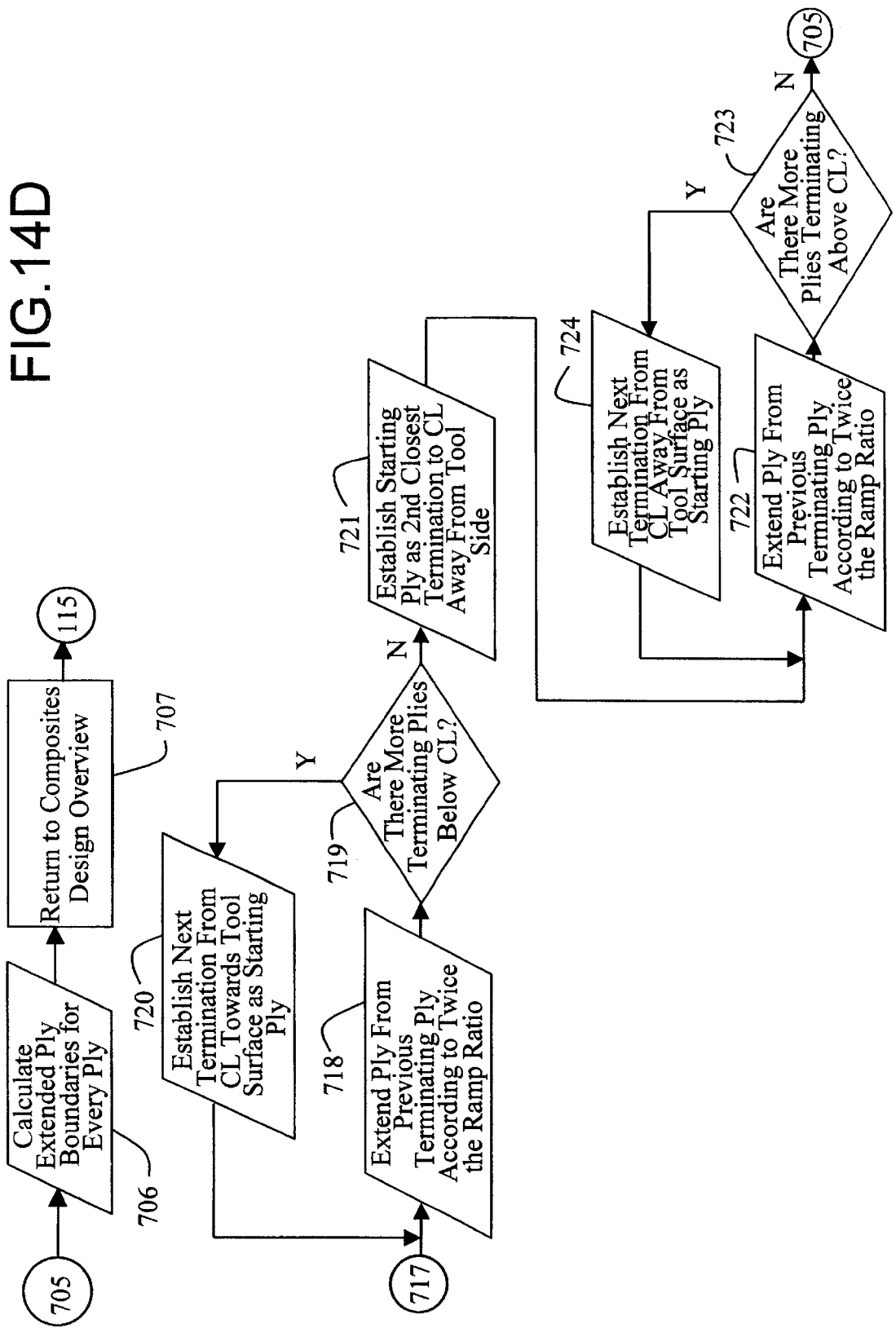
Figure 14E:
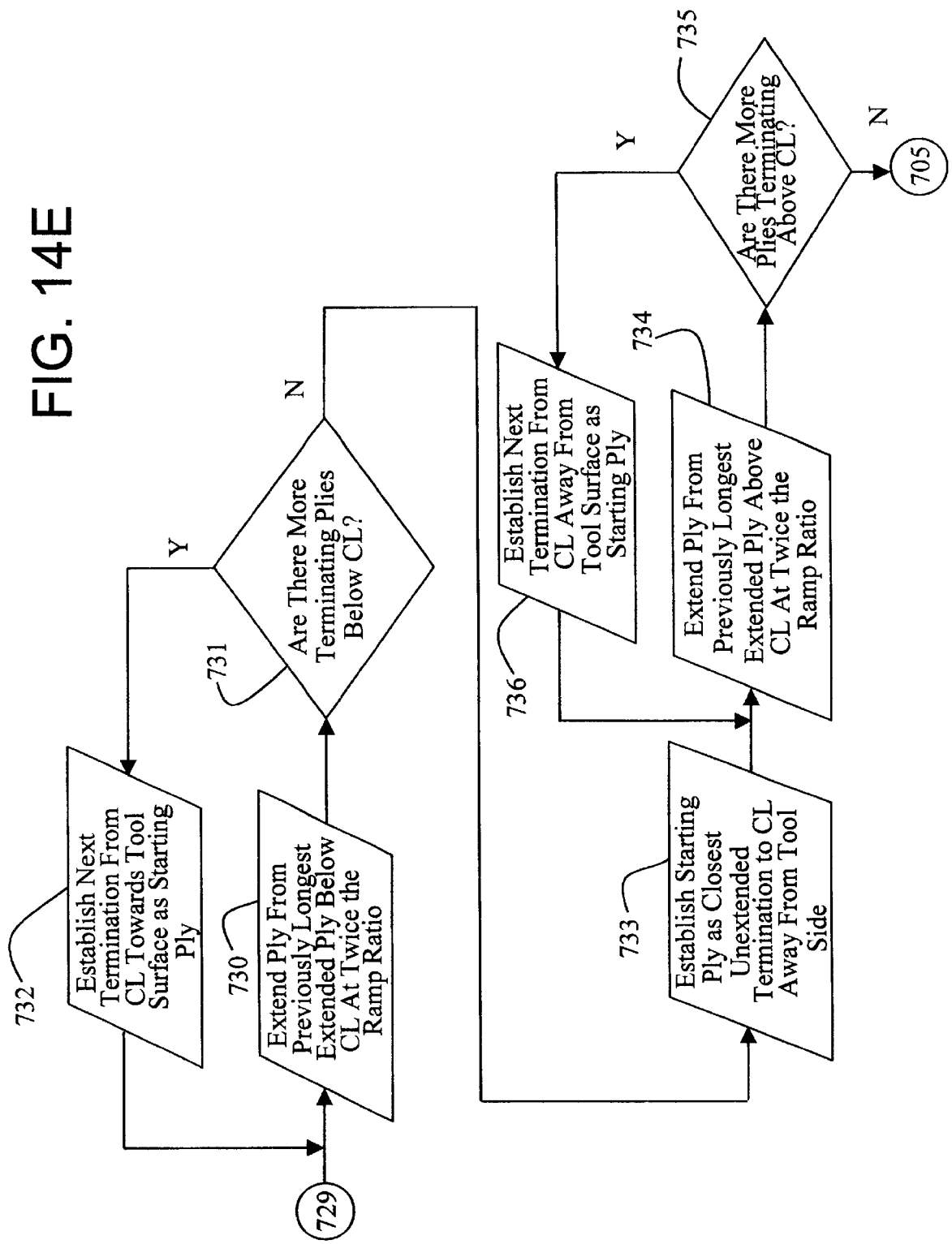
Figure 14F:
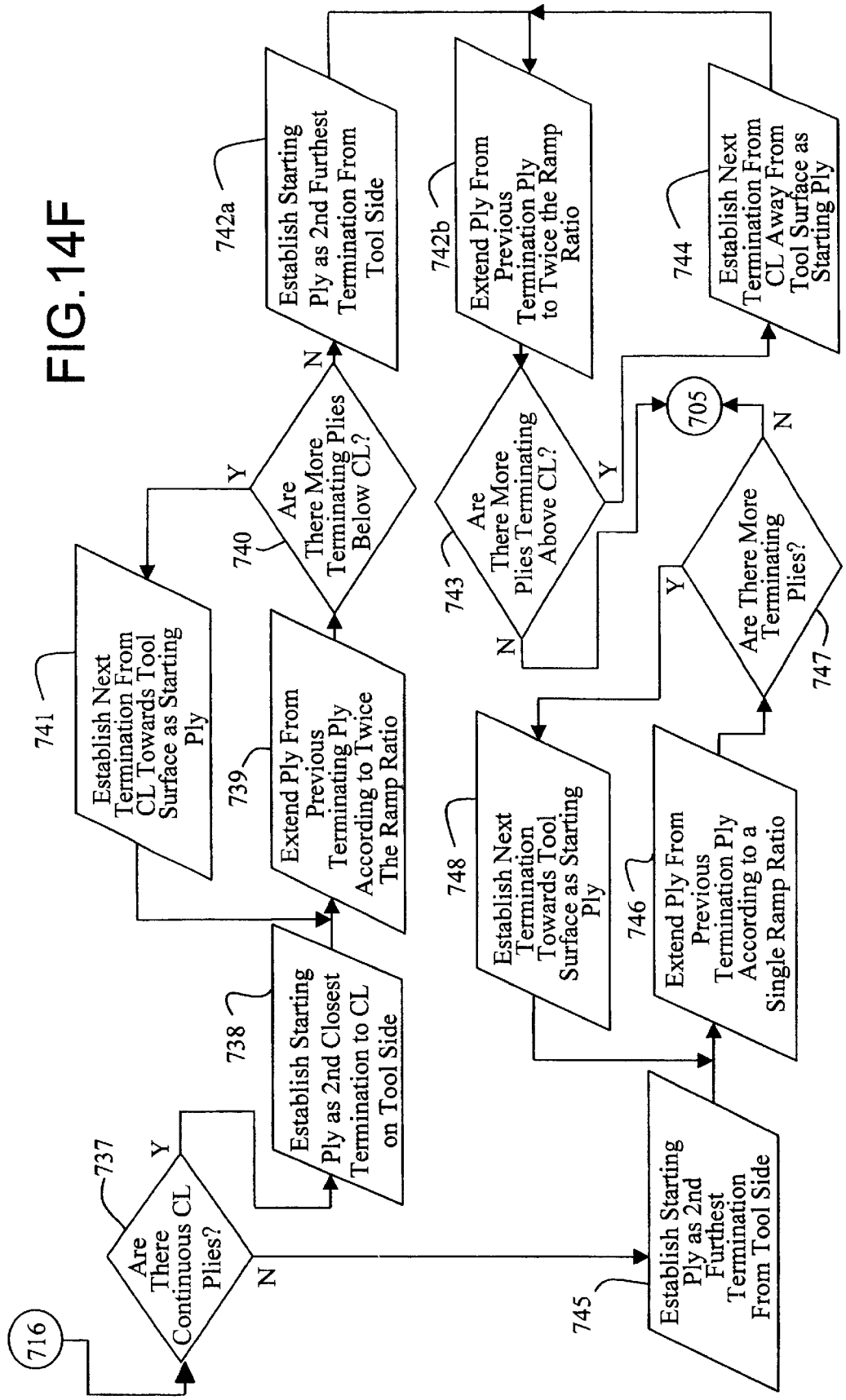
Figure 15A:
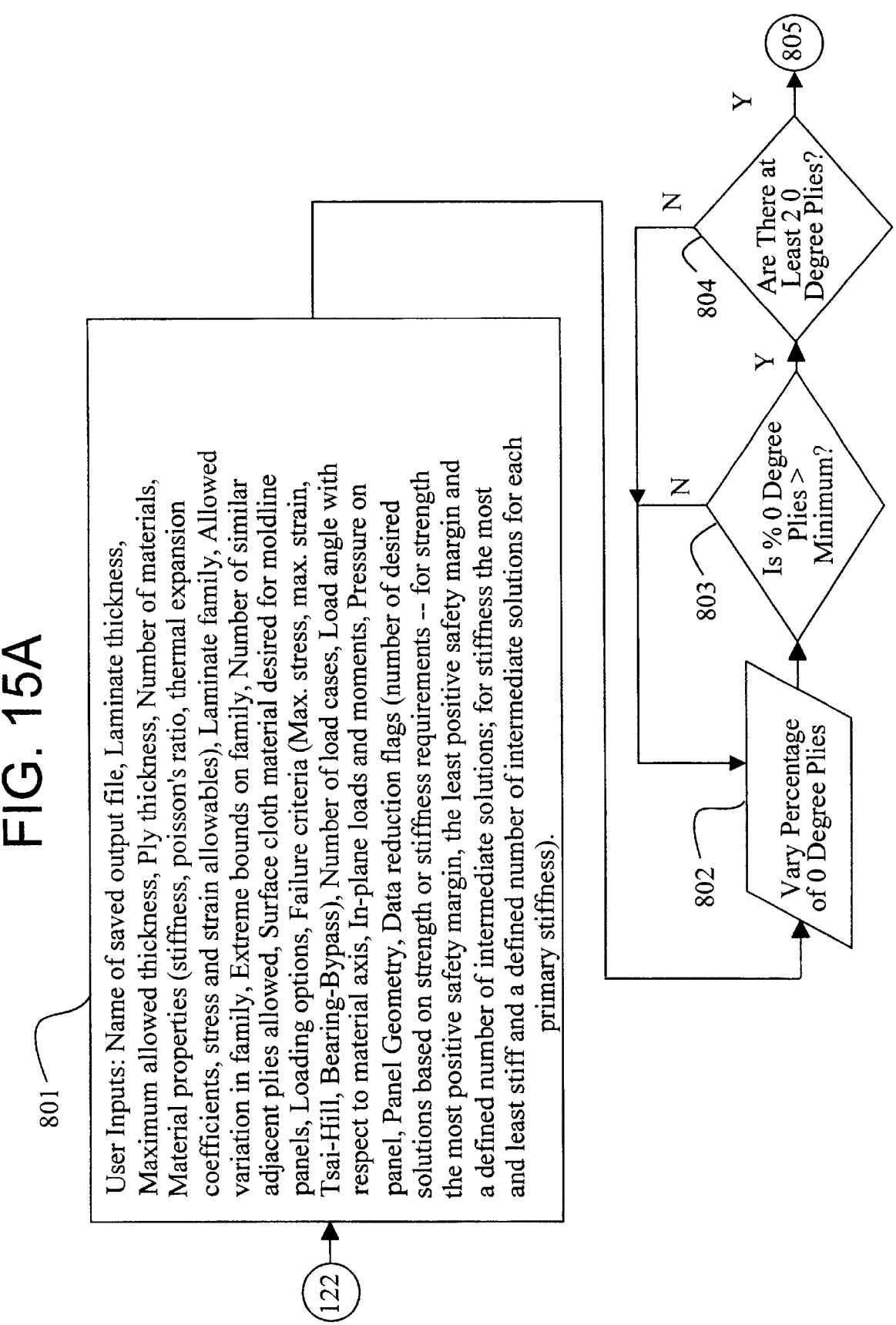
FIGS. 15A through 15E altogether depict a first alternative subroutine for modifying critical laminate boundaries, within PACKS, as illustrated in FIGS. 8A–8D.
Figure 15B:
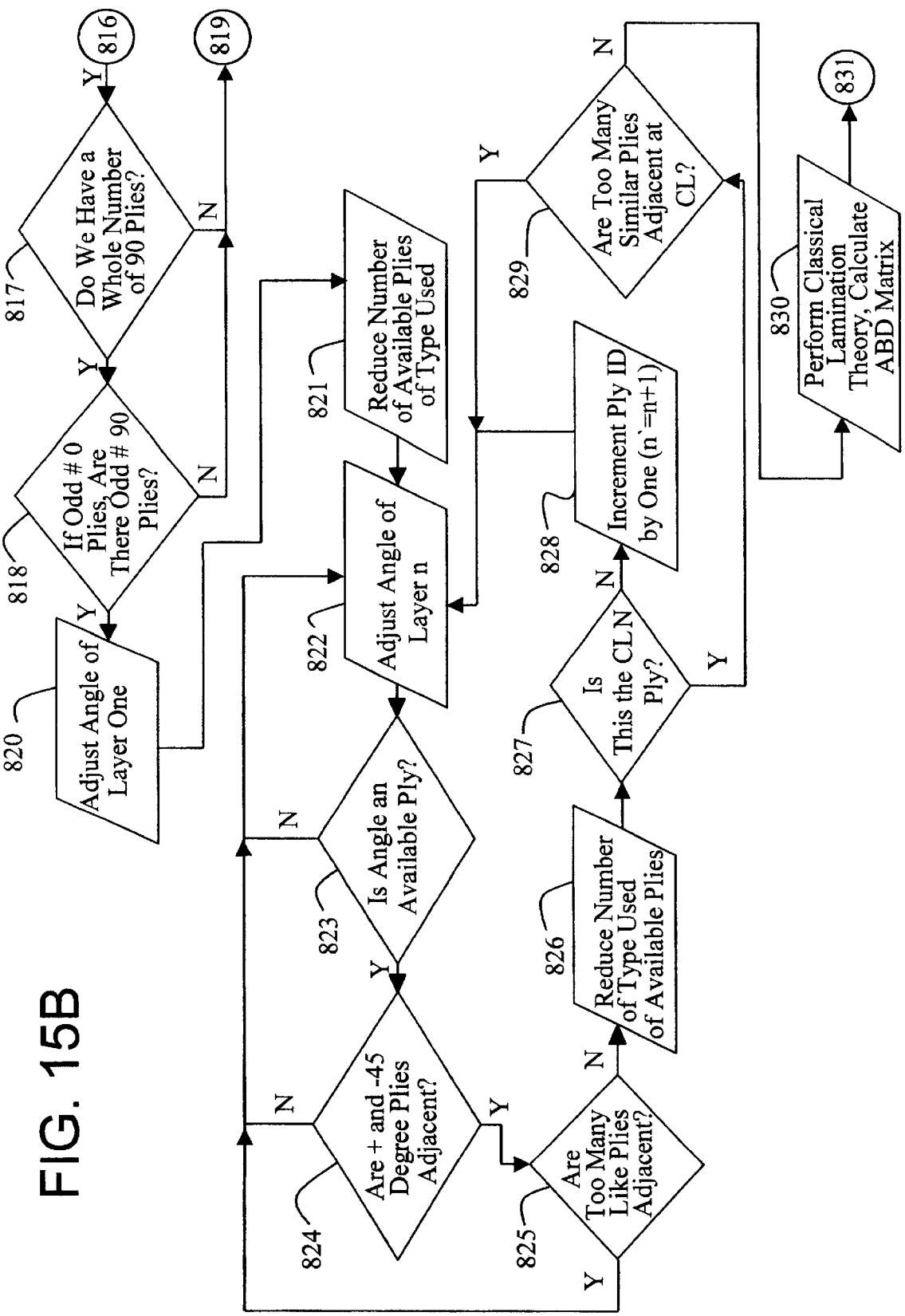
Figure 15C:
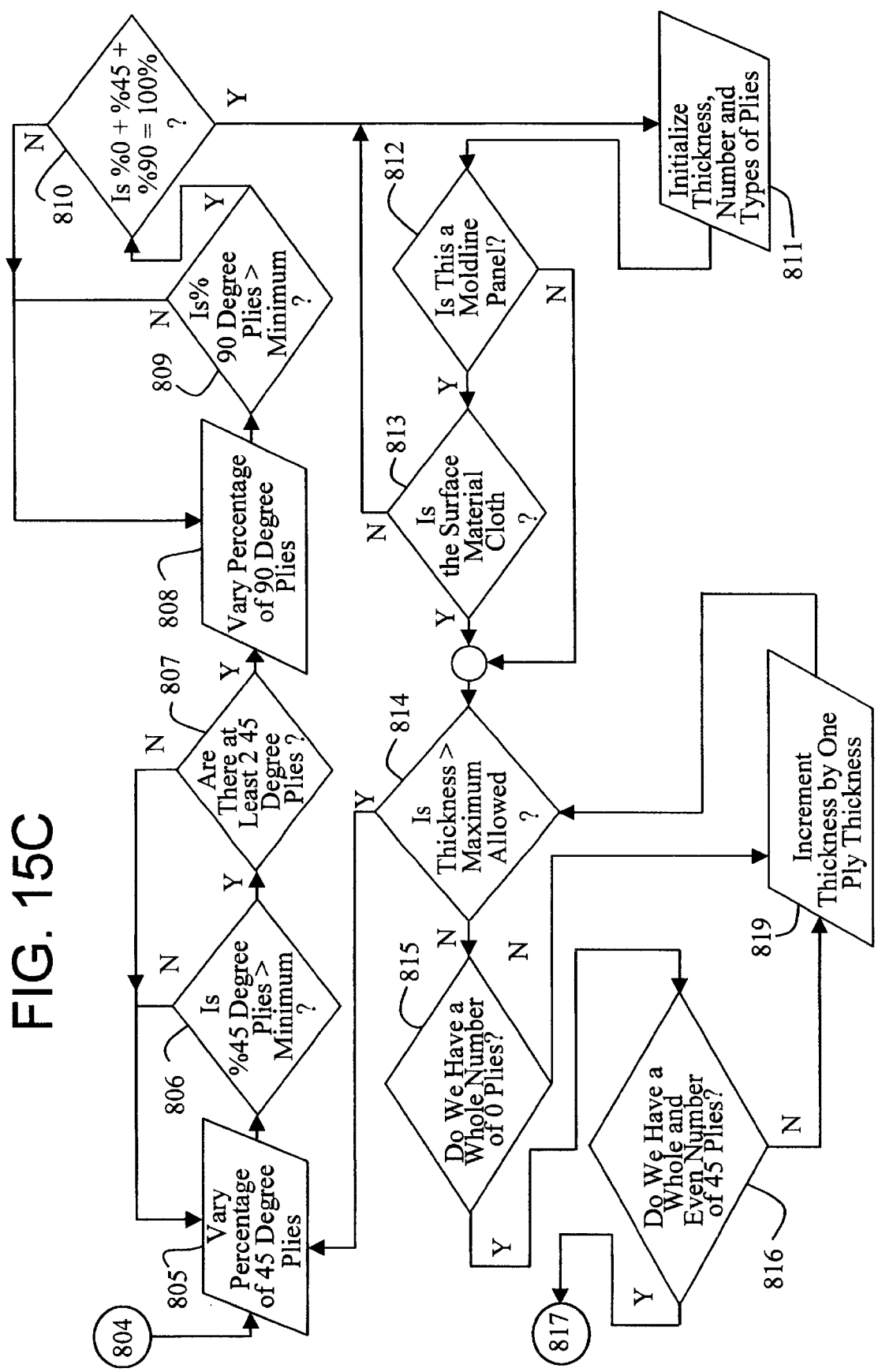
Figure 15D:
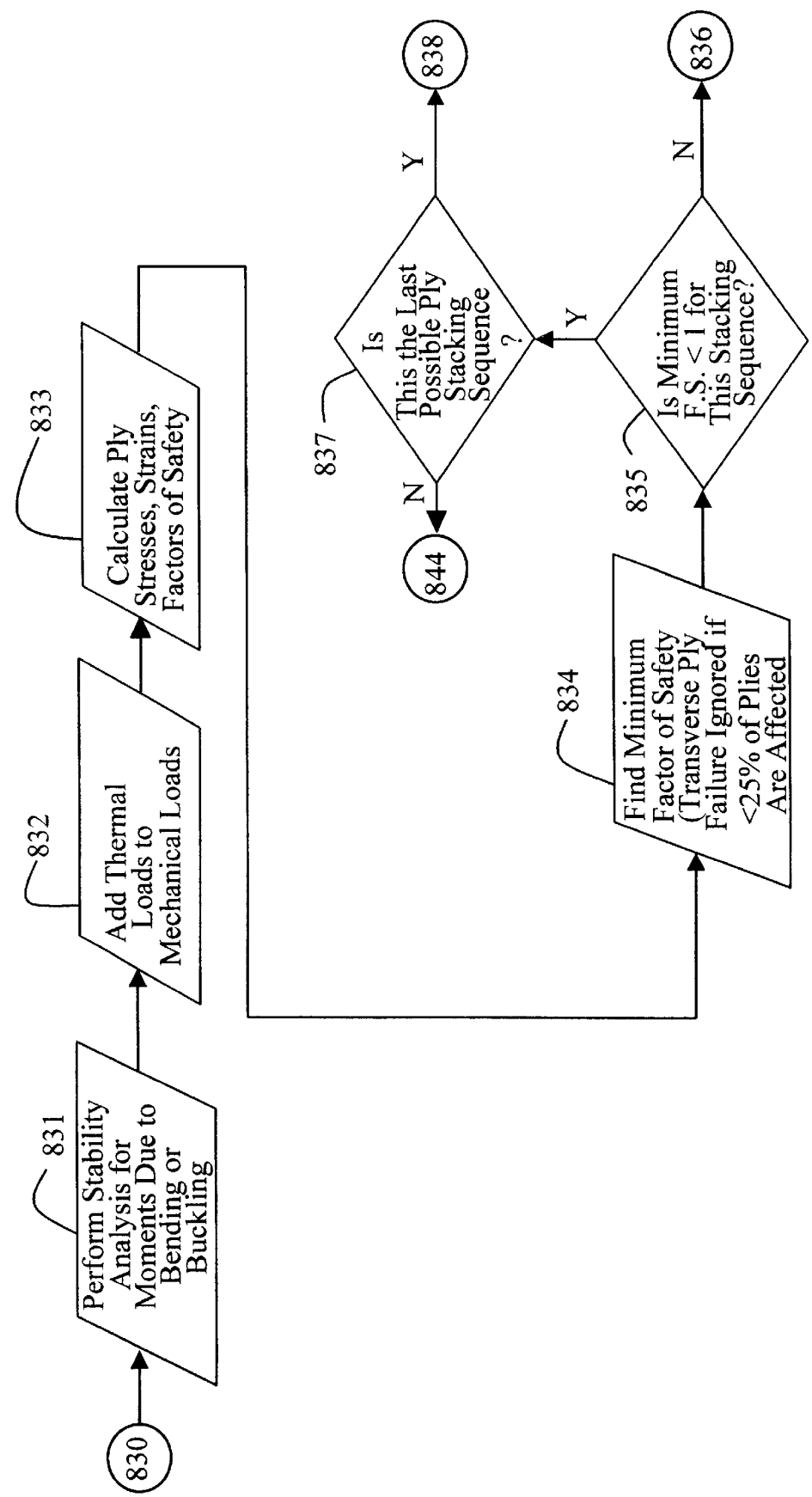
Figure 15E:
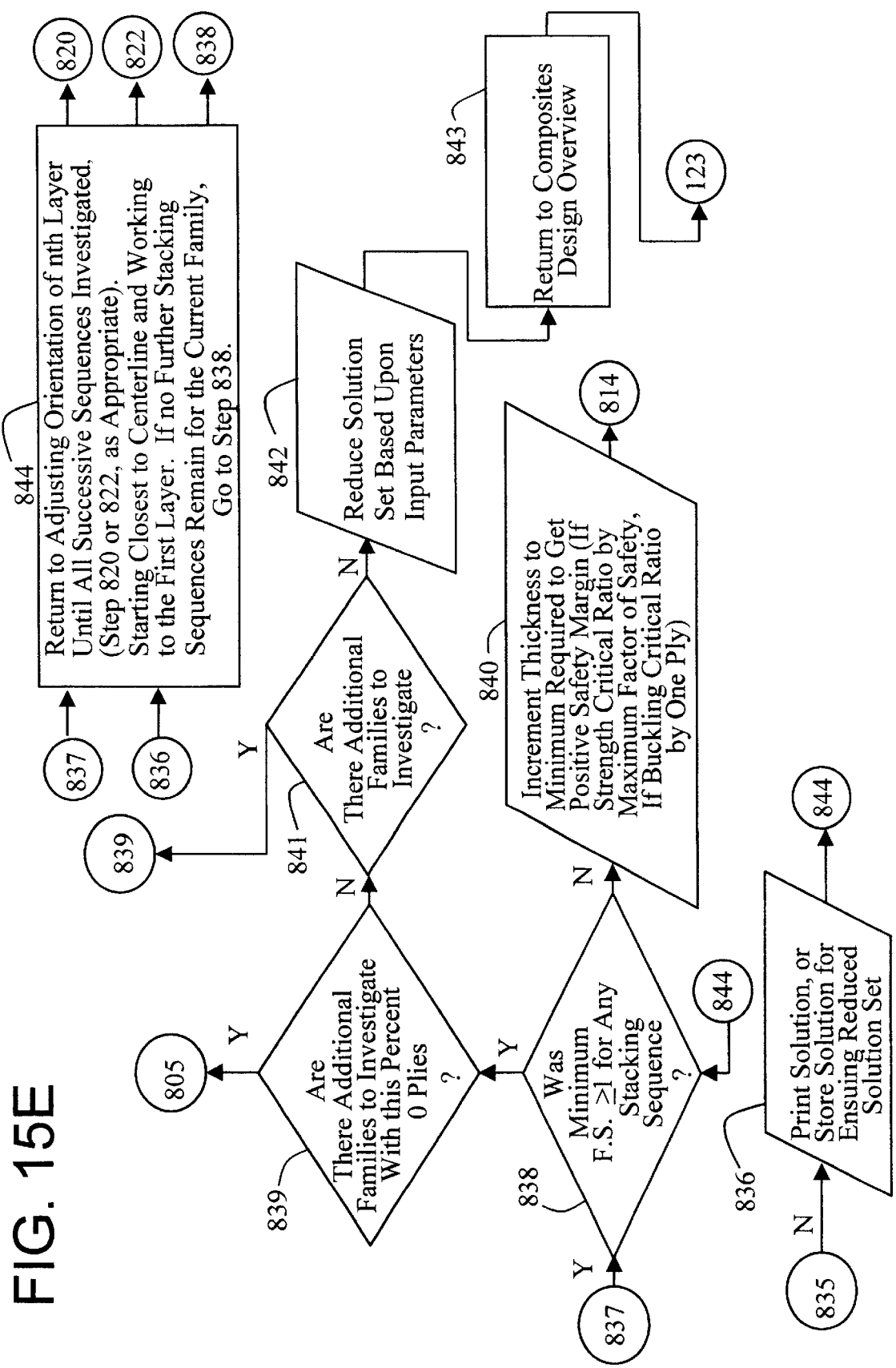

A fifth alternative preferred embodiment of the knowledge driven composite design optimization process according to the present invention illustrated in the flowchart of FIGS. 13A–13C will now be described briefly. However, it should first be noted that the subroutine depicted in FIGS. 13A–13C refers to the so-called method of establishing ply connectivity by the ply growth method. It should also be noted that the prefatory steps, i.e., steps 601 to 610 of FIGS. 13A–13C are substantially similar to like numbered steps in the flowcharts of FIGS. 9A through 12D. Therefore, a detailed discussion regarding steps 601 to 610 of FIGS. 13A–13C will be omitted. It will be mentioned that the steps associated with FIGS. 13A–13C are not continuously numbered; numbers are selected to correspond to like steps in FIGS. 9A through 12D.

Starting with step 611a, the order for moving through the regions, e.g., thickest to next thickest, thickest to thinnest, thinnest to next thickest, or thinnest to thickest, according to geometric position, is established. Then, step 611b is performed to establish the order for moving through the plies, e.g., outer to inner in the key region, inner to outer in the key region, by geometry, and step 611c is performed to establish the ply to investigate. Afterwards, step 612 is executed to establish the region to investigate and step 613 is performed to establish the border to investigate.

Step 619 advantageously can be performed to question whether the outermost unassigned plies on one side of the centerline advantageously can be connected; when the answer is affirmative, step 620 is executed to connect the outermost unassigned plies, thus making these plies assigned. Irrespective of the answer at step 619, step 628 is then performed to determine whether there is another border to investigate in this region. If there are no more borders, step 629a is performed to determine whether there is another region to investigate for this ply. When the answer at step 628 is affirmative, the subroutine jumps to the start of step 613; when the answer at step 629a is affirmative, the subroutine jumps to the start of step 612. In the event that the answer at both steps 628 and 629a is negative, step 629b is then performed to determine whether there is another ply to evaluate. When the answer is affirmative, the subroutine loops back to the start of step 611c; when the answer is negative, step 630 is performed to calculate the boundary of every ply and then step 631 is performed to return to the PACKS process of FIGS. 8A–8D.

As discussed previously with respect to step 114 in FIGS. 8A–8D, ramps are an integral feature of every ply and thus are preferably calculated with the base laminate. Ramps are produced to preclude the termination of more than one ply at a specific location. Thus, the plies are extended slightly such that the ply terminations advantageously form a gradually sloping thickness transition. In order to design to the ply level, it must be established which ply boundaries should be extended to create the necessary ramps. The process for defining these extended boundaries is detailed in FIGS. 14A through 14G. It should be mentioned that the process depicted in these figures embodies alternate methods for extending plies, depending on the requirements and geometry of the component. Again, the innovation lies in the systematic and well-defined approach which ensures a consistent and trackable extension methodology. It should also be mentioned that the discussion below addresses FIGS. 14A through 14G collectively.

The subroutine corresponding to step 114 of FIGS. 8A–8D starts with step 701, in which the boundary of every ply, assuming a termination exists at the borders, is defined.

Step 702 is then performed to establish the order for evaluating the borders, e.g., thickest region to thinnest, or vice versa, or the border with the greatest or the fewest number of terminations. Afterward, step 703 is executed to establish the border to examine. During step 704 a determination is made as to whether there is more than one ply terminating at the border. When the answer is negative, an additional inquiry is made at step 705 to determine whether there is another border to examine. When the answer is negative, step 706 is performed to calculate the extended ply boundaries for every ply and then step 707 is performed to return to the PACKS process of FIGS. 8A and 8B. In contrast, when the answer is affirmative, the subroutine loops back to the beginning of step 703. It will be noted that when the answer to the inquiry of step 704 is positive, steps 708 and 709 are performed.

During step 708, the number of plies terminating at the border is determined. Then, during step 709, the predominant orientation of the border geometry with respect to a predetermined material axis is determined. Step 710 is then performed to determine whether the default ramp ratio is acceptable. If the answer is affirmative, step 711 is performed to determine whether the border is oriented within 45° of the X-axis. It will be noted that the answers in steps 710 and 711 are used to establish the default ramp ratio. More specifically, if the answer is negative at step 710, step 715 is performed to define ramp ratio as desired, i.e., 3<□<90. When the answer is negative to the inquiry of step 711, step 712 is used to define a default ramp ratio of 20:1; when the answer is affirmative, step 713 defines the default ramp ratio as being 10:1.

Irrespective of the answers to the inquiries in steps 710 and 711, step 714 is then performed to determine whether this border is collinear with another border, i.e., within 0.5 inches and/or 5°. When the answer is negative, step 716 is performed to determine whether symmetric extensions are desired. When the answer is affirmative, step 717 is then performed to establish the starting ply as the second closest termination to the centerline on tool side; when the answer is negative, the subroutine jumps to step 737, which is discussed in greater detail below.

Execution of step 717 is followed by execution of step 718, in which the ply from the previous terminating ply is extended at twice the ramp ratio. An inquiry is then made at step 719 in order to determine if there are more terminating plies below the centerline. When the answer is affirmative, step 720 is performed to establish the next termination from the centerline towards the tool surface as the starting ply and then step 718 is repeated. When the answer is negative, step 721 is executed to establish the starting ply as the second closest termination to the centerline away from the tool side. Step 722 is then performed to extend the ply from the previous terminating ply at twice the ramp ratio. Another inquiry is then made at step 723 in order to determine whether there are more plies terminating above the centerline. When the answer is affirmative, step 724 is performed to establish the next termination from the centerline away from the tool surface as the starting ply and then step 722 is repeated; when the answer is negative, the subroutine jumps to the start of step 705.

Assuming the answer is affirmative to the inquiry of step 714, step 725 is performed to determine whether the plies have been extended in a collinear border. When the answer is negative, step 716 is performed; when the answer is affirmative, step 726 is executed to extend the same plies similarly in this border, i.e., disregarding the local border. Another inquiry is then performed at step 727 to determine if there are additional terminating plies. When the answer is negative, the subroutine jumps to the start of step 705; when the answer is affirmative, step 728 is performed to determine whether symmetric extensions are desired. In the event that such extensions are not desired, the subroutine jumps to the beginning of step 749, which step will be discussed further below; when the answer is affirmative, step 729 is executed to set the starting ply as the closest unextended termination to the centerline on the tool side and then step 730 is performed to extend the ply from the previous longest extended ply below the centerline at twice the ramp ratio.

Following step 730, an inquiry is made at step 731 to determine whether there are more terminating plies below the centerline. When the answer is affirmative, step 732 is executed to establish the next termination from the centerline towards the tool surface as the starting point and then step 730 is repeated. When the answer is negative, step 733 is performed to set the starting ply as the ply closest to the unextended termination to the centerline away from the tool side. Step 734 is then performed to extend the ply from the previously longest extended ply above the centerline at twice the ramp ratio. An inquiry is then made at step 735 to determine whether there are more plies terminating above the centerline. When the answer is affirmative, step 736 is used to establish the next termination from the centerline away from the tool surface as the starting ply and step 734 is repeated; when the answer is negative, the subroutine jumps to the start of step 705.

As discussed above, when the answer is negative at step 716, step 737 is performed to determine if there are any continuous centerline plies. When the answer is affirmative, step 738 is performed to establish the starting ply as the second closest termination to the centerline on the tool side and then step 739 is performed to extend the ply from the previous terminating ply at twice the ramp ratio. Another inquiry is then made at step 740 to determine if there are more terminating plies below the centerline. When the answer is affirmative, step 741 is used to set the next termination from the centerline towards the tool surface as the starting ply and step 739 is repeated; when the answer is negative, step 742*a* is performed to establish the starting ply as the second furthest termination from the tool side and step 742*b* is performed to extend the ply from the previous terminating ply at twice the ramp ratio. Then step 743 is performed to determine whether there are more plies terminating above the centerline. When the answer is affirmative, step 744 is used to set the next termination from the centerline away from the tool surface as the starting ply and step 742b is repeated; when the answer is negative, the subroutine jumps to the start of step 705.

When the answer is negative to the inquiry at step 737, step 745 is performed to establish the starting ply as the second furthest termination from the tool side and then step 746 is used to extend the ply from the previous terminating ply at the ramp ratio. During step 747, an inquiry is made as to whether there are more terminating plies. If the answer is affirmative, step 748 is performed to establish the next termination towards the tool surface as the starting ply and step 746 is repeated; when the answer is negative, the subroutine jumps to the start of step 705.

In addition, when the answer to the inquiry at step 728 is negative, step 749 is performed to determine whether there are any continuous centerline plies. Then step 750 is performed to establish the starting ply as the closest unextended termination to the centerline on the tool side while step 751 is used to extend the ply from the previous furthest extension at twice the ramp ratio. During step 752, a determination is made for whether there are more terminating plies below the centerline. When the answer is affirmative, step 753 is performed to establish the next termination from the centerline towards the tool surface as the starting ply and then step 751 is repeated. When the answer is negative, step 754 is used to establish the starting ply as the furthest unextended termination from the tool side, and step 755 is performed to extend the ply from the previous furthest extension according at twice the ramp ratio. Step 756 is the performed to determine if there are any more plies terminating above the centerline. When the answer is affirmative, step 757 is executed to establish the next termination toward the centerline as the starting ply; when the answer is negative, the subroutine jumps to the start of step 705.

When the answer to the inquiry made at step 749 is negative, step 758 is performed to establish the starting ply as the furthest unextended termination from the tool side and step 759 is used to extend the ply from the previous extension at the ramp ratio. Step 760 is then performed to determine whether there are more terminating plies. When the answer is affirmative, step 761 is performed to establish the next termination towards the tool surface as the starting ply and step 759 is repeated; when the answer is negative, the subroutine jumps to the start of step 705.

It will be recalled that only a brief explanation regarding the available alternatives with respect to step 122 of FIGS. 8A–8D was presented above. A more detailed discussion of the alternative embodiments will now be presented while referring to FIGS. 15A–15C and 16.

When it is determined that the laminates in critical regions are not acceptable as determined in step 121 of FIGS. 8A–8D, a so-called laminate designer subroutine according to the present invention advantageously can be performed. The primary purpose of the laminate designer subroutine is to reduce the manual work of the design and analysis team by automating the computation and documentation of local ply stacking sequence in a given region. The laminate designer subroutine advantageously is capable of accurately and repeatedly determining the most effective local laminate definition for a critical region, and providing this input to the transition routine to ensure a uniform ply connectivity throughout the part which results in the fewest transitions and the largest continuous plies. It will be appreciated that the laminate designer subroutine makes extensive use of rules and best practices reflecting design, analysis, cost and manufacturing constraints.

The laminate designer subroutine starts with step 801, in which user inputs including:

name of saved output file; laminate thickness; maximum allowed thickness; ply thickness;

number of materials; material properties, i.e., stiffness, Poisson's ratio, thermal expansion coefficients, stress and strain allowables; laminate family; allowed variation in family; extreme bounds on family; number of similar adjacent plies allowed; surface cloth material desired for mold line panels; loading options; failure criteria, e.g., maximum stress, maximum strain, Tsai-Hill, bearing-bypass, etc.; number of load cases; load angle with respect to material axis; in-plane loads and moments; pressure on the panel; panel geometry; data reduction flags, i.e., the number of desired solutions based on the strength or stiffness requirements (for strength the most positive safety margin, the least positive safety margin and a defined number of intermediate solutions, for stiffness, the most and least stiff and a defined number of intermediate solutions for each primary stiffness) are established. Then, step 802 is performed to vary the percentage of 0° plies.

A determination is then made at step 803 for whether the percentage of 0° plies is greater than a predetermined minimum percentage. When the answer is affirmative, step 804 is performed to determine whether there are at least two 0° plies. When the answer is negative at steps 803 and 804, step 802 is repeated; when the answer is affirmative at step 804, step 805 is executed to vary the percentage of 45° plies. Afterwards, step 806 is performed to determine whether the percentage of 45° degree plies is greater than a predetermined minimum percentage. If the answer is affirmative, step 807 determines whether there are at least two 45° plies in the stack. When the answer is negative at both steps 806 and 807, step 805 is repeated; when the answer is affirmative at step 807, step 808 is applied to vary the percentage of 90° plies. Then, step 809 is performed to verify that the percentage of 90° plies is greater than a predetermined minimum percentage. It the answer is affirmative, step 810 is performed to determine whether the summation of percentage of 0° plies, percentage of 45° plies and percentage of 90° plies is equal to 100 percent. If the answer is negative at either step 809 or 810, step 808 is repeated. However, when the answer is affirmative at step 810, step 811 is performed to initialize the thickness, and the number and types of plies.

Following step 811, step 812 is performed to determine whether the current panel is a moldline panel. When the answer is affirmative, step 813 is performed to determine whether the surface material is cloth; when the answer is negative, the laminate designer subroutine jumps to step 814. If the answer is affirmative at step 813, step 814 is initiated to determine whether the thickness is greater than the maximum allowed thickness; otherwise, step 811 is repeated.

When the answer is affirmative at step 814, step 805 is repeated. However, when the answer is negative, step 815 is executed to determine whether there is an integer number of 0° plies. When the answer is affirmative, step 816 is performed to determine whether there is an even integer number of 45° plies. When the answer is affirmative, step 817 is performed to determine if there is an integer number of 90° plies. When the answer is affirmative, step 818 is performed to determine if there is an odd number of 0° plies, and if there is an odd number of 90° plies. When the answer is negative, step 819 is performed to increment the thickness by one ply thickness. It will be noted that when the answer is negative in any of steps 815, 816 or 817, step 819 is also performed. Then, step 814 is repeated.

In response to the inquiry made at step 818, when the answer is affirmative, step 820 is performed to adjust angle of layer 1, step 821 is executed to reduce the number of available plies of the type used, and then step 822 is used to adjust the angle of layer N. An inquiry is then made at step 823 to determine whether the angle corresponds to an available ply. When the answer is affirmative, step 824 is performed to determine whether the +45° and −45° plies are adjacent to one another; when the answer is negative, step 822 is repeated. In the event that the answer is affirmative at step 824, step 825 is performed to determine whether there are too many like plies adjacent to one another; when the answer is negative, step 822 is repeated. When the response at step 825 is YES, step 822 is repeated; when the answer is NO, step 826 is performed to reduce the number of available plies of the type used.

A check is then performed at step 827 to determine whether the ply begin g considered is the centerline ply. A negative response causes performance of step 828, which increments the ply ID by one, i.e., n=n+1, and then step 822 is repeated. When the answer is affirmative, step 829 is executed to determine whether there are too many similar plies adjacent to one another at the centerline. When the answer is affirmative, step 822 is repeated; when the answer is negative, step 830 i s initiated to perform classical lamination theory adjustment s and to calculate the terms of an ABD matrix. Then, step 831 is executed to perform a stability analysis f or moments due to bending or buckling, step 832 is performed to add the thermal loads to the mechanical loads, step 833 is performed to calculate ply stresses, strains, and safety factors, and step 834 is performed to find the minimum safety factor. In correction with step 834, it should be mentioned that the transverse ply is ignored if less than 25 percent of the plies are affected.

Next, step 835 is performed to determine whether the minimum safety factor is less than 1.0 for the current stacking sequence. When the answer is negative, step 836 is performed to either print the solution, or store the solution for ensuing reduced solution set operations; when t he answer is affirmative, step 837 is performed to determine whether this is the last possible ply stacking sequence. If the answer is affirmative, step 838 is performed to determine whether the minimum safety factor was greater than or equal to 1.0 for any of the stacking sequences evaluated. Responsive to this inquiry, step 839 is performed to determine whether there are additional families to investigate with this percentage of 0° plies when the answer is affirmative. When the answer is negative, step 840 is initiated to increment the thickness to the minimum required to achieve a positive safety margin, i.e., if strength is the critical ratio, the stacking sequence is increased by the maximum safety factor, if buckling is the critical ratio, the stack is increased by one ply. Then, step 814 is repeated. In contrast, when the answer at step 839 is negative, step 841 is executed to determine whether there are any additional families to investigate. If the answer is negative, step 842 is performed to reduce the solution set based upon the input parameters and then step 843 is performed to return to PACKS. In the event that the answer is affirmative at step 839, the laminate designer subroutine jumps to step 805; when the answer is affirmative at step 841, the laminate designer subroutine jumps to step 802.

It will be noted that in the event that the answer at step 837 is negative, step 844 is performed to return to adjusting orientation of the Nth layer until all of the successive sequences have been investigated, starting with the ply closest to the centerline and working to the first layer. When no further stacking sequences remain for the current family, the laminate designer subroutine jumps to the start of step 838.

As previously discussed, the laminate designer subroutine advantageously reduces the manual work of the design and analysis team by automating the computation and documentation of local ply stacking sequence in a given region. Preferably, the laminate designer subroutine is capable of accurately and repeatedly determining the most effective local laminate definition for a critical region, and providing this input to the transition subroutine to ensure a uniform ply connectivity throughout the part which results in the fewest transitions and the largest continuous plies. It will be appreciated that the laminate designer subroutine makes extensive use of rules and best practices reflecting design, analysis, cost and manufacturing constraints. It will also be appreciated that the knowledge based design process permits the user, after building a laminate in 3-D model space, to add or remove plies from the laminate. When secondary structural features are to be incorporated into the model, the user advantageously can refine the model further to meet new laminate requirements.

In order to determine an optimum laminate solution, further possible lay-ups can be generated using the laminate designer subroutine, which subroutine, given a number of input criteria, generates starting and ending stacking sequences for use with the laminate transition editing. Overall weight of the solutions advantageously can be compared to design criteria to determine the optimum laminate continuity solution which meets the user's needs. Preferably, these outputs are accessible to the user as both tabular and graphical reports. Moreover, the user is permitted to select a solution to incorporate into the laminate.

Inputs to the laminate transition subroutine include the thickness of the selected region, the maximum thickness to which it can be increased, the target laminate family the variation allowed in the laminate family, and the absolute maximum and minimum percentages of any ply orientation. Furthermore, the user advantageously can be allowed to set limits on the number of adjacent plies of identical orientation which are allowed both within the laminate and at the centerline, the number of adjacent ply terminations to allow, and the materials desired for construction of the laminate.

The user preferably is allowed to specify options for reducing the number of solutions from the laminate designer subroutine based upon either stiffness or strength criteria. For stiffness solutions, the required inputs are a number of target solutions for each term in the bending stiffness matrix, and the number of terms to save near each target. For strength solutions, the required inputs are the failure criteria, i.e., maximum strain, maximum stress, Tsai-Hill, and bearing-bypass, the definition of the load cases, and the desired number of solutions. Furthermore, routines advantageously can be developed for determining average geometry and loads within regions bounded by substructure, for basic stability estimations.

In an exemplary case, the output of the laminate designer subroutine includes the requested number of stacking sequences for the region, the mechanical properties of the laminates, an ABD matrix and effective homogeneous properties, and the minimum margin of safety, if strength solutions are to be performed. The system is capable of using each output to generate intermediate laminates, and comparing the overall weight of the solutions to determine the optimum least weight laminate continuity solution. These outputs preferably are accessible to the user as both tabular and graphical reports. Advantageously, the knowledge driven composite design optimization system and corresponding process are capable of executing the laminate designer subroutine as a function call, which allows the user to determine optimal stacking arrangements for selected regions. It should be mentioned that when the internal loads from a finite element solution are available, the laminate designer subroutine can calculate the stacking sequence which provides the greatest margin of safety for the defined geometry and load conditions.

Figure 16:
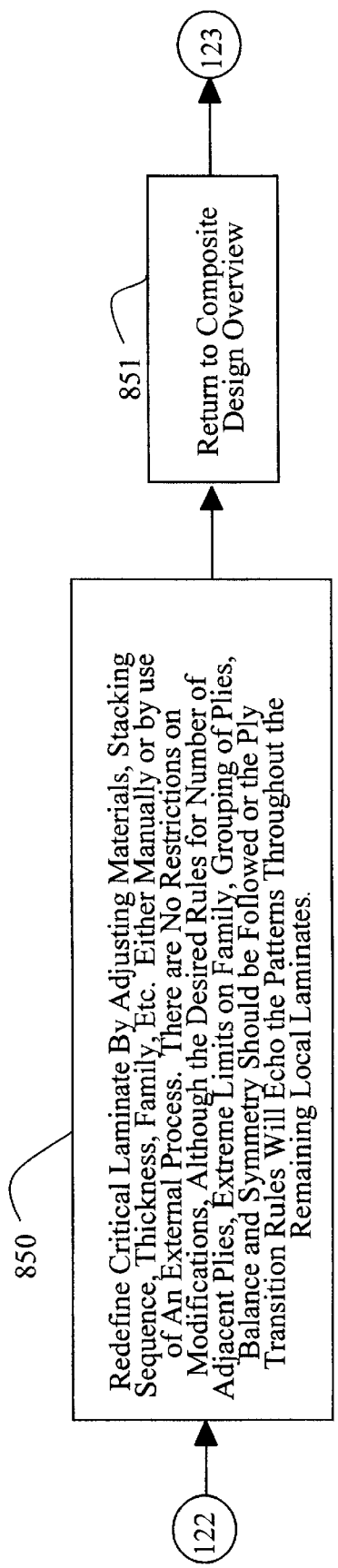
FIG. 16 illustrates a second alternative subroutine for modifying critical laminate boundaries within PACKS, as depicted in FIGS. 8A and 8B.

An alternative preferred embodiment according to the present invention will now be described while referring to FIG. 16, which depicts a manual editing method for modifying the critical laminate. As illustrated in FIG. 16, step 850 is first performed to redefine the critical laminate by adjusting the materials, the stacking sequence, the thickness, the family, etc., either manually or by the use of an external process. It should be mentioned that there are no restrictions on the modifications which advantageously can be made, although the desired rules for the number of adjacent plies, the extreme limits on the family, the grouping of plies, balance and symmetry of the stack should be followed or the ply transition rules will echo the patterns throughout the remaining local laminates. Following this step, step 851 is performed to return to the PACKS process of FIGS. 8A–8D.

As previously mentioned, the final innovations of the composite design optimization process are outlined in FIGS. 17A–17B. In many instances, the user may wish to add a number of secondary features, e.g., cutouts or structural reinforcing elements, after designing the overall laminate. The inclusion of these features may locally violate rules previously established for the laminate connectivity and will affect the global 3-D ply definition. More specifically, the process flowchart illustrates a subroutine by which local features, e.g., holes, are incorporated into the global laminate after the basic global laminate has been determined. One of ordinary skill in the art will appreciate that this is possible because, while each feature affects the global laminate, each feature affects the global laminate only locally. Thus, the designer advantageously can define a set of rules governing the behavior of each specific feature, e.g., how the incorporation of a particular feature into the overall design will affect the global laminate.

The subroutine illustrated in FIGS. 17A–17B starts with the performance of step 901, in which features, i.e., steps, rabbets, cutouts, joggles, stiffeners, seal grooves, inserts, tabs/lugs, doublers, pads, splices, chamfers, holes and surface extensions, which features will affect the ply definition but only locally, are specified. It will be appreciated that coming into this stage of the design process, the plies have been defined in 3-D space while assuming that there are no features. According to one aspect of the present invention, the features advantageously can be introduced into the design after the base laminate has been defined. Then, step 902 is performed to determine whether there are any features to incorporate. When the answer is affirmative, step 903 is performed to define the type and geometry of the feature to be designed into the laminate structure and then step 904 is performed to apply the knowledge base so as to modify the base laminate according to the rules specific to that feature. Next, step 905 is executed to redefine the 3-D plies to account for local features. Following step 905, a judgment is made at step 906 to determine whether there are any more features to incorporate. When the answer is affirmative, step 903 is repeated; when the answer is negative, step 907 is performed to determine whether or not to fabricate the panel.

It should be mentioned that when the response at step 902 is negative, step 907 is also performed.

In the event that the decision is YES with respect to fabrication, step 908 is performed to define the tooling geometry based upon the inner and the outer surfaces of the global laminate, step 910 is performed to define the flattened or as-cut ply shape by feeding the 3-D definition of every ply to a flattening subroutine, and step 913 is performed to create the 3-D ply outline of every ply for a laser projection system in the lay-up room. It should be mentioned that steps 908, 910 and 913, as well as the ensuing steps 909, 911, 912 and 914, advantageously can be performed in parallel, although each of these steps is required prior the building the structure in step 915. Once step 908 has been completed, the tool can be fabricated using the electronic surface definition derived in step 908. Once step 910 is completed, step 911 is performed to nest the plies, a concept well understood by one of ordinary skill in the art which will not be discussed further. Then, step 912 is performed to cut the individual plies using the electronic definition from steps 911 and 912. The cut plies will then be assembled to build the structure in step 915. Moreover, electronic (or paper) drawings preferably are created for use by manufacturing personnel during step 914. It will be noted that these drawings advantageously can be used to build the structure during step 915. It will also be noted that step 916, which permits a return to the composite design overview of FIG. 7 from the subroutine of FIGS. 17A–17B, is performed either following steps 915 or when the answer to the inquiry of step 907 is negative.

Advantageously, PACKS automates the generation of composite laminate designs and illustrations to detail 2-D cross sections of composite laminate regions, as well as the generation of tables and reports to document the thickness variations including transitional areas and the number of plies within the different regions of the solid. Preferably, the reports provide information on the ply distributions across different regions and transitional areas between regions of different thicknesses (ramps and ramp intersections), while the drawings of the 2-D cross sections provide information reflecting detailed capabilities. The preferred composite ply table advantageously can be automatically developed and maintained throughout each design session. It should be noted that these functionalities preferably are fully parametric and based upon the outer surface geometry supported in a graphical user interface.

Beneficially, the graphical user interface enables the user to interactively identify locations for 2-D section cuts and 3-D slices of the ply definition. The user can then interactively select and/or save 2-D cross sections and 3-D slices for later recall and redisplay. These sections advantageously can be associated with a retrievable planform view. Moreover, the user interface enables the user to manually edit or input the thickness of the different regions by interactively editing a 2-D model. The user interface also supports a sketcher capability for interactive design and modeling. Thus, the user can alter the design parameters, such as increasing or decreasing the number of plies in a region or the solid laminate thickness, which triggers the composite design optimization system to automatically recompute the surface geometry of the plies in addition to the intermediate plies layout details needed for a balanced design and to update all documentation. Thus, in an effort to speed the process of laminate definition, PACKS assists the user in performing three main functions: (1) the design of a laminate; (2) provides laminate visualization at the ply level; and (3) speeds analysis of the laminate. Preferably, PACKS automatically creates a laminate and allows the user to modify the base system rules or parameters through a consistent user interface.

As previously discussed, PACKS provides outputs for several distinct reasons. First, PACKS will provide a printed output, so that hard copies of the laminate design are available. Thus, the user may select any view, table or report and print it to either a printer or a file. Second, PACKS advantageously can save data in permanent storage for subsequent retrieval within PACKS, or other related systems. When the user elects to save a laminate design in permanent storage, PACKS saves all data necessary to recreate a laminate design during another session with minimal recalculation. For each project, the knowledge driven composite design optimization system will be able to track the original laminate definition, the current laminate definition, and be able to determine what has changed. Finally, PACKS can output the model in various formats so that other tools, like manufacturing systems or CAD tools advantageously can make use of PACKS output as an input. For example, the user may output the drawings and models to a CAD program, e.g., the UNIGRAPHICS (™) CAD program, preferably by creating an IGES-formatted file for a given view. The user may then read in and manipulate the drawing in the UNIGRAPHICS (™) CAD program. It should be mentioned that when the view contains tables, the output will be separated into several files: one main drawing file; and one text file from each table. If the user elects to output the entire model to the UNIGRAPHICS (™) CAD program, PACKS will then save the ply surfaces, outer moldline and inner moldline in an IGES formatted file. As previously mentioned, the user advantageously can output models to the analytical database for re-analysis.

As discussed in detail above, the knowledge driven composite design optimization process and corresponding system provide a laminate analysis overview to the laminate design team. The primary purpose of this function is to allow the design team to analyze the quality of a laminate design, allowing the design team to confirm the quality of a design using, e.g., other company accepted tools. In addition, the knowledge driven composite design optimization process and system eliminate the need for the design team to manually recreate the input necessary to rerun the composite design optimization process system.

The design team advantageously can perform a load analysis on ply geometry created within PACKS. In order to accomplish this task, the composite design optimization process will update the analytical database to reflect any changes in the internal geometry, materials and laminate definitions. Once updated, the database can be resubmitted for analysis by another tool. The results of this analysis will be displayable, in the same manner as the load analysis of the input FEA mesh.

In addition, the knowledge driven composite design optimization process and corresponding system advantageously can execute the laminate designer subroutine as a function call, as described above. This subroutine allows the design team to determine optimal stacking arrangements for selected regions. When internal loads from a FEA solution are available, this subroutine can calculate the stacking sequence which provides the greatest margin of safety for the defined geometry and load conditions.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A knowledge driven composite design optimization process for designing a laminate part comprising steps for:
   generating a globally optimized 3-D ply definition for a laminate part, said generating step further comprising steps for:
   (1) determining connectivity between a plurality of regions defining the laminate part;
   (2) subsequently generating ramp features detailing interconnection of the regions defining the laminate part;
   (3) displaying views and corresponding tabular data describing the laminate part and illustrating both inter-region connectivity and the ramp features as specified by a user; and
   (4) optimizing local stacking sequences; and
   subsequently modifying the 3-D ply definition to include features of the laminate part, wherein said generating and modifying steps are parametrically linked to one another.

2. The process as recited in claim 1, wherein:
   said generating step further comprises generating the globally optimized 3-D ply definition for a laminate part using predetermined rules of laminate design practice; and
   said modifying step further comprises subsequently modifying the 3-D ply definition to include features which locally violate said predetermined rules of laminate design practice for the laminate part.

3. A laminate part constructed using a knowledge driven composite design optimization process comprising steps for:
   generating a globally optimized 3-D ply definition for a laminate part using predetermined optimal rules of laminate design practice, said generating step further comprises substeps for:
   determining connectivity between a plurality of regions defining the laminate part;
   subsequently generating ramp features detailing interconnection of the regions defining the laminate part;
   displaying views and corresponding tabular data describing the laminate part and illustrating both inter-region connectivity and the ramp features as specified by a user; and
   optimizing local stacking sequences; and
   subsequently modifying the ply definition to include features of the laminate part, said modifying step further comprising modifying the 3-D ply definition to include features which locally modify predetermined optimal rules of laminate design practice for the laminate part,
   wherein said generating and modifying steps are parametrically linked to one another.

4. A knowledge driven composite design optimization process for designing a laminate part comprising:
   a Parametric Composite Knowledge System (PACKS) module for generating a globally optimized 3-D ply definition for a laminate part in accordance with laminate design transition rules, said PACKS module including:
   a connectivity subroutine for determining connectivity between a plurality of regions defining the laminate part responsive to said transition rules;
   a ramp definition subroutine for generating ramp features detailing interconnection of the regions defining the laminate part; and
   a visualization subroutine for displaying views and corresponding tabular data describing the laminate part and illustrating both inter-region connectivity and the ramp features as specified by a user;

a stacking sequence subroutine for optimizing local stacking sequences; and a feature module including:

a subroutine for modifying the 3-D ply definition to include features which locally modify the global ply solution;

wherein:

said PACKS and said features modules are parametrically linked to one another, and the knowledge driven composite design optimization process applies said PACKS module and said features module in that order as a best practice;

said connectivity subroutine comprises a plurality of connectivity subroutines;

said transition rules determine a number of said plies which can be dropped between adjacent ones of said regions;

each said connectivity subroutine examines all of said plies with respect to a predetermined order to thereby determine which of said plies will be dropped between said regions, said predetermined order being defined with respect to a centerline ply and a tool surface; and said connectivity subroutine, said ramp definition subroutine and said visualization subroutine are repeated seriatim until all of said connectivity subroutines have been utilized.

5. The process as recited in claim 4, wherein said transition rules determine a number of plies which can be dropped between adjacent ones of said regions and wherein said connectivity subroutine examines all of said plies in a predetermined order to thereby determine which of said plies will be dropped between said regions.

6. The process as recited in claim 5, wherein said predetermined order is freely selectable from a plurality of predetermined orders.

7. The process as recited in claim 5, wherein said predetermined order is defined with respect to a centerline ply and a tool surface.

8. A knowledge driven composite design optimization system used in designing a laminate part, comprising:

first means for generating a globally optimized 3-D ply definition for the laminate part in accordance with laminate design transition rules, said first means including:

second means for determining connectivity between a plurality of regions defining the laminate part responsive to said transition rules;

third means for generating ramp features detailing interconnection of the regions defining the laminate part; and fourth means for displaying views and corresponding tabular data describing the laminate part and illustrating both inter-region connectivity and the ramp features as specified by a user; and fifth means for modifying the 3-D ply definition to include features which locally modify the global ply solution;

wherein said first through fifth means are parametrically linked one to another, wherein said first through fifth means operate in numerical order as a best practice, wherein said first means further comprises sixth means for optimizing local stacking sequences, and wherein said transition rules determine a number of plies which can be dropped between adjacent ones of said regions and wherein said second means examines all of said plies in a predetermined order to thereby determine which of said plies will be dropped between said regions.

9. The system as recited in claim 8, wherein said predetermined order is freely selectable from a plurality of predetermined orders.

10. The system as recited in claim 8, wherein said predetermined order is defined with respect to a centerline ply and a tool surface.

11. The system as recited in claim 8, wherein:

said second means is responsive to a plurality of connectivity subroutines;

said transition rules determine a number of said plies which can be dropped between adjacent ones of said regions;

each said connectivity subroutine examines all of said plies with respect to a predetermined order to thereby determine which of said plies will be dropped between said regions, said predetermined order being defined with respect to a centerline ply and a tool surface; and said second through fourth means are repeatedly operated in numerical order until all of said connectivity subroutines have been utilized.

12. The system as recited in claim 8, wherein:

said second means is responsive to a plurality of connectivity subroutines;

said transition rules determine a number of said plies which can be dropped between adjacent ones of said regions;

each said connectivity subroutine examines all of said plies with respect to a predetermined order to thereby determine which of said plies will be dropped between said regions, said predetermined order being defined with respect to a centerline ply and a tool surface; and said second through fourth and sixth means are repeatedly operated in that stated order until all of said connectivity subroutines have been utilized.

* * * * *